US00RE38841E

(19) United States
(12) Reissued Patent
Yoshida et al.

(10) Patent Number: US RE38,841 E
(45) Date of Reissued Patent: Oct. 25, 2005

(54) SHOWER BATH APPARATUS AND SPRAY NOZZLE

(75) Inventors: Hiroaki Yoshida, Nara (JP); Shigeru Shirai, Nara (JP); Masaaki Kawaguri, Osaka (JP); Kazushige Kawahara, Nara (JP); Masaaki Inagi, Nara (JP); Masaki Yamamoto, Kyoto (JP); Hirofumi Gyokusen, Kyoto (JP)

(73) Assignee: Matsushita Electric Industrial Co., Ltd., Osaka (JP)

(21) Appl. No.: 09/905,851

(22) PCT Filed: Feb. 25, 1997

(86) PCT No.: PCT/JP97/00525

§ 371 (c)(1),
(2), (4) Date: Jun. 7, 1999

(87) PCT Pub. No.: WO97/30619

PCT Pub. Date: Aug. 28, 1997

Related U.S. Patent Documents

Reissue of:
(64) Patent No.: 6,195,814
Issued: Mar. 6, 2001
Appl. No.: 09/125,845
Filed: Jun. 7, 1999

(30) Foreign Application Priority Data

Feb. 26, 1996 (JP) ..... 8-37716
Apr. 22, 1996 (JP) ..... 8-99789
Jul. 15, 1996 (JP) ..... 8-184569

(51) Int. Cl.[7] ..... A47K 3/28

(52) U.S. Cl. ..... 4/601; 4/611

(58) Field of Search ..... 4/567, 568, 570, 4/578.1, 579, 597, 601, 605, 611, 615; 239/473, 497

(56) References Cited

U.S. PATENT DOCUMENTS

| | | | | | |
|---|---|---|---|---|---|
| 1,202,051 | A | * | 10/1916 | Gibbons | 239/473 |
| 3,275,283 | A | * | 9/1966 | Rauch | 4/578.1 X |
| 4,854,499 | A | * | 8/1989 | Neuman | 4/605 X |
| 5,121,511 | A | * | 6/1992 | Sakamoto et al. | 4/601 |
| 5,329,650 | A | | 7/1994 | Zaccai et al. | 4/605 |
| 5,397,053 | A | | 3/1995 | Ewing et al. | 236/93 B |
| 5,428,850 | A | | 7/1995 | Hiraishi et al. | 4/601 |

FOREIGN PATENT DOCUMENTS

| | | | | |
|---|---|---|---|---|
| DE | 332438 | | 1/1921 | |
| DE | 2804179 | | 8/1979 | |
| EP | 327041 | | 8/1989 | |
| FR | 808111 | | 1/1937 | |
| GB | 980122 | * | 1/1965 | 4/568 |
| GB | 1-454381 | | 11/1976 | |
| GB | 2149299 | | 6/1985 | |

(Continued)

OTHER PUBLICATIONS

English language abstract of JP 7,250,774, Oct. 3, 1995, 1 pg.*
English language abstract of JP 8,280,565, Oct. 29, 1996, 1 pg.*
European Search Report dated Feb. 22, 2001, application No. EP97904628.

*Primary Examiner*—Robert M. Fetsuga
(74) *Attorney, Agent, or Firm*—RatnerPrestia

(57) ABSTRACT

A shower bath apparatus which enables hot water bathing in a relaxed condition and provides a warm feeling over the whole body, equivalent to bathing in a bath tub. The shower bath apparatus comprises a shower bath apparatus body, a seat, on which a bathing person is seated, a spray nozzle for jetting hot water to the bathing person, and an arm provided with at least one spray nozzle. Sprayed hot water envelops the whole body of a user in a seated position to give the user a warm feeling.

41 Claims, 44 Drawing Sheets

FOREIGN PATENT DOCUMENTS

| | | | | |
|---|---|---|---|---|
| GB | 2243546 | | 11/1991 | |
| JP | 61-94616 | * | 5/1986 | |
| JP | 63-185469 | * | 11/1988 | |
| JP | 4008323 | * | 1/1992 | ..... 4/601 |
| JP | 4332556 | * | 11/1992 | |
| JP | 5-15570 | * | 1/1993 | |
| JP | 5-76459 | * | 3/1993 | |
| JP | 6182262 | * | 7/1994 | |
| JP | 6335415 | * | 12/1994 | |
| JP | 7-32770 | * | 7/1995 | |
| JP | 7207869 | * | 8/1995 | |
| JP | 8103391 | * | 4/1996 | |
| JP | 8038377 | * | 12/1996 | |

* cited by examiner

SHOWER BATH APPARATUS AND SPRAY NOZZLE

Matter enclosed in heavy brackets [ ] appears in the original patent but forms no part of this reissue specification; matter printed in italics indicates the additions made by reissue.

*This is a Reissue Application of U.S. Pat. No. 6,195,814, issued Mar. 6, 2001.*

This Application is a U.S. National Phase Application of PCT International Application PCT/JP97/00525.

TECHNICAL FIELD

The present invention relates to a shower bath apparatus having a spray nozzle for jetting fluid to a user, and more particularly to a shower bath apparatus capable of warming the whole body simultaneously same as bathing in a bath tub, and bringing about an excellent warming effect.

BACKGROUND ART

Shower bath is becoming popular as simple bathing means owing to its ease in preparation for bathing and saving of space, but shower bathing is hard to get warmth and obtain relaxed feeling, and there is a gap from the bath tub bathing practice based on the traditional bath culture in Japan. To eliminate this gap, various shower bath apparatuses have been proposed. For example, Japanese Laid-open Patent No. 61-94616 proposes a shower box as shown in FIG. 43, in which a ring-shaped reciprocating shower head is disposed around a chair having a mesh back rest and a seat, so that the user sits on the seat to have shower automatically. More specifically, a chair A6 comprising a back rest A3 and a seat A4 made of mesh A5 is disposed in a box A1, and an all-direction shower head A7 has a plurality of shower nozzles A8 disposed at the inner side of a ring-shaped pipe, covering the chair A6 from back and forth, right and left, while allowing a sufficient space for accommodating the body of the user between the chair A6 and the front portion Aa of the all-direction shower head A7, and reciprocates between the upper end Ab and lower end Ac of the chair A6. In a seated position on the chair, the all-direction shower reciprocates between the back rest and the seat while jetting showering from around the whole body, so that showering is very easy.

However, in this conventional shower bath apparatus disclosed in Japanese Laid-open Patent No. 61-94616, the hot water from the all-direction shower head A7 having a plurality of shower nozzles A8 disposed at the inner side of the ring-shaped pipe is applied only in part of the body at once, and only part of the body provided with hot water from the shower head A7 when the shower head A7 passes can be warmed, which is far from the bath tub bathing for warming the whole body simultaneously.

Incidentally, a nozzle for jetting fluid was proposed, for example, as shown in FIG. 44.

In FIG. 44, a nozzle main body 1 has a flow inlet 2 in which fluid flows, a swirl unit 3 in which the incoming fluid swirls, a swirl chamber 4 in which the fluid swirls sufficiently, and an injection hole 5 from which the swirling fluid is injected. The fluid flowing in from the flow inlet 2 flows into two swirl passages 6 in the swirl unit 3 as shown in FIG. 45, and flows at an angle determined by the swirl passages 6, and reaches the swirl chamber 4 from swirl holes 7 opened at specified angle in the swirl chamber 4. The fluid flowing out of two swirl holes 7 swirls in the swirl chamber 4, and is injected from the injection hole 5. At this time, the fluid is a swirl flow, which has an angular momentum different from the jet flow of fluid without swirl flow, and therefore when injected from the injection hole 5, it spreads in the radial direction. Therefore, the spray angle of the nozzle is wider, and the jet flow is atomized.

In such conventional spray nozzle, however, since only two swirl holes 7 are provided in the swirl unit 3, sufficient swirl force of fluid is not obtained, and the spay angle is narrow and mist particles are rough in size. In particular, when used at low pressure as in general household, the swirl force of fluid is much smaller, and mist particles are small in the conventional nozzle, and it is hard to realize a nozzle with a large spray angle.

To solve this problem, by reducing the size of the injection hole of the nozzle, a nozzle reduced in mist particle size and widened in spray angle has been proposed, but since the pressure loss is large, sufficient fluid flow rate is not obtained, and hence the application is limited to spraying of agricultural chemicals or the like.

Incidentally, concerning showering in seated position, since the floor is wet and slippery, in shower bathing, hand rails are often provided in the bath room to assist elderly users, in particular, for showring in standing position or when moving. For example, as proposed in Japanese Laid-open Patent No. 7-207869, as shown in FIG. 46, a hand rail A5 is provided on the wall of the bath room as an aid for standing and sitting of the user bathing in seated position, and a hand rail A4 is provided at the entrance of the bath room so as to rotate in the horizontal direction indoors and outdoors as an aid for entering or leaving the room.

Besides, showering in standing position is difficult for elderly users weak in physical strength, and showering in seated position is preferred, and such inventions are proposed recently. For example, according to Japanese Laid-open Patent No. 8-38377, as shown in FIG. 47, plural upward spray nozzles B15 for jetting hot water upward are disposed along the peripheral edge of a circular floor B11 of a floor panel B10. A shower unit B30 is provided in a wall panel B20 disposed in vertical state to the floor panel B10. The shower unit B30 comprises a handy shower nozzle B36, a faucet B32, an overhead shower nozzle B34 for spraying hot water in natural fall, and plural horizontal spray nozzles B35 disposed in the vertical direction to spray hot water in horizontal direction. The user sits on the floor panel B10, facing the shower unit B30, and is showered in a relaxed state by receiving hot water sprayed upward from the plural upward spray nozzles B15 by using the faucet B32 and handy shower nozzle B36.

Meanwhile, an integrated structure of hand rail and shower nozzle has been also proposed. For example, according to Japanese Laid-open Patent No. 6-335415, as shown in FIG. 48, a hand rail C6 is provided around the surface of a bath mirror main body C5, and a hand rail C8 of larger diameter incorporating a shower nozzle C7 is provided on this hand rail C6. Therefore, an elderly user can be bathed with shower while sitting opposite to the mirror, and can stand up easily by using the hand rail which also supports the shower nozzle C7.

In the prior art disclosed in Japanese Laid-open Patent No. 7-207869, however, the hand rail A5 provided on the wall in the bath room as an aid for standing and sitting of the user in the seated position is fixed on the wall, and therefore the seated user must move closer to the hand rail A5, and holds this hand rail when standing and sitting, and therefore the user is required to move the body according to the hand rail.

In Japanese Laid-open Patent No. 8-38377 allowing an elderly user weak in physical strength to have shower in seated position, not in standing position very large in burden, there is no aid for standing or sitting, and the burden due to standing or sitting before and after bathing occurs. It is also a problem that the nozzle provided on the floor is an obstacle when moving within the bath room.

In Japanese Laid-open Patent No. 6-335415 in which the shower nozzle for seated position and the hand rail are assembled in one body, it is necessary to stretch hand up to the hand rail when standing up from the seated position, and depending on the seated position, it is a burden for the shoulder joint of the user to stretch the hand, and it is far from the shower apparatus allowing the user to bathe in a relaxed state to warm the whole body simultaneously.

SUMMARY OF THE INVENTION

The invention comprises a shower bath apparatus main body, a spray nozzle for jetting fluid to a user, and nozzle support means having at least one spray nozzle.

A shower bath apparatus in a first aspect of the invention comprises a shower bath apparatus main body, a spray nozzle for jetting fluid to a user, and nozzle support means having at least one spray nozzle, whereby the spreading angle of fluid to be jetted to the user can be expanded by the spray nozzle, and the fluid can be sprayed to a wide range of the body at the same time, and when the fluid is a hot water, the wide range of the body can be warmed at the same time.

A shower bath apparatus in a second aspect of the invention comprises a shower bath apparatus main body, foldable seat means, and a spray nozzle for jetting fluid to a user, whereby the user sprayed from the spray nozzle of a wide spray angle in a seated position, so that a wide range of the body can be warmed simultaneously in a relaxed state. Besides, since the seat means is foldable, while the shower bath apparatus and seat means are not used, the seat means can be stowed away, and the washing space can be used widely if installed in the washing space in a bath room in a general household.

In a shower bath apparatus in a third aspect of the invention, the seat means has a support unit such as support plate, and the support unit can support the body weight of the user applied on the seat means firmly on the floor, thereby preventing the seat means from being broken to prevent accident due to impact of sitting or years of use, so that the shower bath apparatus of high safety is presented.

In a shower bath apparatus in a fourth aspect of the invention, the support unit of the seat means is stowed away simultaneously when stowing away the seat means, and the shower bath apparatus is easy in operation for stowing away or taking out the seat means as the support unit is stowed away simultaneously when stowing away the seat means.

A shower bath apparatus in a fifth aspect of the invention comprises a shower bath apparatus main body, seat means on which a user is seated, a spray nozzle for jetting fluid to the user, and nozzle support means having at least one spray nozzle, whereby the spray nozzle is disposed by the nozzle support means so that the jet flow may envelop the body, and the user is bathed in a seated position simultaneously on the whole body so that the jet flow from the spray nozzle wide in the spray spreading angle may envelop the body, and therefore a wide range of the body can be warmed simultaneously.

In a shower bath apparatus in a sixth aspect of the invention, plural spray nozzles are arranged so that their jet flows may overlap on the body, and since jet flows from plural spray nozzles overlap on the body, blank intervals of jet flows may be eliminated.

In a shower bath apparatus in a seventh aspect of the invention, the spray nozzle is constituted to generate a swirl flow inside and inject the fluid, whereby the fluid flowing into the spray nozzle is caused to swirl, and the fluid comes to have a swirling force, and therefore mist particles are small, and the jet flow is applied to a wide range of the body simultaneously at a wide spray angle.

In a shower bath apparatus in an eighth aspect of the invention, the spray nozzle has a flow passage, a swirl unit for swirling the fluid entering from the flow passage, and an injection hole disposed at the downstream side of the swirl unit for injecting the swirling fluid, and the swirl unit swirls the incoming fluid to provide the fluid with a swirl force, and causes to reduce the mist particles by the swirl force of the fluid at the injection hole, from the swirl unit to the injection hole, so that the spray angle may be further widened.

In a shower bath apparatus in a ninth aspect of the invention, the spray nozzle has the swirl unit composed as three swirl holes, and the three swirl units swirl the incoming fluid to provide the fluid with swirl force, and by swirling the flows from each swirl unit stably without interfering with each other from the swirl unit to the injection hole, the constitution of the swirl units is simplified, and the pressure loss and loss of swirl force generated in the swirl units can be suppressed to a minimum limit, so that a stabler spraying is realized at a lower cost.

In a shower bath apparatus in a tenth aspect of the invention, the injection direction of the fluid of the spray nozzle is freely adjustable, and the direction of jet flow can be freely adjusted depending on the physique and preference of the user, so that showering in an ideal state is realized.

In a shower bath apparatus in an eleventh aspect of the invention, the spray nozzle includes jet flow variable means capable of adjusting the jet flow pattern of the fluid, whereby the user can adjust the jet flow variable means of the spray nozzle to adjust the state of the jet flow applied to the body, so that shower bathing suited to the preference of the user is realized.

In a shower bath apparatus in a twelfth aspect of the invention, the nozzle support means is formed as an arm, whereby jet flow from the spray nozzle can be applied uniformly to the body by forming the nozzle support means for supporting the spray nozzle as the arm.

In a shower bath apparatus in a thirteenth aspect of the invention, the arm is supported on the shower bath apparatus main body and is composed to be adjustable in position, whereby the arm can be adjusted to a proper position depending on the physique and preference of the user when using the shower so as to be bathed as preferred.

In a shower bath apparatus in a fourteenth aspect of the invention, a passage for passing fluid is provided in the arm, whereby it is not necessary to form passage such as hose for feeding fluid into the spray nozzle outside of the arm because the passage for passing the fluid is provided in the arm mounting the spray nozzle, so that the neat and functional shower bath apparatus is realized without spoiling the appearance.

In a shower bath apparatus in a fifteenth aspect of the invention, a support shaft for supporting the arm on the shower bath apparatus main body is provided, and a passage for passing the fluid is provided in this support shaft, whereby it is not necessary to form the passage such as hose for feeding fluid into the spray nozzle outside of the support shaft because the passage for passing fluid is provided in the support shaft for supporting the arm on the shower bath apparatus main body, so that there is no obstacle when rotating the arm about the support shaft.

In a shower bath apparatus in a sixteenth aspect of the invention, the arm can be stowed away, and when the shower is not used, the arm can be put into the shower bath apparatus main body, so that the washing area in the bath room can be used widely without any protruding object.

In a shower bath apparatus in a seventeenth aspect of the invention, the arm is adjustable in angle, whereby the user can preferably adjust the angle to be bathed by adjusting the arm depending on the physique and preference when using the shower.

In a shower bath apparatus in an eighteenth aspect of the invention, the arm can be selected at a desired fixing position, whereby the user can select a desired fixing position and fix at the selected position to be showered by adjusting the arm depending on the physique and preference when using the shower.

In a shower bath apparatus in a nineteenth aspect of the invention, the arm is movable when a force exceeding a preset moment force is applied at the arm support point when fixing, whereby the strength load to the shower bath apparatus main body is lessened as the arm is movable when applied with a force exceeding a set force.

In a shower bath apparatus in a twentieth aspect of the invention, the arm is provided to be nearly symmetrical to right and left, whereby the jet flow may be applied symmetrically on both sides to the shoulders, arms, chest, waist and legs of the body of the user when using the shower because the arm mounting the spray nozzle is nearly symmetrical.

In a shower bath apparatus in a twenty-first aspect of the invention, the right and left arms cooperate, and therefore since the right and left arms cooperate, when the user adjusts the arm position depending on the own physique, or when stowing away the arms, by moving only one of the right and left arms, both arms operate simultaneously, so that it is possible to handle by one hand only.

In a shower bath apparatus in a twenty-second aspect of the invention, the right and left arms are adjustable individually, and therefore since the arms mounting the spray nozzle can be adjusted individually, if desired to shower one arm or hand only due to injury, for example, the position of the other arm can be set aside.

In a shower bath apparatus in a twenty-third aspect of the invention, the arm can be dismounted from the shower bath apparatus main body, whereby cleaning or maintenance of the arm is easy by dismounting the arm from the shower bath apparatus main body.

In a shower bath apparatus in a twenty-fourth aspect of the invention, the arm dismounted from the shower bath apparatus main body can be mounted on a proper position in the bath room, and therefore by dismounting the arm from the shower bath apparatus main body and mounting on a proper position in the bath room, for example, the wall above the bath tub, it is possible to bathe the upper half of the body only with the shower while putting the feet in the bath tub, sitting on the edge of the bath tub, or use as an auxiliary hand rail when standing or sitting in the same position.

In a shower bath apparatus in a twenty-fifth aspect of the invention, the arm is made of resin either in whole or in part, and since the arm is made of resin, it is smaller in the cold discomfort or hot discomfort when touched by part of the body as compared with the metal, and moreover it is light in weight, and the strength for supporting the arm can be lessened, and the arm can be moved by a smaller effort.

In a shower bath apparatus in a twenty-sixth aspect of the invention, a hand shower is provided, and a changeover valve is installed to changeover the spray nozzle and the hand shower, whereby the spray nozzle giving a warm feeling by enveloping the body with the jet flow, and the hand shower for washing a desired part of the body by holding in hand can be used by changing over by the changeover valve.

In a shower bath apparatus in a twenty-seventh aspect of the invention, the operation unit for manipulating the changeover valve is designed in a rotary knob shape for changing over the spray nozzle and hand shower by rotating right or left, whereby the spray nozzle and hand shower may be used by changing over by twisting right or left the knob of the operation unit of the changeover valve provided in the shower bath apparatus main body.

In a shower bath apparatus in a twenty-eighth aspect of the invention, a hand shower is provided, and also a changeover valve for changing over the spray nozzle and the hand shower and also for opening both the spray nozzle and the hand shower simultaneously is provided, whereby the spray nozzle giving a warm feeling by enveloping the body with the jet flow, and the hand shower for washing a desired part of the body by holding in hand can be used separately or simultaneously by changing over by the changeover valve.

In a shower bath apparatus in a twenty-ninth aspect of the invention, the changeover valve is designed to adjust or stop the flow rate, and it is possible to adjust or stop the shower flow rate as well as to change over the type of shower by the changeover valve.

In a shower bath apparatus in a thirtieth aspect of the invention, fluid temperature setting means is provided, so that the jet flow temperature of the shower for enveloping the whole body in a wide range can be freely set in seated position.

In a shower bath apparatus in a thirty-first aspect of the invention, a mixing valve for mixing hot fluid and cold fluid is provided at the upstream side of the changeover valve so as to adjust to the temperature set by the temperature setting means, and the jet flow temperature of the shower for enveloping the whole body in a wide range can be freely adjusted, for example, in seated position, so that shower bathing at temperature preferred by the user is realized.

In a shower bath apparatus in a thirty-second aspect of the invention, an operation unit for manipulating the changeover valve, and temperature setting means of mixing valve are disposed parallel to each other in the shower bath apparatus main body, and therefore since the operation unit for manipulating the changeover valve and the temperature setting means of the mixing valve are provided parallel to each other in the shower bath apparatus main body, the user can manipulate quickly, in seated position, for changing over the spray nozzle and hand shower or setting the temperature.

In a shower bath apparatus in a thirty-third aspect of the invention, the operation unit for manipulating the changeover valve is disposed at the right hand side position of the user seated on the seat means, and therefore since the operation unit for manipulating the changeover valve is provided at the right hand side position of the user when seated on the seat means, the user can change over the spray nozzle and hand shower by the right hand in seated position.

In a shower bath apparatus in a thirty-fourth aspect of the invention, the operation unit for manipulating the changeover valve is disposed at a position higher than the temperature setting means, and therefore since the operation unit for manipulating the changeover valve is provided at a position higher than the temperature setting means, the user, for example, in seated position can search for the operation unit by hand without particularly looking for, so that the spray nozzle and hand shower can be changed over in non-visible state.

In a shower bath apparatus in a thirty-fifth aspect of the invention, the hand shower is disposed at a nearly same height as the sitting position of the seat means, and therefore since the hand shower is provided at a nearly same height as the sitting position of the seat means, the user can search for the hand shower by hand and hold it in seated position. Besides, hot water from the hand shower can be poured into a washbowl.

In a shower bath apparatus in a thirty-sixth aspect of the invention, the hand shower is disposed at a position lower than the operation unit of changeover valve, and therefore since the hand shower is provided at a position lower than the operation unit of the changeover valve, the hand shower can be held by searching by hand, and moreover when manipulating the operation unit of the changeover valve while pouring out hot water from the hand shower, it can be manipulated without exposing the hand to the jet flow of the hand shower.

In a shower bath apparatus in a thirty-seventh aspect of the invention, high temperature setting limiting means for preventing injection of fluid of high temperature is provided, and therefore if the user attempts to set the jet flow temperature to high temperature by mistake by the temperature setting means, critically high temperature is not set by the high temperature setting limiting means so that safe use is guaranteed.

In a shower bath apparatus in a thirty-eighth aspect of the invention, a high cut valve is provided for preventing injection of fluid of high temperature, and therefore if fluid of high temperature is supplied into the high cut valve, the high cut valve prevents supply of high temperature fluid into the spray nozzle, so that high temperature fluid will not be injected to the user from the spray nozzle.

In a shower bath apparatus in a thirty-ninth aspect of the invention, a high cut valve for preventing injection of fluid of high temperature is provided between the changeover valve and injection nozzle, and therefore if high temperature fluid is supplied into the high cut valve by mistake or malfunction of the mixing valve or the like, the high cut valve prevents supply of high temperature fluid into the spray nozzle, so that the high temperature fluid from the spray nozzle will not be injected to the user.

In a shower bath apparatus in a fortieth aspect of the invention, the high cut valve comprises a flow inlet through which the fluid flows in, a flow outlet through which the fluid flows out, a high temperature discharge port for discharging high temperature fluid, a valve for changing over the flow outlet and the high temperature discharge port, a temperature sensing element for thrusting the valve in a direction for closing the flow outlet when high temperature fluid is supplied, and a bias spring for thrusting the valve in an opposite direction of the direction for thrusting the temperature sensing element, whereby if the temperature of the fluid supplied from the flow inlet is high, the temperature sensing element thrusts the valve and the flow outlet side is closed, while the high temperature discharge side is opened, and supply of high temperature fluid into the flow outlet is prevented.

In a shower bath apparatus in a forty-first aspect of the invention, the high cut valve has its temperature sensing element composed of shape memory spring, and as compared with the temperature sensing element of wax pellet or the like, the temperature sensing element of shape memory spring is quick in response speed and simple in constitution.

In a shower bath apparatus in a forty-second aspect of the invention, a water film forming nozzle for forming a water film is disposed near the neck area of the body, and therefore when the user takes a shower bath in a relaxed state sitting on a chair or the like, plural spray nozzles disposed around the body inject hot water in mist state to envelop the user, and the water film forming nozzle disposed around the neck area of the body forms a film of hot water, and the hot water spray is shielded by this film, so that a boundary can be felt between the shower region and the head in the neck area of the body, and the difference of the body exposed to the shower and the head not exposed can be felt bodily, while maintaining the hot sensation and relaxed feeling same as in tub bathing in spite of shower bathing.

In a shower bath apparatus in a forty-third aspect of the invention, water reforming means is disposed in a passage, and the water is reformed by the water reforming means provided in the passage, and hot water reformed by the water reforming means is injected from the spray nozzle connected to the passage, and consumption of hot water is smaller as compared with the hot water amount in the entire bath tub, so that only a small reforming capacity is enough, and an efficient water reformed shower bath is realized.

In a shower bath apparatus in a forty-fourth aspect of the invention, the water reforming means is bath salts feed means, and by dissolving bath salts in hot water by the bath salts feed means as the water reforming means, hot water dissolving bath salts is injected from the spray nozzle connected to the passage, and consumption of hot water is smaller as compared with bath tub bathing, the required amount of bath salts is smaller, and the shower bath with bath salts effect may be realized.

In a shower bath apparatus in a forty-fifth aspect of the invention, the water reforming means is soap feed means, and by dissolving soap in hot water by the soap feed means as the water reforming means, hot water dissolving soap is sprayed from the spray nozzle connected to the passage, so that the skin of the body surface can be cleansed and disinfected.

In a shower bath apparatus in a forty-sixth aspect of the invention, the water reforming means is seawater ingredients feed means, and by dissolving seawater ingredients in hot water by the seawater ingredients feed means as the water reforming means, hot water containing seawater ingredients is sprayed from the spray nozzle connected to the passage onto the skin of the body surface, so that thalassotherapeutic shower bath is realized.

In a shower bath apparatus in a forty-seventh aspect of the invention, the water reforming means is air feed means for feeding air into the hot water, and by feeding air in hot water by the air feed means as the water reforming means, hot water containing air is sprayed to the body from the spray nozzle connected to the passage, so that shower bath of mild feel is realized.

In a shower bath apparatus in a forty-eighth aspect of the invention, the water reforming means is composed of carbon dioxide generating means and carbon dioxide dissolving means for dissolving carbon dioxide generated from the carbon dioxide generating means, and carbon dioxide is generated by the carbon dioxide generating means, out of the carbon dioxide generating means and carbon dioxide dissolving means of the water reforming means, and the carbon dioxide is dissolved in hot water by the carbon dioxide dissolving means, and hot water containing carbon dioxide is sprayed to the skin of the body surface from the spray nozzle connected to the passage, consumption of hot water is smaller as compared with bath tub bathing, and the required amount of carbon dioxide is smaller, so that shower bath with carbonate spa effect is realized.

In a shower bath apparatus in a forty-ninth aspect of the invention, a detachable water tank for collecting water spray is disposed in the foot area of the body, and when the user takes a shower bath in a relaxed state sitting on the chair or the like, plural spray nozzles disposed around the body inject hot water in mist form to envelop the user, and the hot water film and hot water spray are collected in the detachable water tank disposed in the foot area of the body, so that the sprayed hot water can be used as foot bath while taking a comfortable spray shower bath.

In a shower bath apparatus in a fiftieth aspect of the invention, draft means for blowing cold air to the head is disposed, and therefore by blowing cold air to the head area of the body by the draft means during or after shower bath by the spray nozzle, the head and face are cooled by cold air, and the heat of the user can be suppressed, so that fresh and comfortable shower life can be enjoyed.

In a fifty-first aspect of the invention, the spray nozzle includes a flow passage, three swirl units for swirling the fluid incoming from the flow passage, and an injection hole disposed at the downstream side of the swirl units for injecting the swirling fluid, in which the three swirl units act to swirl the incoming fluid to provide the fluid with a swirl force, while the flows from the swirl units from the swirl units to the injection hole hardly interfere with each other to be stabilized and reduce the loss of swirl force, and the swirl force of the fluid is large at the injection hole, and the mist particles are smaller in size at low pressure, and the spray angle is wider.

In a fifty-second aspect of the invention, three swirl units of the spray nozzle are formed as swirl holes, and the constitution of the swirl units is simplified, and the pressure loss of the fluid and the loss of swirl force generated by the swirl units are suppressed to a minimum limit, so that a stabler spraying is realized at lower cost.

In a fifty-third aspect of the invention, the spray nozzle has a central hole provided nearly in the center of the three swirl units, and the fluid flow from the central hole forms an axial flow of the swirling fluid, and the central hole forms a swirl axial flow nearly about the swirl flow from the three swirl units, and the swirl flow is stabilized between the swirl units and the injection hole, and since the swirl flow and axial central flow of the swirl flow coexist in the injection hole, so that distribution of jet flow (mist) from the injection hole is not deviated to the outer side but is uniform.

In a fifty-fourth aspect of the invention, the spray nozzle includes a flow passage, a swirl unit for swirling the fluid incoming from the flow passage, a central hole provided nearly in the center of the swirl unit, an injection hole disposed at the downstream side of the swirl unit for injecting the swirling fluid, and spray variable means for adjusting the distance between the swirl unit and injection hole, whereby the distance between the swirl unit and injection hole is adjusted by the spray variable mans, and the fluid swirl force is adjustable by shortening the distance between the swirl unit and injection hole when desired to increase the fluid swirl force at the injection hole, or extending the distance between the swirl unit and injection hole when desired to decrease the fluid swirl force at the injection hole, so that a uniform spraying is realized, while the mist particle size and spray angle can be adjusted.

BEST MODE OF CARRYING OUT THE INVENTION (1) Embodiment 1

Figure 1:
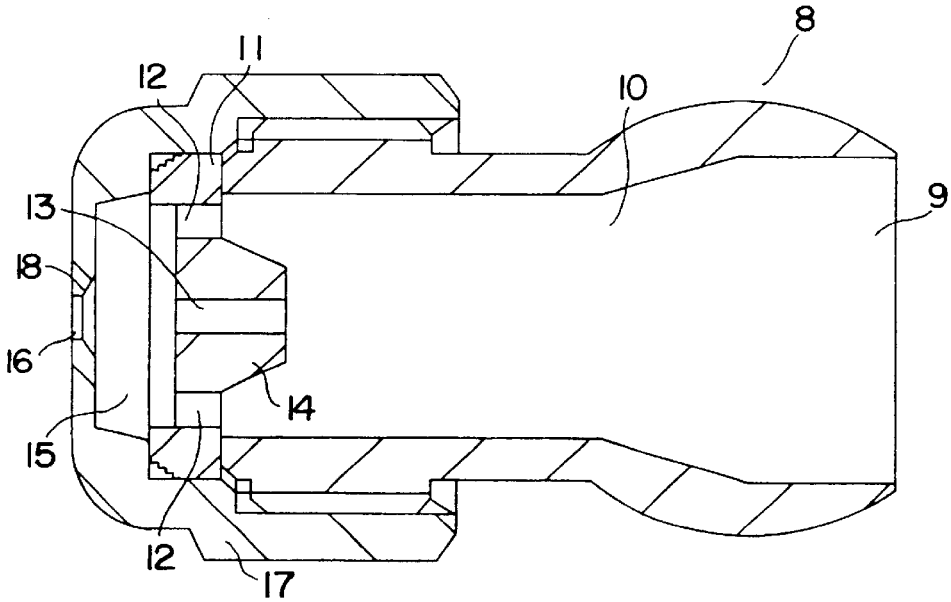
FIG. 1 is a sectional view of spray nozzle in embodiment 1 of the invention.

Referring now to FIG. 1, embodiment 1 of the invention is described below.

FIG. 1 is a sectional view of spray nozzle in embodiment 1 of the invention.

Figure 2:
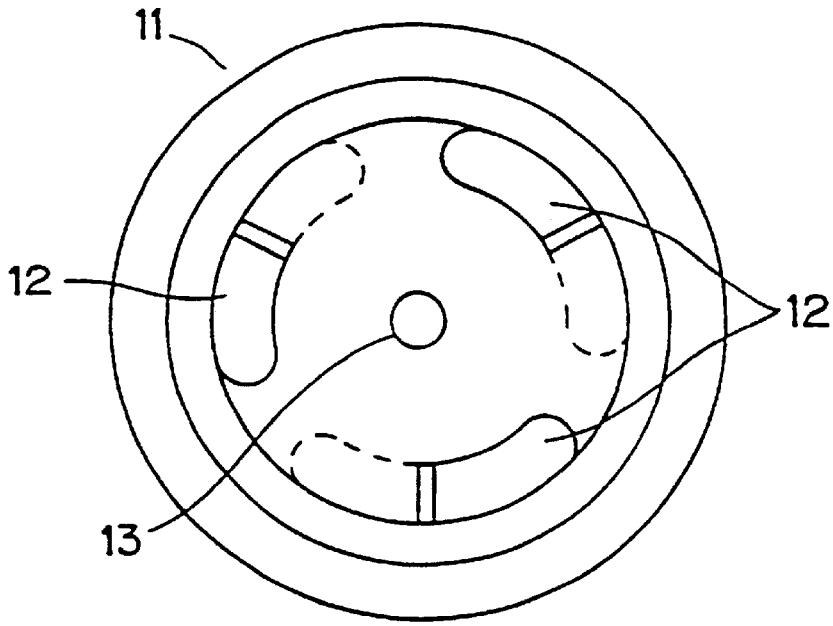
FIG. 2 is an appearance drawing of a swirl tip of the spray nozzle.
Figure 3:
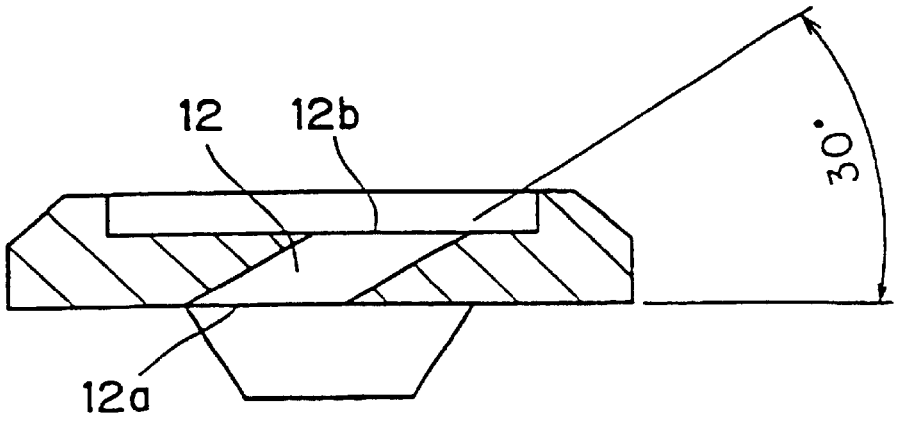
FIG. 3 is a partial sectional view of the swirl tip of the spray nozzle.

In FIG. 1, a flow inlet 9 and a flow passage 10 through which fluid flows are provided in a nozzle main body 8. Reference numeral 11 is a swirl tip for swirling the fluid flowing in through the flow passage 10, and as shown in FIG. 2, moreover, swirl holes 12 are disposed as swirl units at three positions on the circumference, while a central hole 13 is provided nearly in the center of the swirl holes. The three swirl holes 12 are equal in the opening area and are provided to divide the circumference in three equal sections so that the swirl flows coming out of the swirl holes 12 may be uniform. The swirl holes 12 are, in order to increase the opening area and heighten the swirl force, in a slender shape centered on the circumference in which the three swirl holes 12 are provided. FIG. 3 is a partial sectional view of the swirl hole 12, and the three swirl holes 12 are inclined with a specified angle so as to swirl the incoming fluid. The central hole 13 forms a central flow of swirl flow from the swirl hole 12. A bump 14 is provided on the swirl tip 11, and acts to reduce the pressure loss when the fluid flows into the swirl hole 12 and suppress disturbance of the flow.

Reference numeral 15 is a swirl chamber disposed at the downstream side of the swirl tip 11 for mixing the swirl flows formed by the swirl holes 12, and it stabilizes the swirl flow. The swirl chamber 15 is composed of the swirl tip 11, and a nozzle cap 17 having an injection hole 16 for injecting the swirled fluid. The injection hole 16 has a chamfered portion 18 of 60° disposed at the fluid flow-in side, and it is designed so that the swirl flow may smoothly flow into the injection hole 16. Herein, the injection hole 16 is formed nearly coaxially with the central hole 13 of the swirl tip 11, and it is designed so that the central axial flow from the central hole 13 may be injected directly.

Incidentally, the swirl tip 11 is a resin molded piece. Therefore, the flow-in side opening 12a and flow-out side opening 12b of the swirl hole 12 are linked at 30°, and are overlapped as shown in FIG. 2 and FIG. 3, so that the resin may be molded easily. In this constitution, the operation of the embodiment is described below.

The fluid flowing in through the flow inlet 9 reaches the swirl tip 11 through the flow passage 10. At the swirl tip 11, the fluid is divided by the opening area ratio into the passages of three swirl holes 12 and central hole 13. Herein, the bump 14 is provided with a specified angle for minimizing the disturbance of the fluid entering the swirl holes 12, thereby preventing occurrence of disturbance of swirl flow formed in the swirl holes 12. The fluid entering the swirl holes 12 forms a swirl flow having a swirl force, and reaches the swirl chamber. In the swirl chamber 15, the swirl flow from the swirl holes 12 is swirled and mixed about the axial flow formed in the injection hole 16 from the central hole 13, and a stable swirl flow is formed. Consequently, the swirl flow having the axial flow is injected from the injection hole 16.

Figure 4A:
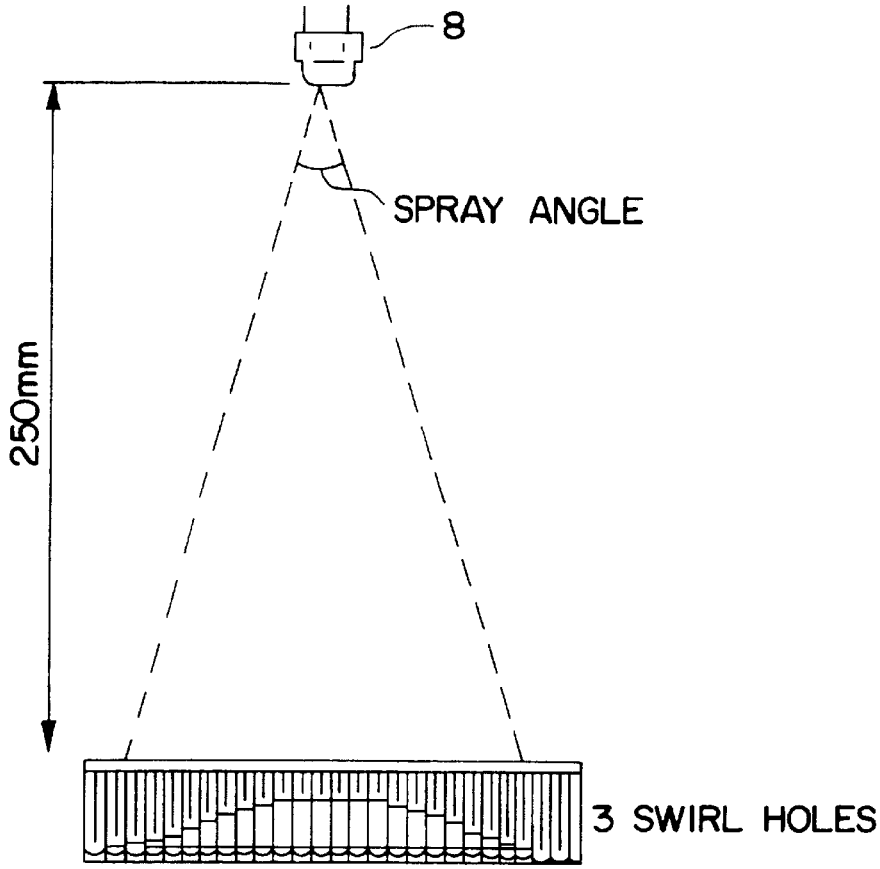
FIG. 4(a) is an explanatory diagram showing mist distribution of the spray nozzle.
Figure 4B:
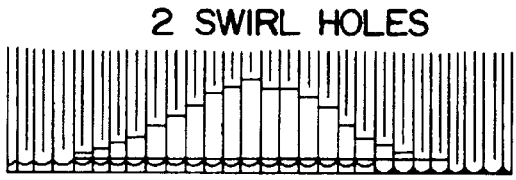
FIGS. 4(b), (c) are explanatory diagrams showing mist distribution of other spray nozzles in the same embodiment.
Figure 4C:
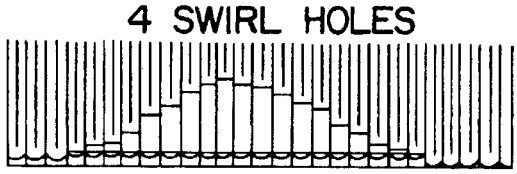

The distribution of jet flow (mist) from the spray nozzle at this time is shown in FIG. 4(a). In the distribution shown in FIG. 4(a), the spray nozzle is set downward in the vertical direction, plural cells are set at position of 250 mm from the end of the spray nozzle, and the fluid is sprayed until the water level in the cell of the highest fluid level becomes the specified height (hereinafter, the distribution of jet flow measured in this method is called the mist distribution). The mist distribution when the number of swirl holes is two and four is shown in FIGS. 4(b), (c). This mist distribution is numerically expressed as shown in Table 1.

TABLE 1

| Number of swirl holes | 2 | 3 | 4 |
|---|---|---|---|
| Spray angle | 40° | 47° | 40° |
| Spray area Ratio | 0.7 | 1 | 0.7 |

Figure 5:
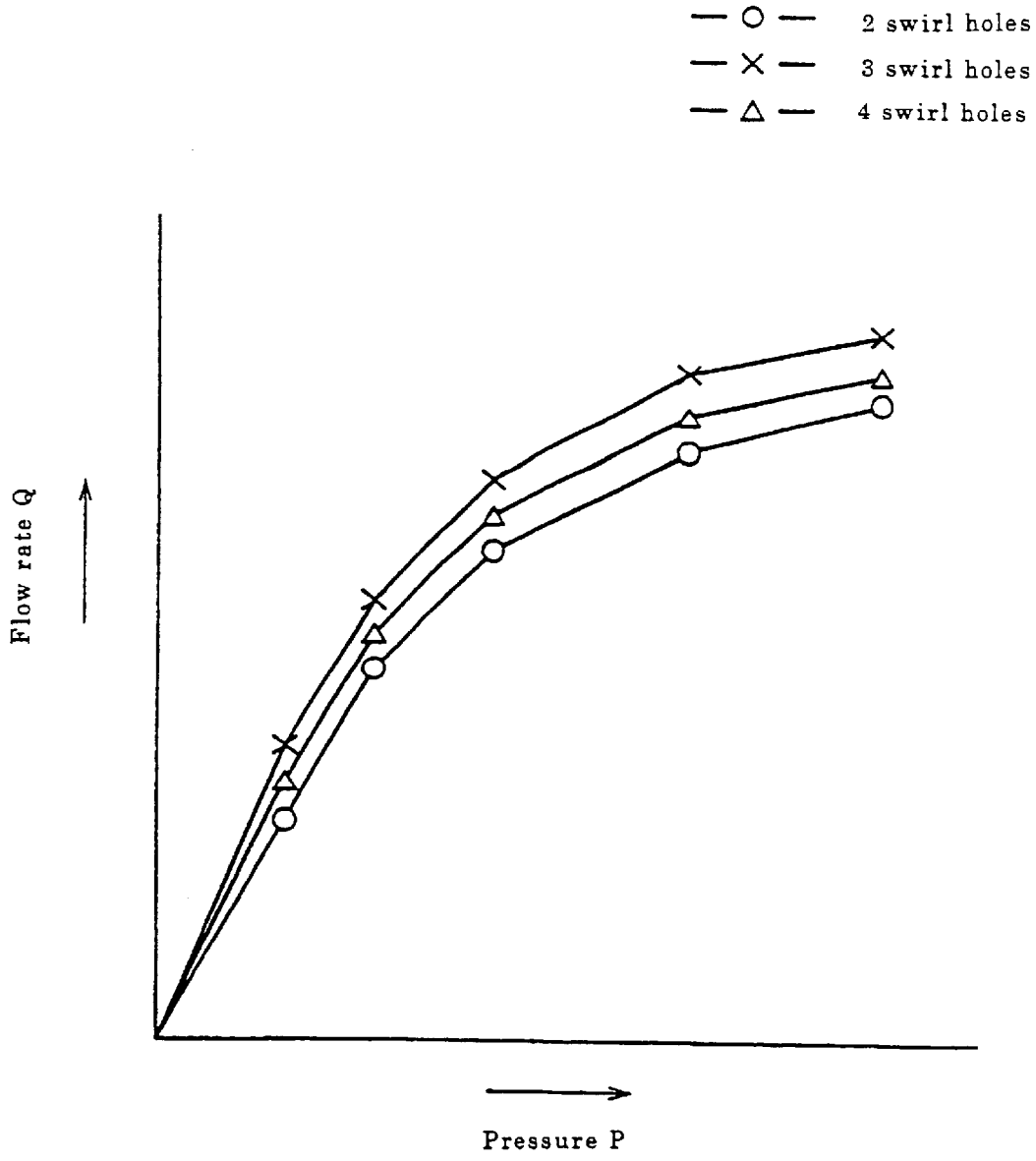
FIG. 5 is a pressure and flow rate characteristic diagram of spray nozzle in the same embodiment.

The spray angle refers to an angle formed by linking the cells at both ends in the mist distribution and the injection hole 16 by straight lines as shown in FIG. 4(a). The spray angle is the widest when the number of swirl holes 12 is three. The larger the swirl force of the fluid, the wider the spray angle, and therefore it is known that the swirl force is large when the number of swirl holes 12 is three, so that the swirl flow in the swirl chamber 15 is stablest. Therefore, as shown in FIG. 5, the pressure loss of the spray nozzle is the smallest when the number of swirl holes 12 is three.

In the case of three swirl holes 12, the swirl flow in the swirl chamber 15 is stabilized, and the disturbance of central axial flow is small, so that the mist distribution is more uniform.

According to embodiment 1 of the invention, since three swirl holes 12 are provided, the swirl flow in the swirl chamber 15 is stabilized, and the swirl force of the fluid is not lowered, and therefore it is effective to increase the spray angle and decrease the pressure loss of the spray nozzle.

In addition, a central hole is provided in the center of the three swirl holes 12, and a central axial flow is formed in the swirl flow in the swirl chamber 15, and the swirl portion and straight portion of the swirl flow in the injection hole 16 is balanced, and a uniform spray distribution is realized over a wide range.

Still more, the flow-in side opening 12a and flow-out side opening 12b of the swirl hole 12 are overlapped with each other, and the resin may be molded easily, and the spray nozzle can be lowered in cost.

In the embodiment, moreover, the flow-in side opening 12a and flow-out side opening 12b of the swirl hole 12 are coupled at an angle of 30°, and this angle is preferred to be 15 to 60° in consideration of the swirl force.

The chamfering portion 18 is 60° so that the spray angle may be widest, but in a range of 30 to 70°, disturbance of swirl flow hardly occurs, and a sufficient spraying angle may be obtained.

(2) Embodiment 2

Embodiment 2 of the invention is described below while referring to FIGS. 6 and 7.

Figure 6:
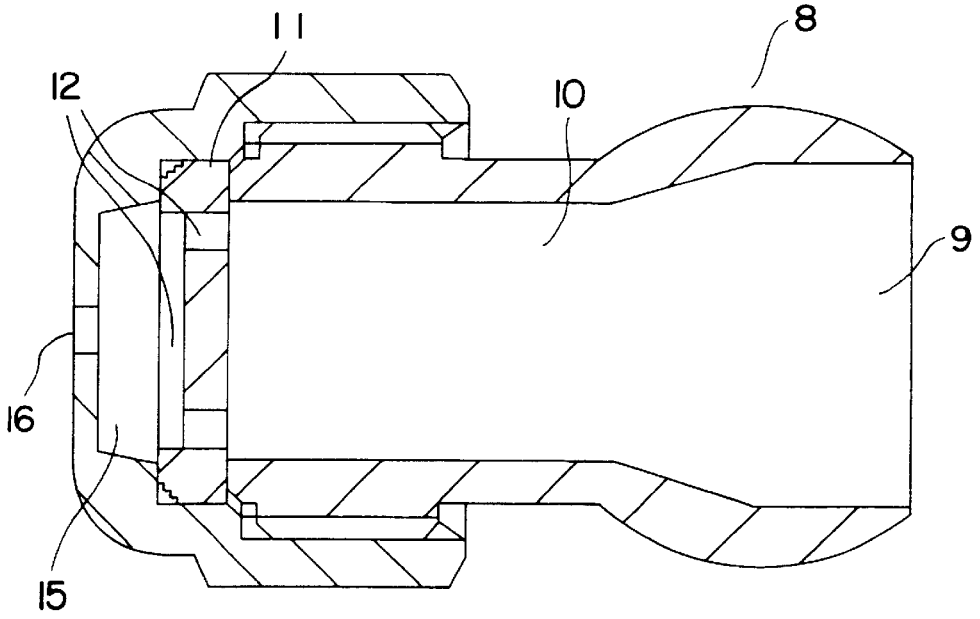
FIG. 6 is a sectional view of spray nozzle in embodiment 2 of the invention.
Figure 7:
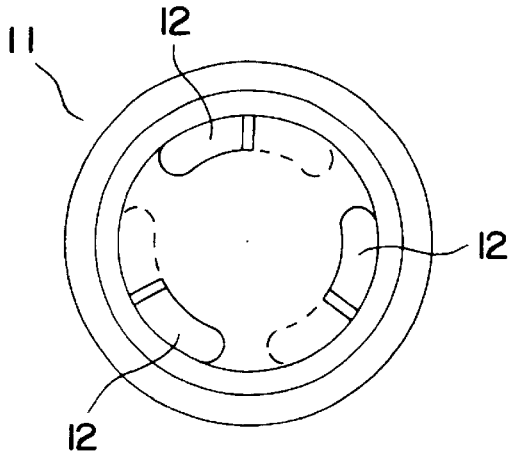
FIG. 7 is an appearance drawing of a swirl tip of the spray nozzle.

FIG. 6 is a sectional view of a spray nozzle in embodiment 2, and FIG. 7 is an appearance drawing of a swirl tip 11. In embodiment 2, what differs from embodiment 1 is that the central hole 13 is not provided in the center of the three swirl holes 12 of the swirl tip 11.

In this constitution, only the action different from embodiment 1 is described. The incoming fluid reaches the swirl tip 11, and is equally divided into three swirl holes 12. The fluid does not form central axial flow, but when the flow rate is the same, the generated swirl force is increased by the increment portion of the swirl flow rate. Therefore, the swirl force of the jet flow passing through the injection hole 16 increases, and the spray angle is further increased at low flow rate and low pressure.

Incidentally, when the injection hole 16 is formed smoothly without chamfering portion 18 so that there is no burr at the flow-in side of the injection hole 16, an axial flow of swirl flow is formed when flowing into the injection hole 16, and the center of mist is increased and the mist distribution is made uniform. Or, if the central hole 13 side is provided as in embodiment 1, the central mist amount may be also increased by the same action.

(3) Embodiment 3

Figure 8:
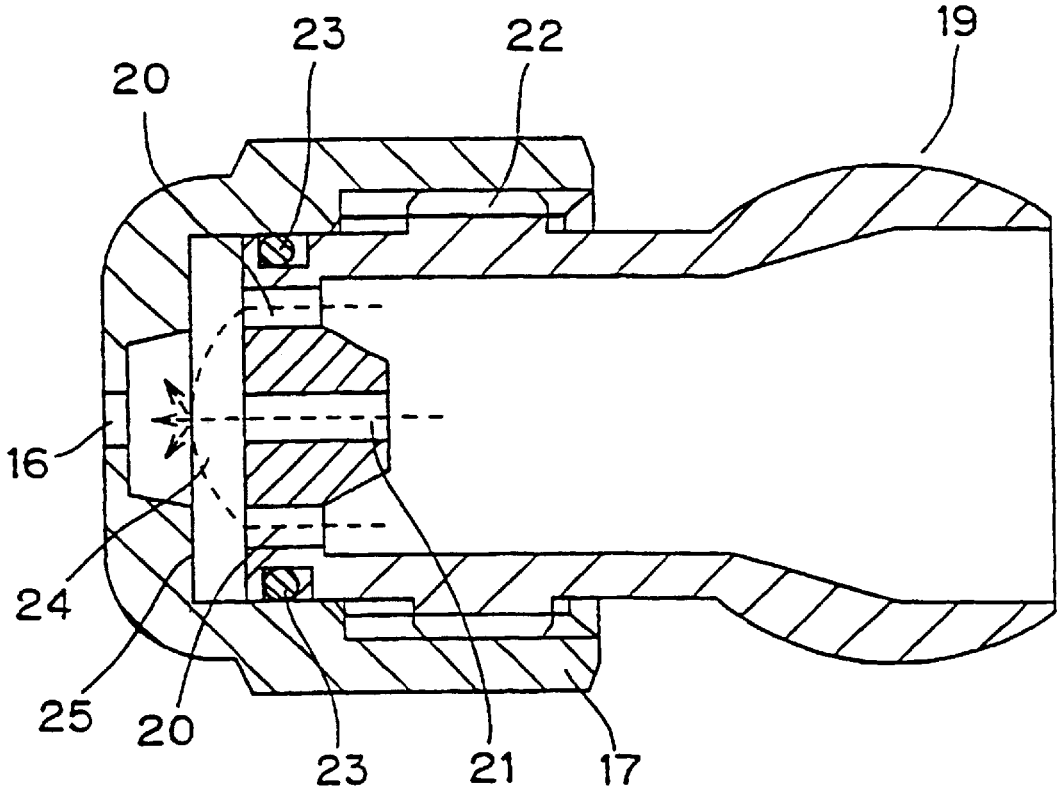
FIG. 8 is a sectional view of spray nozzle in embodiment 3 of the invention.

Embodiment 3 of the invention is described below by referring to FIG. 8, referring only to the difference from embodiment 1. FIG. 8 is a sectional view of the spray nozzle of embodiment 3.

In FIG. 8, a nozzle main body 19 is provided with a flow inlet 9 and a flow passage 10 through which the fluid flows in, and at the flow-out side of the flow passage 10, swirl holes 20 are provided as swirl units at three positions on the same circumference, together with a central hole 21 nearly in the center of swirl hole. The nozzle main body 19 has a nozzle cap 17 forming an injection hole 16 for injecting the fluid, which is engaged with a threaded portion 22 as spray variable means, and by rotating the nozzle cap 17, the distance of swirl holes 20 and injection hole 16 can be adjusted. A seal member 23 is provided at the junction of the nozzle main body 19 and the nozzle cap 17, and leak of fluid from the threaded portion 22 is prevented.

Reference numeral 24 is a swirl chamber provided at the downstream side of the swirl holes 20, for mixing the swirl flows from the swirl holes 20, so that the swirl flow is stabilized. The swirl hole 20 side of the swirl chamber 15 is larger than the circumferential diameter of the swirl hole 20, and the injection hole 16 side is smaller than the circumferential diameter of the swirl hole 20. A swirl flow suppressing unit 25 is designed to close the swirl holes 20 by abutting against the flow-outside of the swirl holes 20 of the nozzle main body 19 when the nozzle cap 17 is rotated and the distance of the swirl holes 20 and injection hole 16 becomes minimum.

In this constitution, the action of the embodiment different from embodiment 1 only is described.

Figure 9:
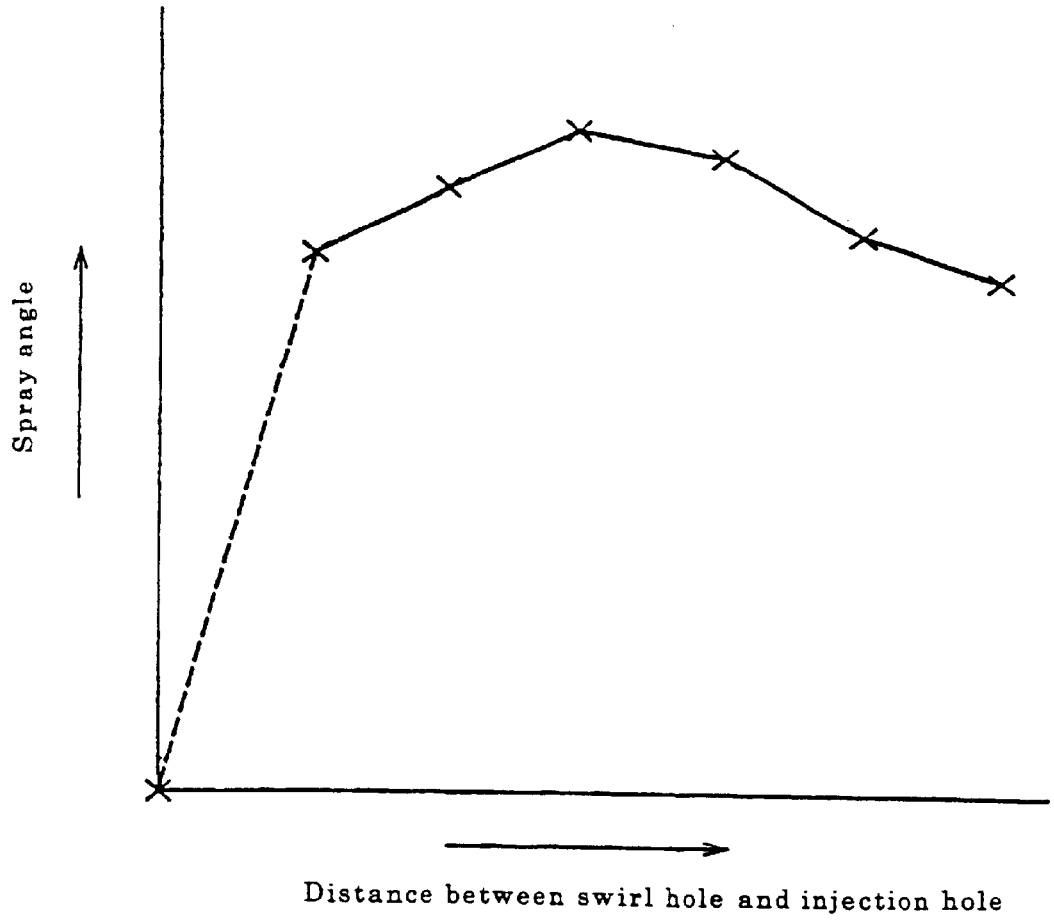
FIG. 9 is a hole distance and spray angle characteristic diagram of the spray nozzle.
Figure 10:
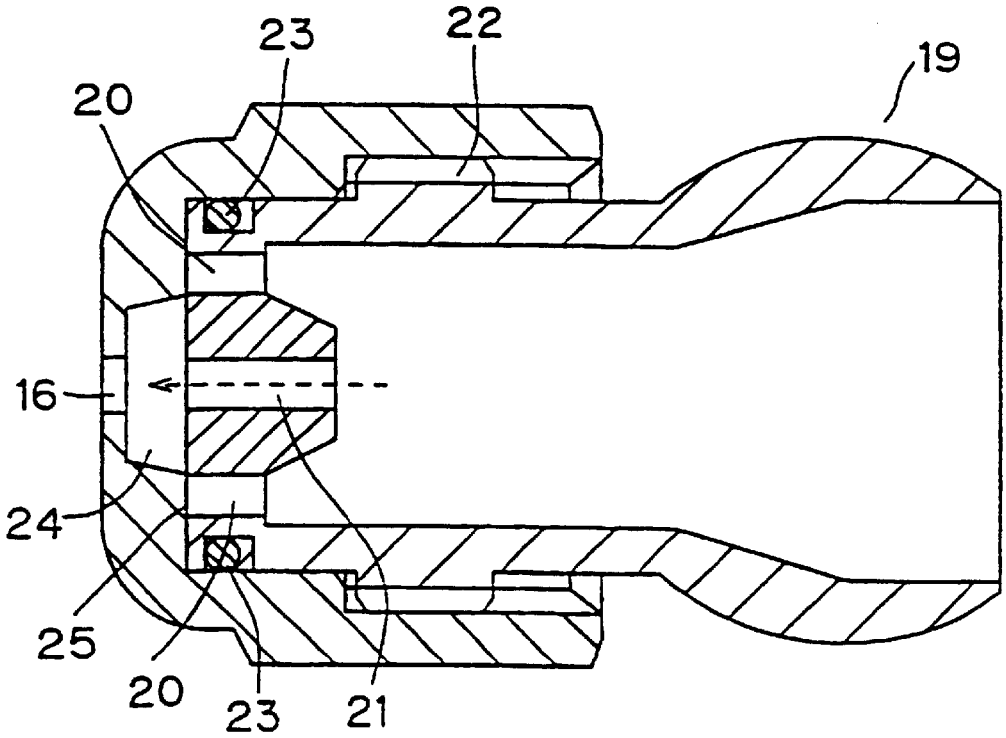
FIG. 10 is an operation explanatory diagram of the spray nozzle.

The fluid flowing into the swirl chamber 24 from three swirl holes 20 forms a swirl flow in the swirl chamber 24, and is injected from the injection hole 16. At this time, the swirl force of the swirl flow reaching the injection hole 16 varies with the distance of the swirl holes 20 and injection hole 16. That is, the spray angle injected from the injection hole 16 differs with the distance of the swirl holes 20 and injection hole 16 adjusted by the threaded portion 22. The relation between the spray angle and the distance of swirl holes 20 and injection hole 16 is shown in FIG. 9. In FIG. 9, the spray angle is maximum at the distance where the swirl force is largest, and as the adjusting amount from the distance is larger, the spray angle is smaller. When the distance of swirl holes 20 and injection hole 16 is increased from the distance showing the maximum spray angle, the swirl force attenuates gradually, and the spay angle becomes smaller. Or, when the distance of swirl holes 20 and injection hole 16 is decreased from the distance showing the maximum spray angle, swirl flow is not formed sufficiently, and the spray angle similarly becomes smaller. Further, as the distance of swirl holes 20 and injection hole 16 is decreased, as shown in FIG. 10, the swirl flow suppressing unit 25 abuts against the flow-out side surface of the swirl holes 20 to close the swirl holes 20. Therefore, the fluid flows into the swirl chamber 24 only from the central hole 21, and swirl flow is not generated, and the jet flow is almost straight.

As the swirl force increases, the spray angle is wider, and the mist particles of fluid are smaller, whereas, by decrease of swirl force, the spray angle becomes smaller and the mist particles of fluid become larger.

That is, by the threaded portion 22, the distance of swirl holes 20 and injection hole 16 can be adjusted, and the swirl holes 20 are closed by the swirl flow suppressing unit 25, and therefore it is possible to select freely depending on the situation of use, from a local straight jet flow, to a partial jet flow small in spray angle and large in mist particles and a jet flow large in spray angle and small in mist particles.

(4) Embodiment 4

Figure 11:
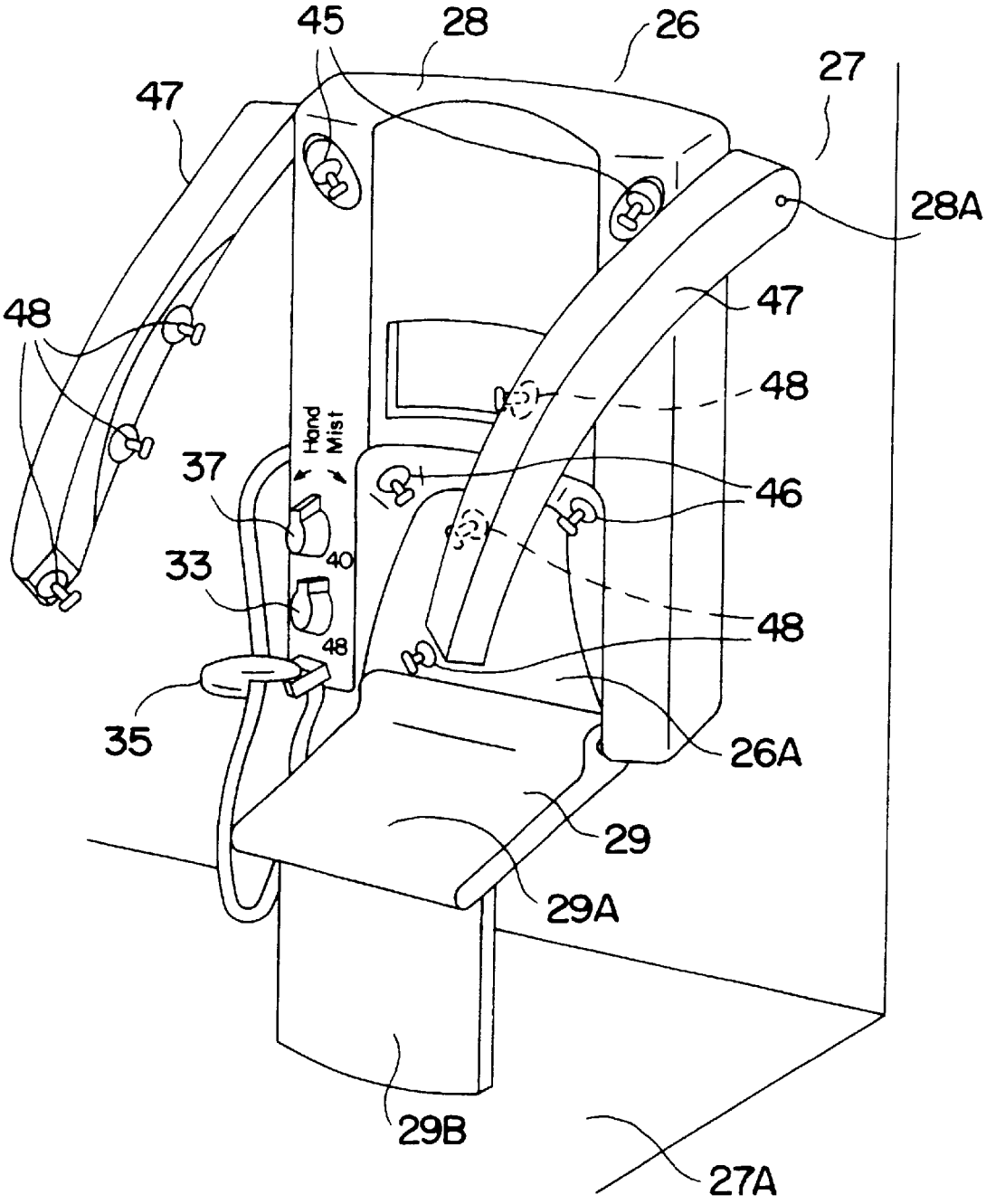
FIG. 11 is an appearance drawing of a shower apparatus in embodiment 4 of the invention.
Figure 12:
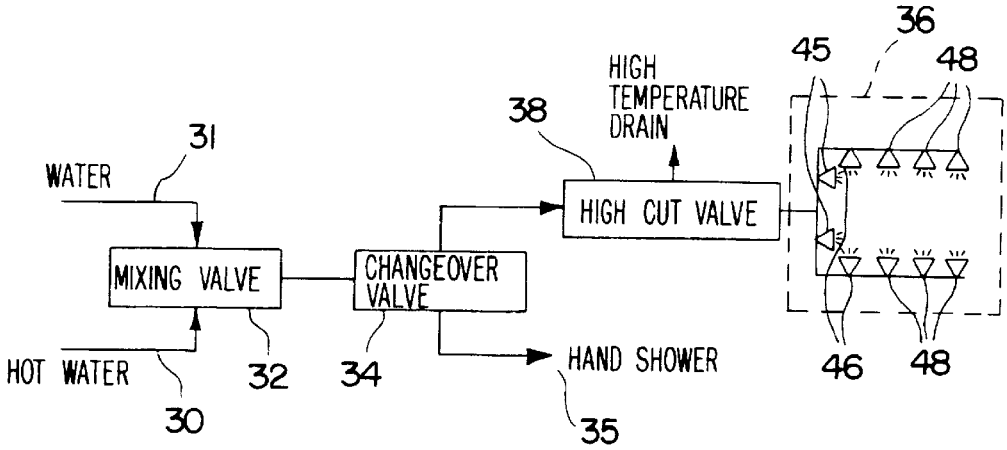
FIG. 12 is a block diagram of water and hot water feed system of the shower apparatus.

Embodiment 4 of the invention is described while referring to FIG. 11 and FIG. 12. FIG. 11 is an appearance drawing of a shower bath apparatus 26, and FIG. 12 is a block diagram of the shower bath apparatus 26.

The shower bath apparatus 26 is installed on a bath room wall 27, so that the user can take a shower while sitting on a chair 29 which is seat means foldable in a shower bath apparatus main body 28. The chair 29, or the seat means, is folded in its support plate 29B together when the seat unit 29A is lifted, and settles in a dent 28a in the shower bath apparatus main body 28. Since the support plate 29B is moved together, it is easy to fold in or take out the seat means 29.

Because of the foldable seat means 29, when the shower bath apparatus 26 and seat means 29 are not used, by stowing away the seat means 29, the washing area 27A in the bath room can be used widely if installed in the washing area 27A.

As the support unit, the support plate 29B supports the body weight of the user seated on the seat means 29 firmly on the floor of the washing area 27A, and it is rigid against the impact of sitting or use for years, and the seat means 29 is not broken to cause accident, and it is safe.

Reference numeral 30 is a hot water feed pipe for feeding hot water, and 31 is a water feed pipe for feeding water. The hot water feed pipe 30 and water feed pipe 31 communicate with a mixing valve 32, and the mixing valve 32 mixes hot water and water to a temperature set by temperature setting means 33. The temperature setting means 33 incorporates a stopper (not shown) as high temperature setting limiting means to prevent the setting temperature from exceeding 50° C. so that the user may not be exposed to extremely hot water by mistake.

A changeover valve 34 changes over the hot water mixed by the mixing valve 32 between a hand shower 35 and a mist shower 36, and also stops mixed water, and this operation is done by flow rate setting means 37.

Figure 13:
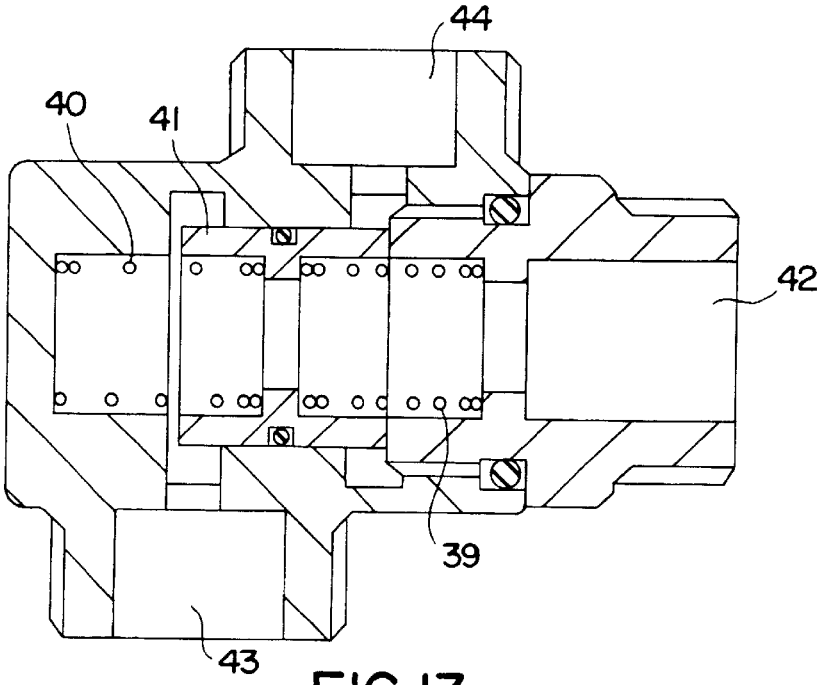
FIG. 13 is a structural diagram of a high cut valve of the shower apparatus.

At the downstream side of the mist shower 36 of the changeover valve 34, a high cut valve 38 is provided so that mixed hot water of high temperature may not be supplied to the mist shower 36 side when mixed hot water of high temperature is supplied by mistake or malfunction of the mixing valve 32. The high cut valve 38 is composed as shown in FIG. 13, in which a valve body 41 is thrust by a shape memory spring 39 as temperature sensing element and a bias spring 40, and the mixed hot water flows in from a flow inlet 42 communicating with the changeover valve 34. Usually, the thrusting force of the shape memory spring 39 is smaller than that of the bias spring 40, and the valve body 41 is thrust to the left side, and the mixed hot water is supplied from a flow outlet 43 into the mist shower 36. When mixed hot water of high temperature is supplied, the thrusting force of the shape memory spring 39 is increases to be larger than the thrusting force of the bias spring 40, and the valve body 41 is thrust to the right side, and high temperature water is discharged from a high temperature discharge port 44.

Figure 14:
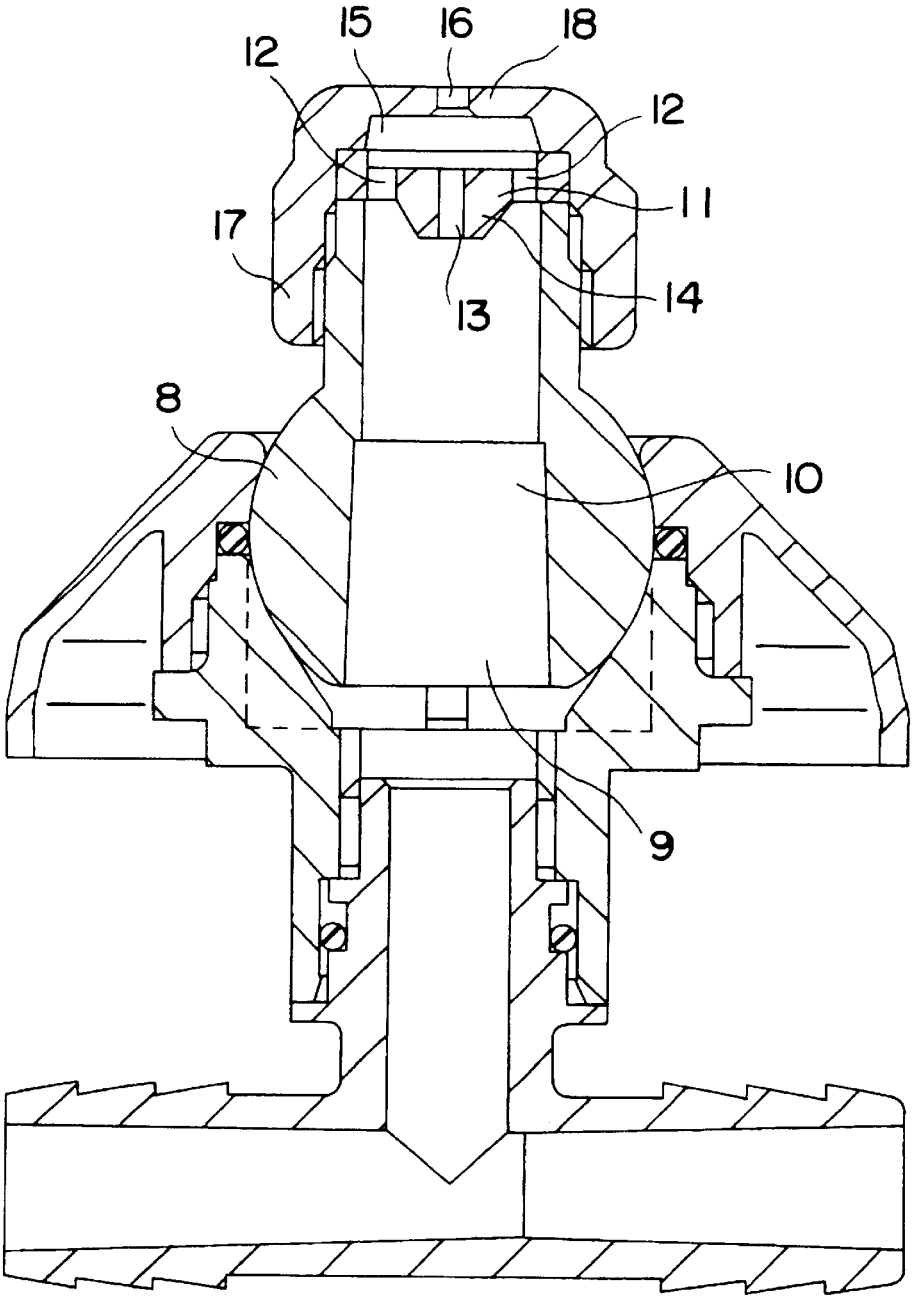
FIG. 14 is a sectional view of spray nozzle of the shower apparatus.

The mist shower 36 is composed of five pair of ten spray nozzles disposed symmetrically on right and left sides, and the same spray nozzle 8 as shown in embodiment 1 is used. Of the five pairs of spray nozzles, the pair of spray nozzles 45 provided in the upper part of the main body spray mist to the shoulder, and the spray nozzles 46 provided in the middle of the main body spray mist from the back to the waist. An arm 47 which is nozzle support means slidably attached to the shower bath apparatus main body 28 is furnished with three pairs of spray nozzles 48 for spraying mist beneath the neck of the body. Thus, the mist of the mixed hot water sprayed from the spray nozzles 45, 46, 48 envelops the entire body beneath the neck. Moreover, the spray nozzles 45, 46, 48 have, as shown in FIG. 14, a nozzle direction adjustable mechanism so that the nozzle spray direction may be adjusted depending on the height of the body.

In this constitution, the action of the embodiment is described below.

When using the hand shower, the flow rate setting means 37 as the manipulation unit of the changeover valve 34 is rotated to the hand shower side, and the changeover valve 34 is opened. As the changeover valve 34 is opened, hot water is supplied from the hot water feed pipe 30 and water feed pipe 31, and the supplied hot water is mixed in the mixing valve 32 to the temperature set by the temperature setting means 33. The mixed hot water is supplied to the hand shower 35 through the opened changeover valve 34.

When taking the mist shower 36 in seated position, the chair 29 accommodated in the shower apparatus main body 29 and the arm 47 are set as shown in FIG. 11. By the flow rate setting means 37, the changeover valve 34 is opened to the mist shower 36 side. The mixed hot water mixed by the mixing valve 32 reaches the high cut valve 38 through the changeover valve 34. At this time, depending on the supply temperature of the mixing valve 32, the high cut valve 38 is driven. That is, in the event of trouble of the mixing valve 32 or overshooting, if the mixed hot water exceeds 50° C., the thrusting force of the shape memory spring 39 increases to move the valve body 41 to the right direction, and the mixed hot water of high temperature is changed over from the flow outlet 43 to the high temperature discharge port 44, so that mixed hot water of high temperature may not be sprayed from the mist shower 36.

The spray nozzles 45, 46, 48 are same as the spray nozzle used in embodiment 1, and the incoming mixed hot water is atomized into a mist form, which is sprayed uniformly and in a wide range. The mixed hot water sprayed from ten nozzles envelops the whole body of the user in seated position, and a layer of mixed hot water is formed on the body surface, so that the same warmth as when bathing in a tub may be felt. The spray nozzles 45, 46, 48 are adjustable in the spray direction, and the arm 47 as the nozzle support means is also movable, so that the entire body may be exposed to the mist depending on the height of the user.

When taking the mist shower 36, in order to obtain the same warmth as when bathing in a tub by enveloping the whole body with the mist, the spray angle of the spray nozzles 45, 46, 48 must be at least 30° or more, or preferably 40° or more; otherwise more spray nozzles are needed. The minimum mixed hot water flow rate necessary for feeling warmth is 5 to 6 liters/min.

Figure 15:
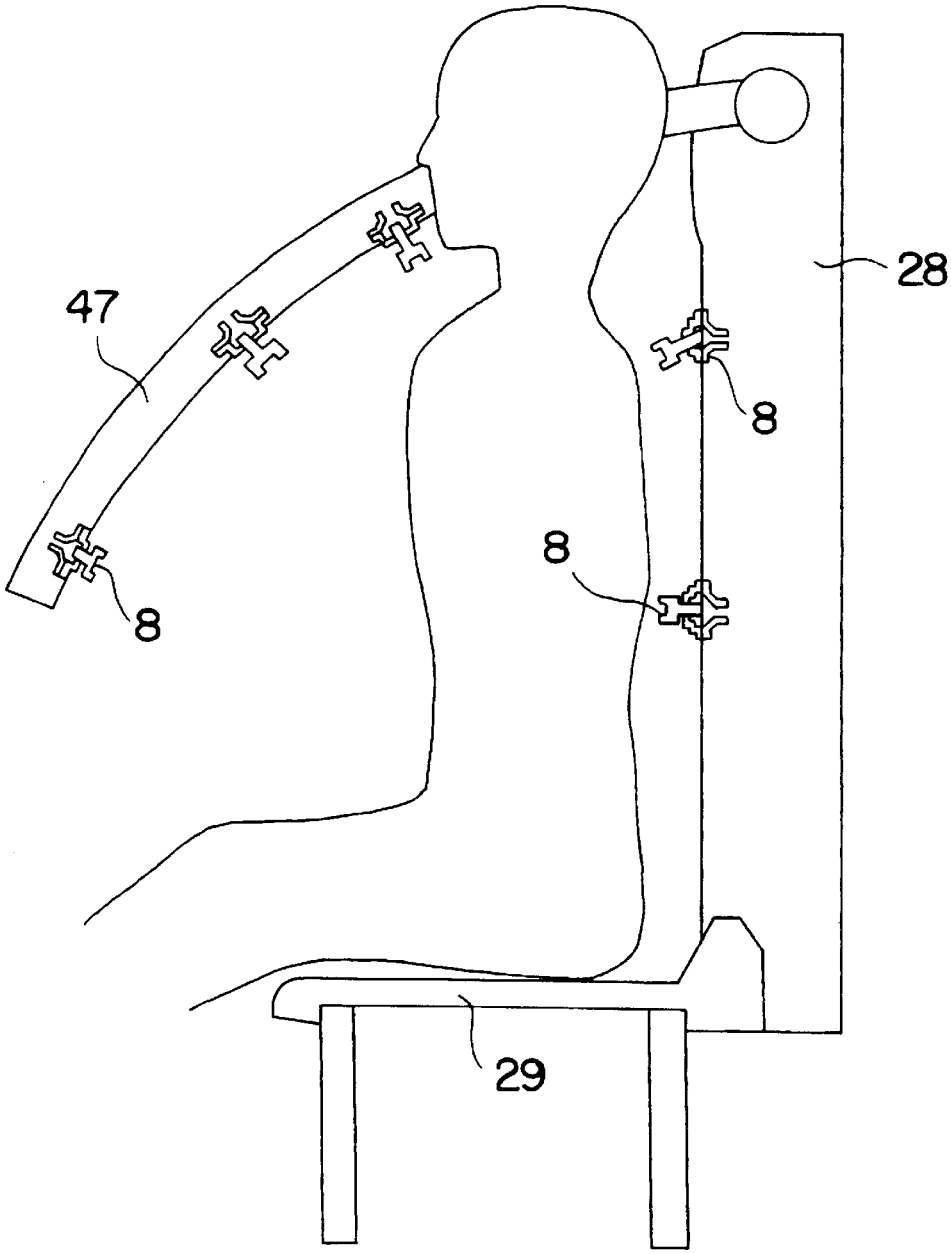
FIG. 15 is a structural diagram showing embodiment 5 of shower bath apparatus of the invention.

The relation between the mixed hot water pressure and spray angle of the spray nozzles 45, 46, 48 is shown in FIG. 15, which tells the mixed hot water pressure of 0.3 kg/cm$^2$ or more is needed for obtaining the spray angle of 40° or more. Besides, in the spray nozzles 45, 46, 48, since the swirl force of mixed hot water in the nozzles is large, at this pressure, the mist particles of mixed hot water can be reduced in size, and a favorable sense of use can be obtained. Moreover, the spray nozzles 45, 46, 48 include the swirl unit 12 for swirling the fluid flowing in through the flow passage 10, and the injection hole 16 disposed at the downstream side of the swirl unit 12 for injecting the swirled fluid, and the swirl unit 12 swirls the incoming fluid to provide the fluid with a swirl force, and from the swirl unit 12 to the injection hole 16, the mist particle size may be further decreased and the spray angle may be increased by the swirl force of the fluid at the injection hole 16.

Still more, the spray nozzles 45, 46, 48 include three swirl holes 16 as the swirl unit 12, and the three swirl units 12 swirl the incoming fluid to provide the fluid with a swirl force, and from the swirl units 12 to the injection hole 16, the flow from each swirl unit 12 is stably swirled without interfering mutually, so that the constitution of the swirl unit 12 is simplified, and the pressure loss of the fluid and the loss of swirl force generated by the swirl unit 12 are suppressed to minimum limits, so that a stable mist is realized at low cost.

That is, the spray nozzles 45, 46, 48 generate a swirl flow inside, and inject the fluid, and the fluid flowing into the spray nozzles 45, 46, 48 is swirled, and the fluid is provided with a swirl force, and the jet flow of small mist particle size and large spray angle can be applied to a wide range of the body at the same time.

In the shower apparatus 26, since the required mixed hot water pressure of the spray nozzles 45, 46, 48 is low, the whole body can be enveloped by the mist of small particle size at the main line pressure of water feed and hot water feed of general household, and pressurizing pump or pressurizing device for water feed or hot water feed is not particularly necessary.

According to embodiment 4 of the invention, the shower apparatus 26 for bathing in seated position is furnished with plural spray nozzles 45, 46, 48 for spraying uniformly at low pressure, wide spray angle, and small mist particle size, and therefore the water feed pressure and hot water feed pressure into the shower apparatus 26 necessary for enveloping the whole body with the mists and giving the same warmth as when bathing in a tub can be lowered, and pressurizing device or the like is not necessary in the general household.

Since the warmth can be obtained by the mixed hot water of low pressure, that is, the feel of flow rate is obtained, and hence the water consumption is decreased, so that it is economical.

In the seated position on the chair 29, moreover, since the whole body is enveloped with the mist from the spray nozzles 45, 46, 48 of the mist shower 36 to obtain warmth of bathing in a tub, the high water pressure as in bathing is not applied to the body, and changes in the heart rate and changes in the blood pressure are small, so that the load on the body is lessened. In particular, since the load on the body is lessened, it is effective to prevent bath room accidents of the elderly or handicapped people which are increasing recently.

In the embodiment, the spray nozzles 45, 46, 48 as explained in embodiment 1 are used in the shower apparatus 26, but same effects are obtained by using the spray nozzles described in embodiment 2.

Incidentally, by using the spray nozzle adjustable in the spray angle as mentioned in embodiment 3, instead of the spray nozzles 45, 46, 48 described in embodiment 1, the spray range can be adjusted depending on the physique of the user, so that the mist shower 26 may be used more favorably.

Although the plural nozzles in the embodiment are identical nozzles, the spray nozzles 45, 46 for spraying to the shoulders, the back and the waist may be replaced by the spray nozzles in embodiment 3 to apply the straight jet locally, so that the massaging effect for lumbago or stiff shoulder may be obtained as required.

In the embodiment, as far as sufficient water feed and hot water feed pressure is possible, the swirl holes 12 as swirl units are not limited to three positions, and same effects are obtained at two or four positions.

By the arm 47 which is nozzle support means provided with spray nozzles 48, since the spray nozzles 48 can be disposed so as to envelop the body with jet flow, the user in seated position is showered on the whole body as the jet flow from the spray nozzles 48 wide in spray angle envelops the body, so that a wide range of the body can be warmed at the same time.

The plural spray nozzles 48 are arranged so that the jet flows may be applied to the body by overlapping each other, and the blank interval of jet flow can be eliminated, and it is more effective for warming.

Besides, the spray nozzles 45, 46, 48 are designed to adjust freely the injection direction of the fluid, and the direction of jet flow may be freely adjusted freely depending on the physique or preference of the user so as to be showered in the optimum state.

The spray nozzles 45, 46, 48 have the jet flow variable means 22 for adjusting the jet flow pattern of fluid, and the user can adjust the jet flow variable means of the spray nozzles to adjust the state of the jet flow applied to the body, so that the shower bath suited to the preference of the user is realized.

By composing the nozzle support means for supporting the spray nozzles 48 as the arm 47, the jet flow from the spray nozzles 48 is applied uniformly on the body.

Moreover, the arm 47 is supported on the shower bath apparatus main body 28 and is adjustable in position, and therefore, when using the shower, the arm 47 can be adjusted to a proper position depending on the physique and preference of the user.

In the constitution of forming a passage for passing fluid in the arm 47 mounting the spray nozzles 48, it is not necessary to form the passage such as hose for feeding fluid into the spray nozzles 48 outside of the arm 47, and therefore a neat and functional shower bath apparatus 26 is realized without spoiling the appearance.

Besides, in the constitution of forming a passage for passing fluid, in the support shaft 28A for supporting the arm 47 on the shower bath apparatus main body 28, it is not necessary to form the passage such as hose for feeding fluid into the spray nozzles 48 outside of the support shaft 28A, so that there is no obstacle when rotating the arm 47 about the support shaft 28A.

The arm 47 is stowed away closely to the shower bath apparatus main body 28 and wall 27 by rotating about the support shaft 28A, and therefore when the shower is not used, the arm 47 can be put in the shower bath apparatus main body 28, and projection into the washing area 27A of the bath room is smaller, so that the washing area 27A can be used widely.

The arm 47 is adjustable in angle, and when using the shower, the arm 47 can be adjusted to a proper angle depending on the physique or preference of the user.

Since the arm 47 can be fixed at a desired position, a desired fixing position of the arm 47 may be selected depending on the physique or preference of the user when using the shower, so that the shower can be used by fixing at the selected position.

The arm 47 is designed to be movable when a force exceeding a set moment force is applied to the arm 47 in fixed state, and as the arm 47 is movable when loaded with a force exceeding the setting, the strength load to the shower bath apparatus main body 28 can be lessened.

The arms 47 are provided symmetrically on both right and left sides, and since the arms 47 mounting the spray nozzles 48 are symmetrical on both right and left sides, when using the shower, the jet flow may be applied uniformly to the shoulders, arms, chest, waist and feet on both sides of the body of the user.

Since the right and left arms 47 are designed to cooperate, when the user adjusts the position of the arms 47 according to the own height or stows away the arms 47, the both right and left arms 47 are moved simultaneously by manipulating only one, so that the both arms can be manipulated by one hand.

If a larger difference than specified occurs in the moment force applied on the right and left arms 47, the right and left arms 47 are adjustable separately, and since the right and left arms 47 mounting the spray nozzles 48 are adjustable individually, if, for example, desired to protect one arm or hand from jet flow due to injury, one arm 47 may be put aside or stowed away, so that the jet flow of the shower may not be applied to one arm.

The arm 47 is made of resin in whole or in part, and since the arm 47 is made of resin, as compared with the metal, it is free from uncomfortable cold sense or hot sense when contacting with part of the body, and it is light in weight and the strength for supporting the arm 47 can be lessened, and the arm 47 can be moved by a smaller effort.

Since the changeover valve 34 for changing over the hand shower 35 and the spray nozzles 45, 46, 48 is provided, the spray nozzles 45, 46, 48 for obtaining the warmth by enveloping the body with the jet flow, and the hand shower 35 held in hand for washing a desired part of the body can be used by changing over by the changeover valve 34.

The operation unit 37 for manipulating the changeover valve 34 is formed in a rotary knob shape for changing over the spray nozzles 45, 46, 48 and the hand shower 35 by rotating right or left, and therefore by twisting right or left the knob 37 as the operation unit of the changeover valve 34 provided in the shower bath apparatus main body 28, the spray nozzles 45, 46, 48 and the hand shower 35 can be used by changing over.

Also by using the changeover valve 34 for changing over the spray nozzles 45, 46, 48 and the hand shower 35, and also opening the spray nozzles 45, 46, 48 and the hand shower 35 simultaneously, the spray nozzles 45, 46, 48 for obtaining the warmth by enveloping the body with the jet flow, and the hand shower 35 held in hand for washing a desired part of the body can be used separately or simultaneously by changing over by the changeover valve 34.

The changeover valve 34 is designed to adjust the flow rate and to close, and therefore aside from changing over the mode of shower by the changeover valve 34, the shower flow rate can be adjusted or stopped.

The shower bath apparatus 26 includes fluid temperature setting means 33, and the jet flow temperature of the shower for enveloping the whole body in a wide range in seated position can be set freely.

At the upstream side of the changeover valve 34, the mixing valve 32 is provided for mixing hot water and cold water to adjust to a temperature determined by the temperature setting means 33, therefore since jet flow temperature of the shower for enveloping the whole body in a wide range in seated position can be adjusted freely, the shower bath is realized at a temperature preferable for the user.

The operation unit 37 for manipulating the changeover valve 34 and the temperature setting means 33 of the mixing valve 32 are disposed parallel to the shower bath apparatus main body 28, so that the user can manipulate quickly for setting temperature or changing over the spray nozzles 45, 46, 48 and the hand shower 35 in seated position.

The operation unit 37 for manipulating the changeover valve 34 is disposed at the right hand side position when the user is seated on the seat means 29, and the user can change over the spray nozzles 45, 46, 48 and the hand shower 35 by the right hand in seated position, and it is easy to handle.

The operation unit 37 for manipulating the changeover valve 34 is disposed at a position higher than the temperature setting means 33, and the user, for example, in seated position can search for the operation unit 37 by hand without particularly looking for, so that the spray nozzles 45, 46, 48 and hand shower 35 can be changed over in non-visible state.

Since the hand shower 35 is disposed at a nearly same height as the sitting position 29A of the seat means 29, the user can search for the hand shower 35 by hand and hold it in seated position, and also hot water from the hand shower 35 can be poured into a washbowl easily.

The hand shower 35 is disposed at a position lower than the operation unit 37 of the changeover valve 34, and therefore the hand shower 35 can be held by searching by hand, and moreover when manipulating the operation unit 37 of the changeover valve 34 while pouring out hot water from the hand shower 35, it can be manipulated without exposing the hand to the jet flow of the hand shower 35.

The shower bath apparatus 26 is provided with high temperature setting limiting means for preventing injection of high temperature water, and therefore if the user attempts to set the jet flow temperature to high temperature by mistake by the temperature setting means 33, critically high temperature is not set by the high temperature setting limiting means so that safe use is guaranteed. That is, in the case of the mixing faucet usually installed in the bath room, when the knob is turned to the high temperature side, the water side is closed, and the high temperature water side is opened fully, and very hot water comes out, but in the case of this embodiment, it is limited within 50° C. by the high temperature setting limiting means, and it is safe because temperature exceeding 50° C. is not set.

The shower bath apparatus 26 is provided with the high cut valve 38 for preventing injection of fluid of high temperature, and therefore if fluid of high temperature is supplied into the high cut valve 38, the high cut valve 38 prevents supply of high temperature fluid into the spray nozzles 45, 46, 48, so that high temperature fluid will not be injected to the user from the spray nozzles 45, 46, 48.

The shower bath apparatus 26 is provided with the high cut valve 38 for preventing injection of fluid of high temperature between the changeover valve 34 and spray nozzles 45, 46, 48, and therefore if high temperature fluid is supplied into the high cut valve 38 by mistake or malfunction of the mixing valve 32 or the like, the high cut valve 38 prevents supply of high temperature fluid into the spray nozzles 45, 46, 48, so that the high temperature fluid from the spray nozzles 45, 46, 48 will not be injected to the user.

The high cut valve 38 comprises the flow inlet 42 through which the fluid flows in, the flow outlet 43 through which the fluid flows out, the high temperature discharge port 44 for discharging high temperature fluid, the valve body 41 for changing over the flow outlet 43 and the high temperature discharge port 44, the temperature sensing element 39 for thrusting the valve body 41 in a direction for closing the flow outlet 43 when high temperature fluid is supplied, and the bias spring 40 for thrusting the valve body 41 in an opposite direction of the direction for thrusting the temperature sensing element 39, and therefore if the temperature of the fluid supplied from the flow inlet 42 is high, the temperature sensing element 39 thrusts the valve body 41 and the flow outlet 43 side is closed, while the high temperature discharge port 44 side is opened, and supply of high temperature fluid into the flow outlet 43 is prevented.

Meanwhile, the high cut valve 38 has its temperature sensing element 39 composed of shape memory spring, and as compared with the temperature sensing element of wax pellet or the like, the temperature sensing element 39 of shape memory spring is quick in response speed and the high cut valve 38 is simple in constitution.

(5) Embodiment 5

Figure 16:
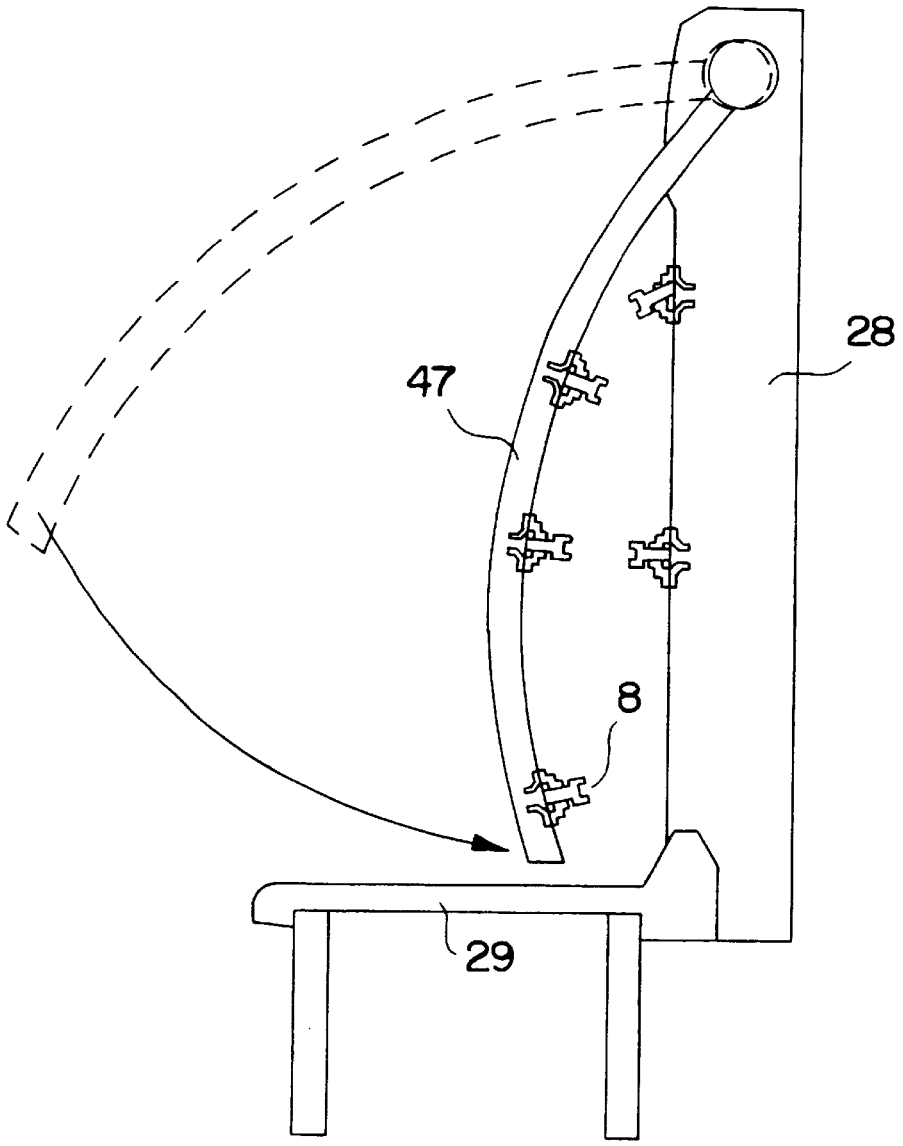
FIG. 16 is an operation explanatory diagram of arm portion in the same embodiment.
Figure 20:
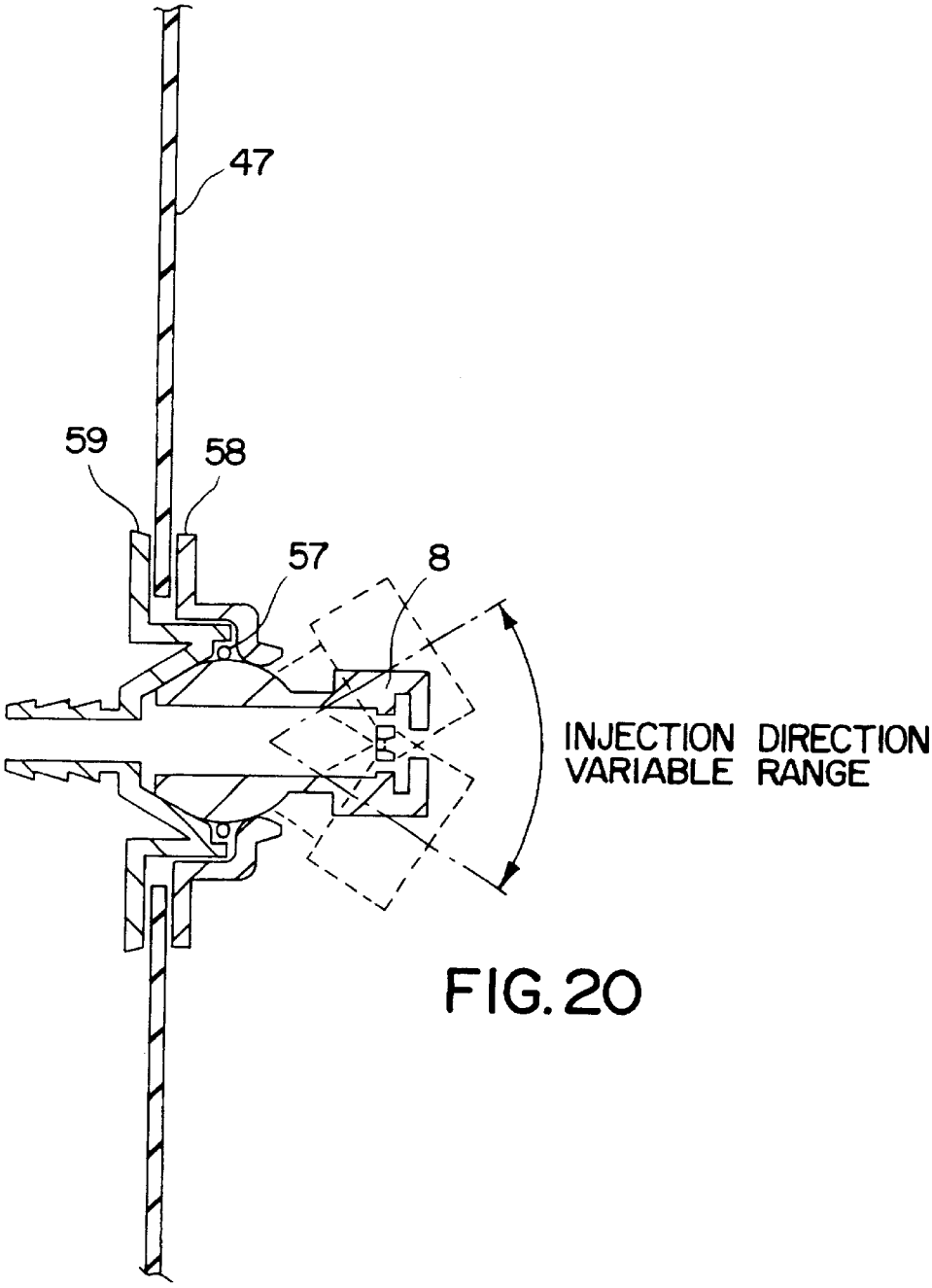
FIG. 20 is a partial detail diagram of nozzle portion in a shower bath apparatus of the invention.
Figure 21:
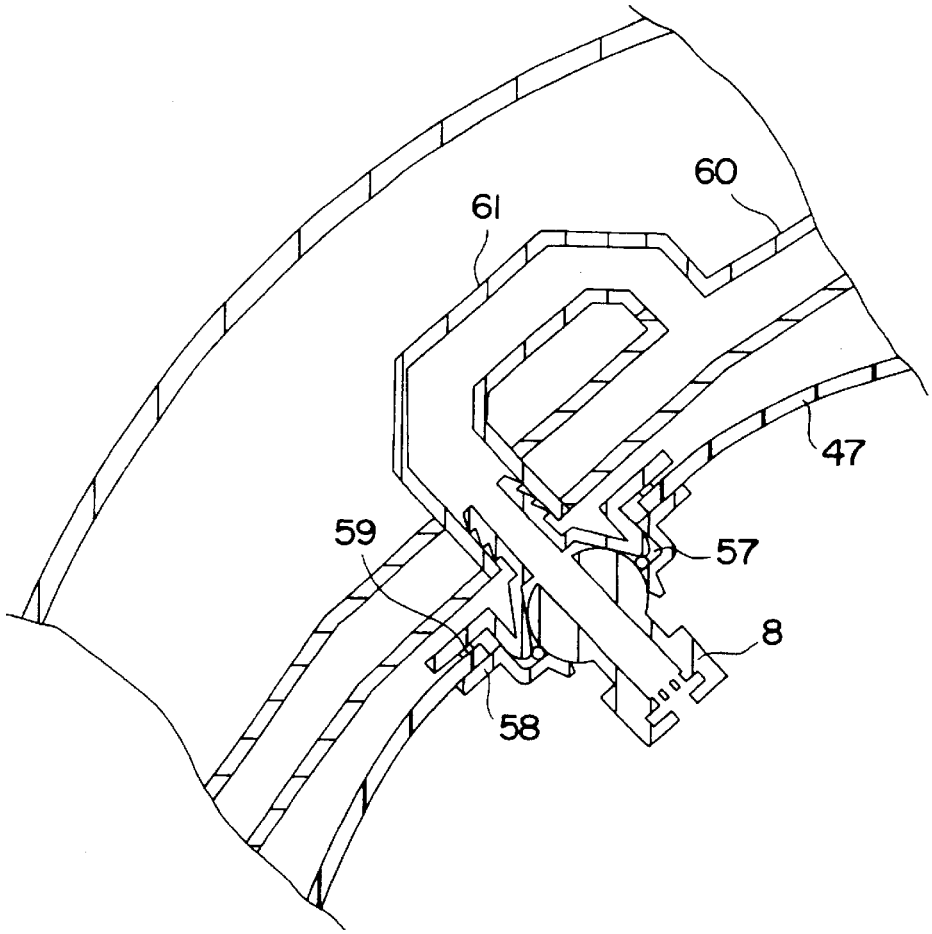
FIG. 21 is a partial detail diagram of nozzle mounting portion to the same arm.

Embodiment 5 of the invention is described below while referring to FIG. 15, FIG. 16, FIG. 17, FIG. 18, FIGS. 19(a), (b), (c), (d), FIG. 20, and FIG. 21. FIG. 15 is a structural diagram of embodiment 5, FIG. 16 is an operation explanatory diagram of an arm 47 as nozzle support means in embodiment 5, FIG. 17 is a partial detail view near support shaft 28A of the arm 47 in embodiment 5, FIG. 18 is a partial detail view of movable part of the arm 47 in embodiment 5, FIGS. 19(a), (b), (c), (d) are operation explanatory diagrams of the movable part of the arm 47, FIG. 20 is a partial detail view near a spray nozzle 8, and FIG. 21 is a partial detail view of spray nozzle mounting portion onto the arm 47 in embodiment 5.

In FIG. 15, reference numeral 28 is a shower bath apparatus main body, 29 is seat means on which the user sits, being supported by the shower bath apparatus main body 28, 8 is a spray nozzle for spraying hot water to the user in seated position, and 47 is an arm having the spray nozzle 8 and rotatably supported at one end by the shower bath apparatus main body 28. The seat means 29 is fixed or movably supported in the shower bath apparatus main body 28. One or plural spray nozzles 8 are attached to the shower bath apparatus main body 28 or the arm 47. The arm 47 is installed movably in the shower bath apparatus main body 28.

Figure 17:
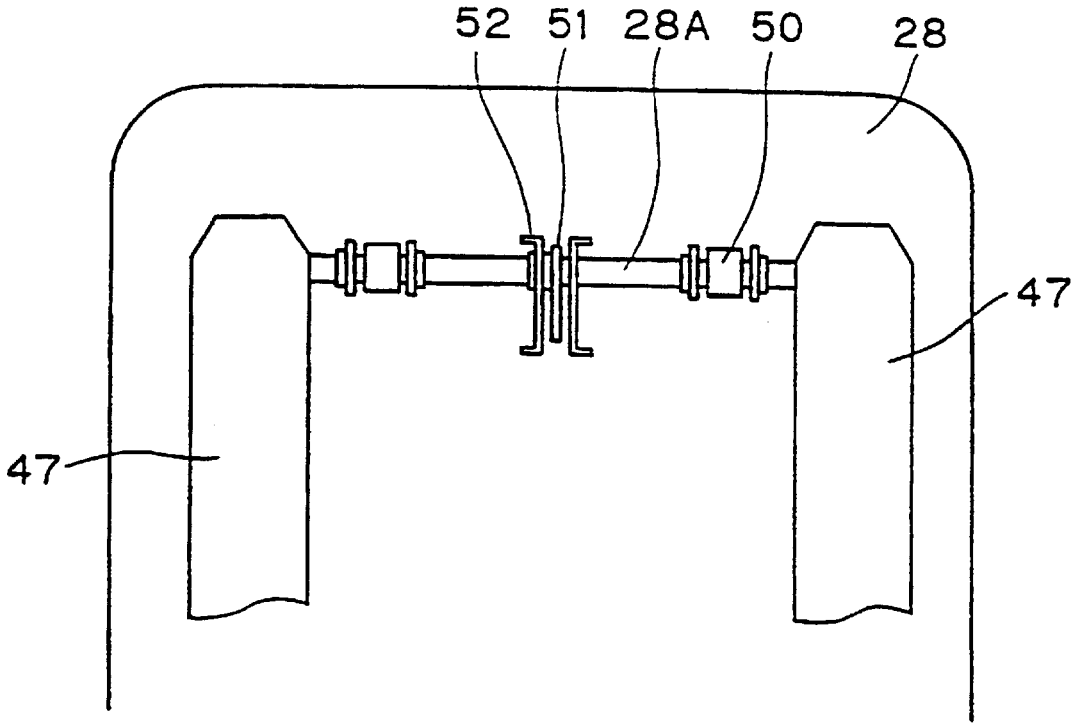
FIG. 17 is a partial detail diagram of arm support portion in the same embodiment.

In FIG. 17, reference numeral 50 is a shaft support member for supporting a support shaft 28A for coupling the arms 47 on the shower bath apparatus main body 28, 51 is a shaft fixing plate for fixing or releasing rotary move of the support shaft 28A, and 52 is a shaft fixing plate support member for fixing or releasing the rotary move of the support shaft 28A in combination with the shaft fixing plate 51. The shaft support member 50 and shaft fixing plate support member 52 are provided in the shower bath apparatus main body 28. The shaft fixing plate 51 is fixed on the support shaft 28A.

Figure 18:
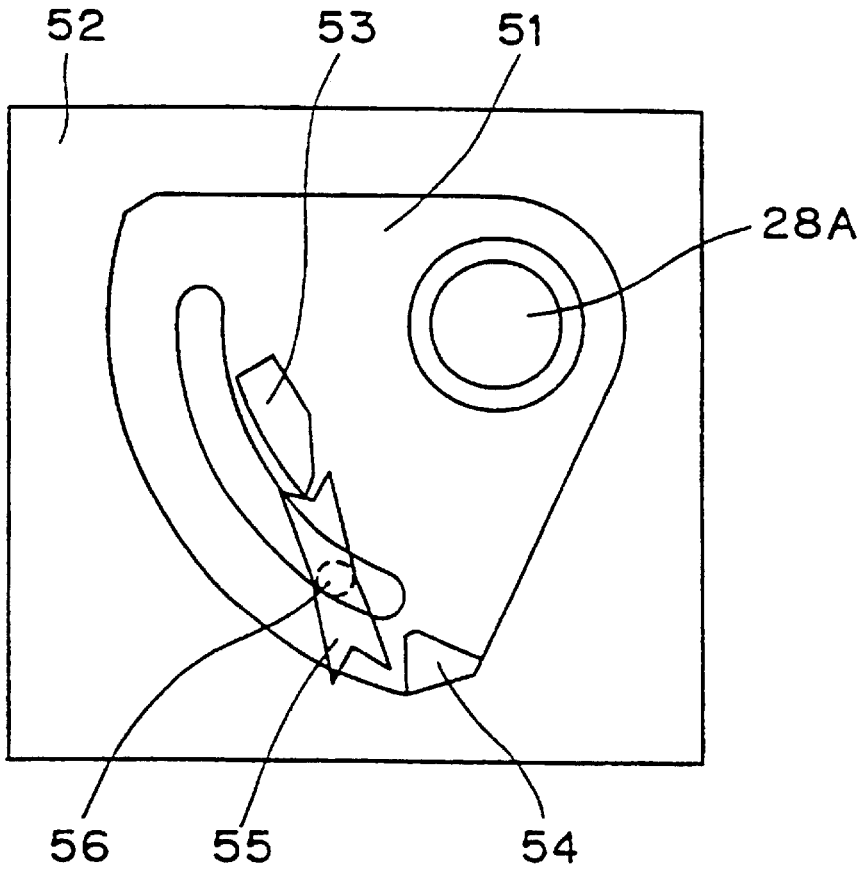
FIG. 18 is a partial detail diagram of arm movable portion in the same embodiment.
Figure 19:
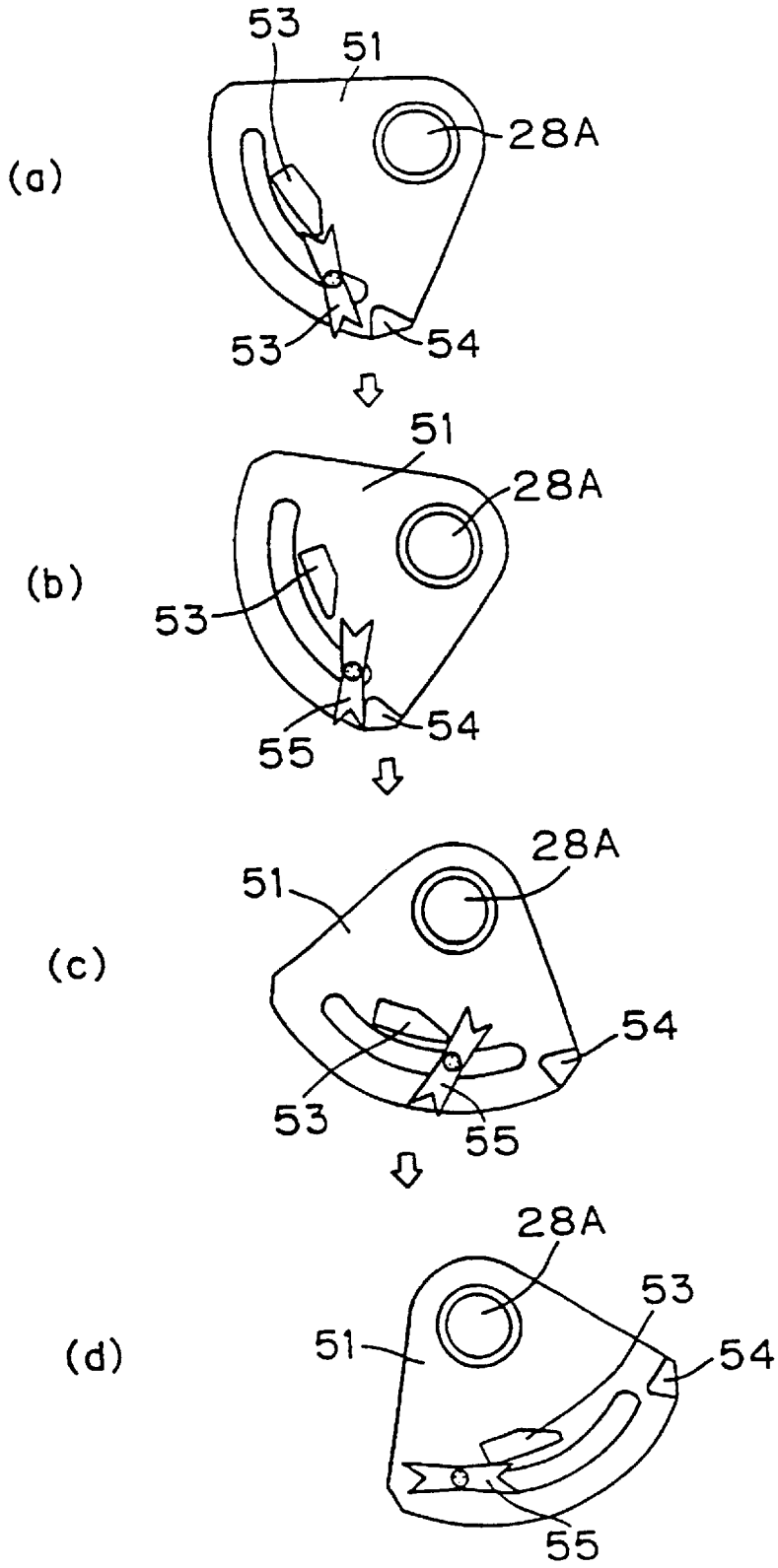
FIGS. 19(a), (b), (c), (d) are operation explanatory diagrams of arm movable portion in the same embodiment.

In FIG. 18, reference numeral 28A is the support shaft, 51 is the shaft fixing plate, 52 is the shaft fixing plate support member, 53 is a fixing position specifying pin, 54 is a rotating angle changing pin, 55 is a rotor, and 56 is a rotor mounting pin. The shaft fixing plate 51 is fixed on the support shaft 28A. The fixing position specifying pin 53 and rotating angle changing pin 54 are fixed on the shaft fixing plate 51. The rotor 55 is rotatably supported on the shaft fixing plate support member 52 by means of the rotor mounting pin 56.

In FIG. 20, reference numeral 8 is a nozzle, 57 is an O-ring for sealing, 58 is a nozzle holding plate, and 59 is a nozzle fixing plate. The nozzle holding plate 58 and nozzle fixing plate 59 are supported in a form of gripping part of the constituent member of the shower bath apparatus main body 28 or the arm 47. The O-ring 57 is installed so as to seal the nozzle 8 by the nozzle holding plate 58 and nozzle fixing plate 59. The nozzle 8 is compressed to the nozzle fixing plate 59 by means of the nozzle holding plate 58. The dotted line indicates the selection range of nozzle injection direction of the nozzle 8.

In FIG. 21, reference numeral 47 is a resin-made arm, 48 is a spray nozzle, 57 is the O-ring for sealing, 58 is the nozzle holding plate, 59 is the nozzle fixing plate, 60 is a passage, and 61 is a coupling pipe. The nozzle holding plate 58 and nozzle fixing plate 59 are supported in a form of gripping the resin surface of the arm 47. The O-ring 57 is installed so as to seal the nozzle 48 by the nozzle holding plate 58 and nozzle fixing plate 59. The nozzle 8 is compressed to the nozzle fixing plate 59 by means of the nozzle holding plate 58.

The operation and action are described below. First, the user moves the arm 47 from the position indicated by dotted line in FIG. 16 which is the bathing position, to a position of solid line so as not to interfere with the arm 47, and sits on the seat means 29. When moving, as shown in FIGS. 19(a) to (d), the arm 47 is lifted slightly from the position of dotted line in FIG. 18, then the rotor 55 is separated from the fixing position specifying pin 53, and the angle is changed by the rotor angle changing pin 54, so that the shaft fixing plate 51, support shaft 28A, and arm 47 can rotate largely. Therefore, in this state, the leading end portion at the opposite side of the fulcrum supported by the shower bath apparatus main body 28 of the arm 47 is brought closer to the shower bath apparatus main body 28. After being seated, the leading end portion at the opposite side of the fulcrum supported by the shower bath apparatus main body 28 of the arm 47 is moved to be apart from the shower bath apparatus main body 28, and the arm 47 is moved from the position of solid line to the position of dotted line in FIG. 16. By the manipulation of the user, the hot water is injected from the spray nozzle 8 to the user. When bathing is over, to set aside the arm 47, the user moves the arm from the position indicated by dotted line in FIG. 2 at the bathing position to the position of solid line, and leaves the seat means 29. The passage 60 to the spray nozzle 8 is raised in temperature by hot water, but it is incorporated in the resin-made arm 47 and is not directly exposed to the body of the user. Up to the nozzle position of the nozzle 8 indicated by dotted line in FIG. 20, the user can turn about the spherical portion of the nozzle 8 compressed by the nozzle holding plate 58, so that the user can freely select the injection direction of the hot water injecting means.

Thus, according to the embodiment, comprising the shower bath apparatus main body 28, the chair 29 as seat means on which the user sits, the spray nozzle 8 for injecting hot water to the seated user, and the arm 47 supported by the shower bath apparatus main body 28, since the arm 47 is movable, the arm 47 can be moved according to the bathing behavior.

Moreover, the leading end of the arm 47 can be brought closer to the shower bath apparatus main body 28, and when the user stands up and moves, or when the bath room is used by a healthy person, not an elderly person weak in physical strength, the projection of the arm 47 from the wall can be shortened.

At least one of the spray nozzles 8 for injecting hot water to the user in seated-position is attached to the arm 47 supported by the shower bath apparatus main body 28, the hot water can be injected from the side or front of the user.

The arm 47 is made of resin, in whole or in part, and the passage to the spray nozzle 8 is accommodated inside of the arm 47, and therefore the passage heated to high temperature by the hot water is not directly exposed to the body of the user.

Still more, since the injection direction of the spray nozzle 8 can be freely selected, the whole body can be warmed simultaneously in the injecting direction suited to the physique of the user.

(6) Embodiment 6

Figure 22:
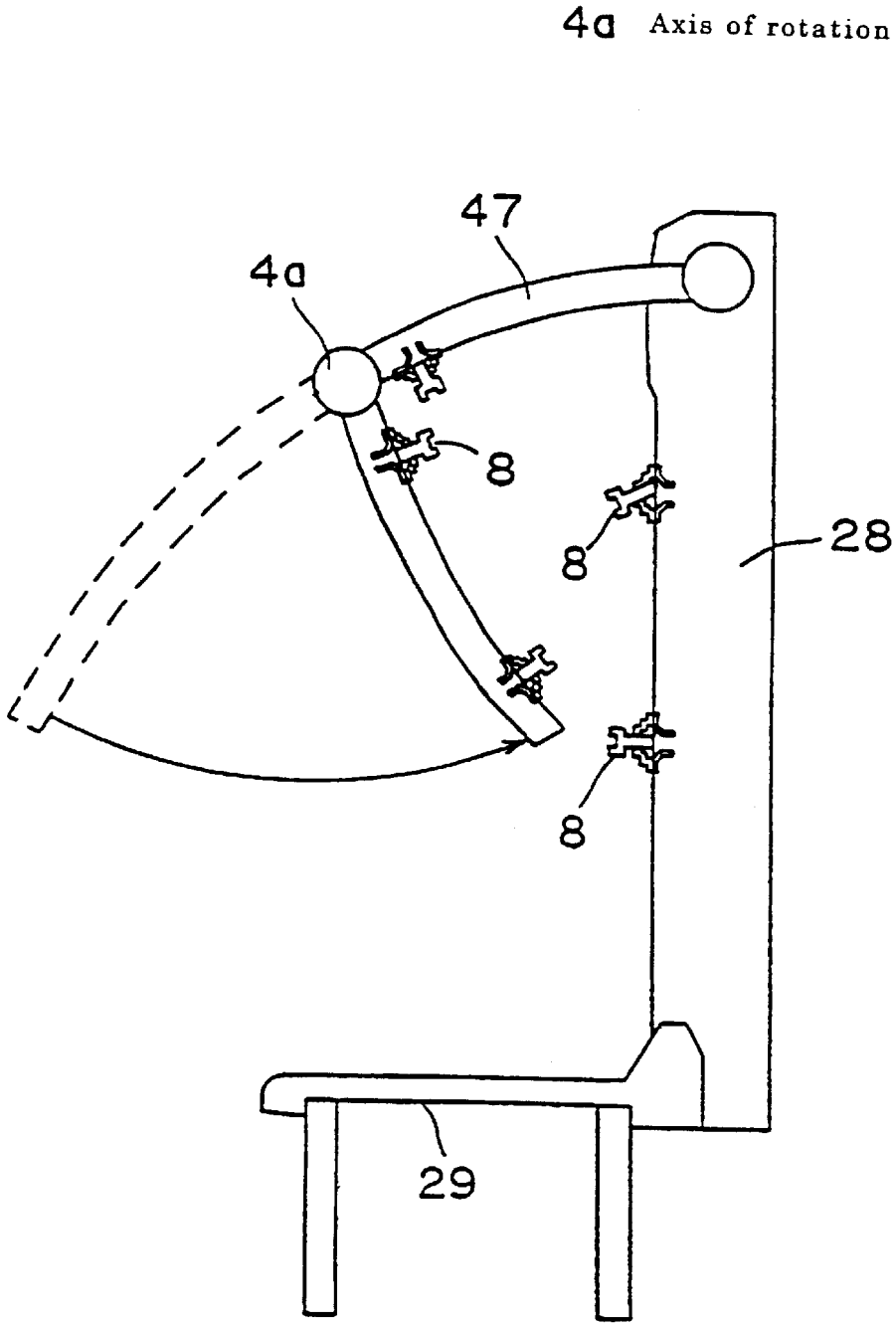
FIG. 22 is a structural diagram showing embodiment 6 of shower bath apparatus of the invention.

Embodiment 6 of the invention is described below by referring to FIG. 22. FIG. 22 is a structural diagram of embodiment 6.

What differs from embodiment 5 is that the arm 47 includes at least one rotary shaft 4a.

Same reference numerals as in embodiment 5 refer to a same structure, of which explanation is omitted.

The operation and action are described below. The user moves the arm 47 from the position indicated by dotted line in FIG. 22 which is the bathing position, to a position of solid line so that the leading end of the arm 47 may be close to the shower bath apparatus main body 28. After being seated, the leading end portion of the arm 47 is moved to be apart from the shower bath apparatus main body 28, and the arm is moved from the position of solid line to the position of dotted line in FIG. 22. By the manipulation of the user, the hot water is injected from the spray nozzle 8 to the user. When bathing is over, the user moves the arm from the position indicated by dotted line in FIG. 22 at the bathing position to the position of solid line, and leaves the seat means 29.

Thus, according to the embodiment, comprising the shower bath apparatus main body 28, the chair 29 as seat means on which the user sits, the spray nozzle 8 for injecting hot water to the seated user, and the arm 47 supported by the shower bath apparatus main body 28, the arm 47 includes at least one rotary shaft 4a on its way, since the arm 47 is movable, the arm 47 can be moved according to the bathing behavior.

Since the arm 47 has at least one rotary shaft 4a on its way and the leading end portion of the arm 47 can be brought closer to the shower bath apparatus main body 28, when the user stands up and moves, or when the bath room is used by a healthy person, not an elderly person weak in physical strength, the projection of the arm 47 from the wall can be shortened.

(7) Embodiment 7

Figure 23:
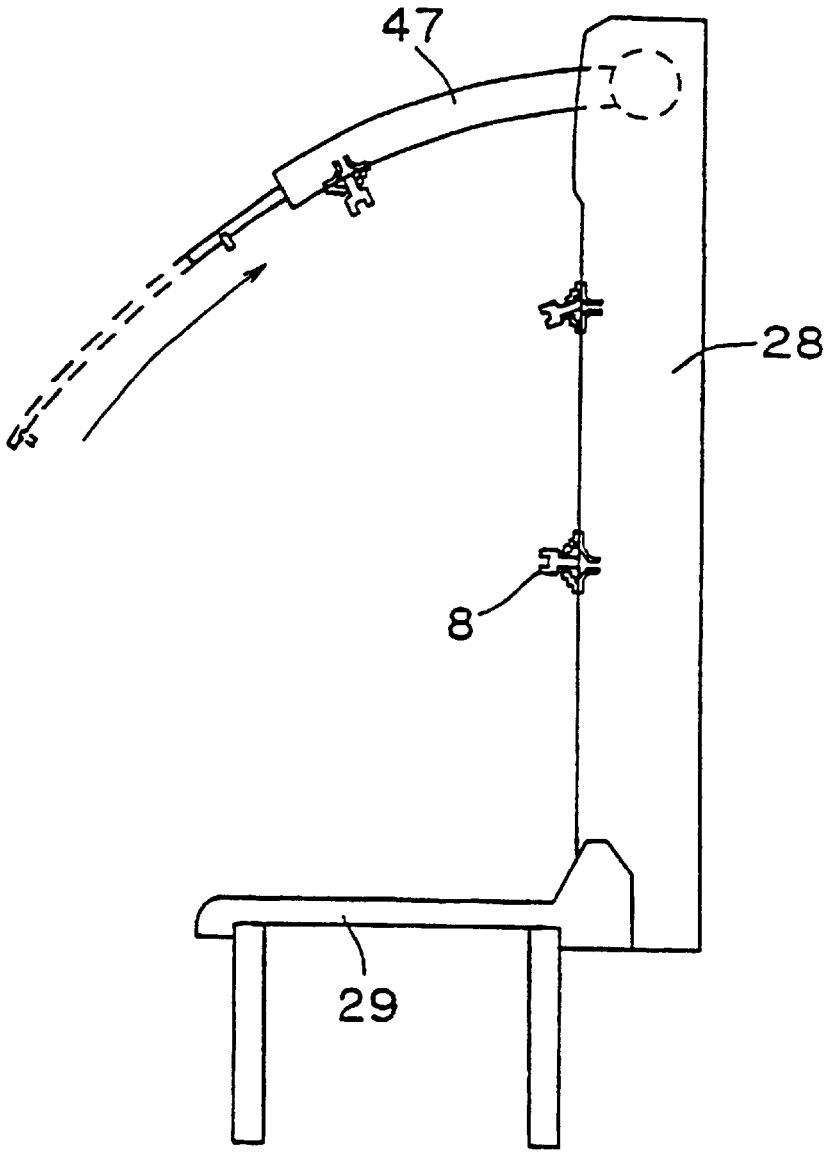
FIG. 23 is a structural diagram showing embodiment 7 of shower bath apparatus of the invention.

Embodiment 7 of the invention is described below by referring to FIG. 23. FIG. 23 is a structural diagram of embodiment 7.

What differs from embodiment 5 is that the arm 47 includes at least one sliding part, and is expandable.

Same reference numerals as in embodiment 5 refer to a same structure, of which explanation is omitted.

The operation and action are described below. The user moves the arm 47 from the position indicated by dotted line in FIG. 23 which is the bathing position, to a position of solid line so that the leading end of the arm 47 may be close to the shower bath apparatus main body 28. After being seated, the leading end portion of the arm 47 is moved to be apart from the shower bath apparatus main body 28, and the arm 47 is moved from the position of solid line to the position of dotted line in FIG. 23. By the manipulation of the user, the hot water is injected from the spray nozzle 8 to the user. When bathing is over, the user moves the arm 47 from the position indicated by dotted line in FIG. 23 at the bathing position to the position of solid line, and leaves the seat means 29.

Thus, according to the embodiment, comprising the shower bath apparatus main body 28, the chair 29 as seat means on which the user sits, the spray nozzle 8 for injecting hot water to the seated user, and the arm 47 supported by the shower bath apparatus main body 28, the arm 47 includes at least one sliding part and is expandable, since the arm 47 is movable, the arm 47 can be moved according to the bathing behavior.

Since the arm 47 has at least one sliding part and is expandable, and the leading end portion of the arm 47 can be brought closer to the shower bath apparatus main body 28, when the user stands up and moves, or when the bath room is used by a healthy person, not an elderly person weak in physical strength, the projection of the arm 47 from the wall can be shortened.

(8) Embodiment 8

Figure 24:
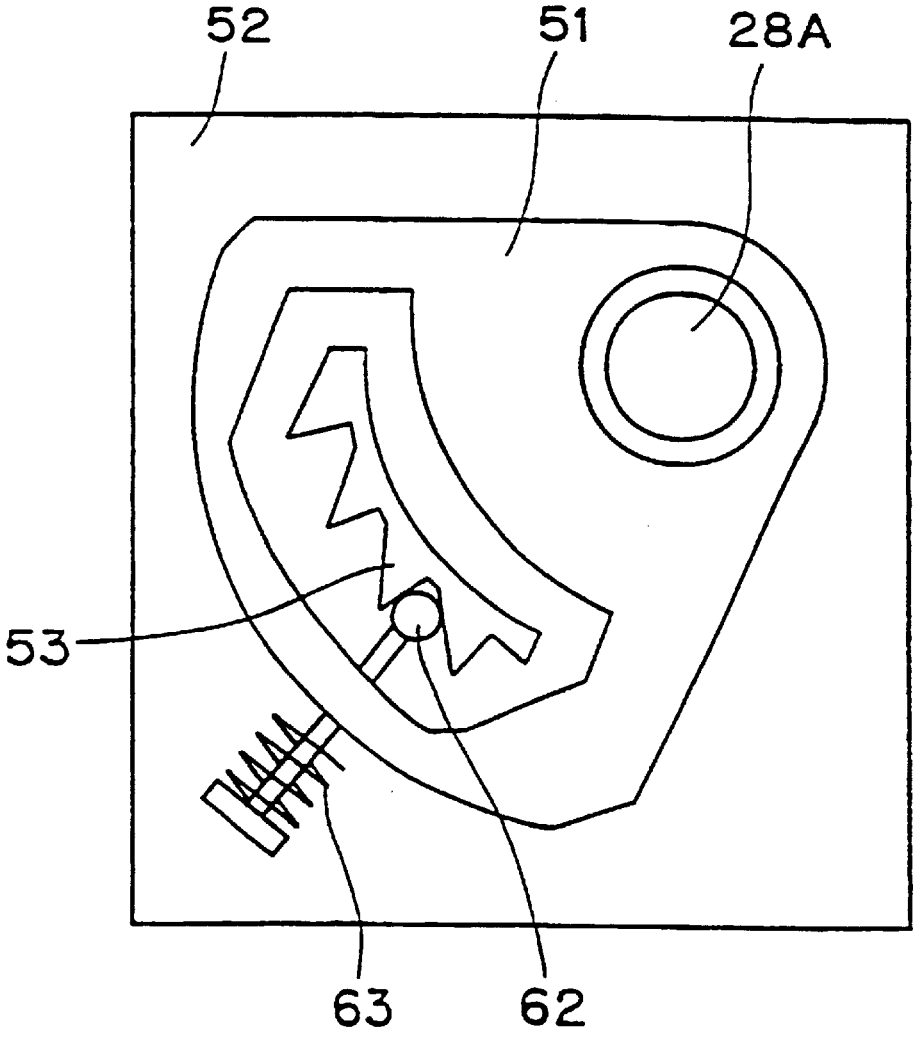
FIG. 24 is a structural diagram showing embodiment 8 of shower bath apparatus of the invention.
Figure 25:
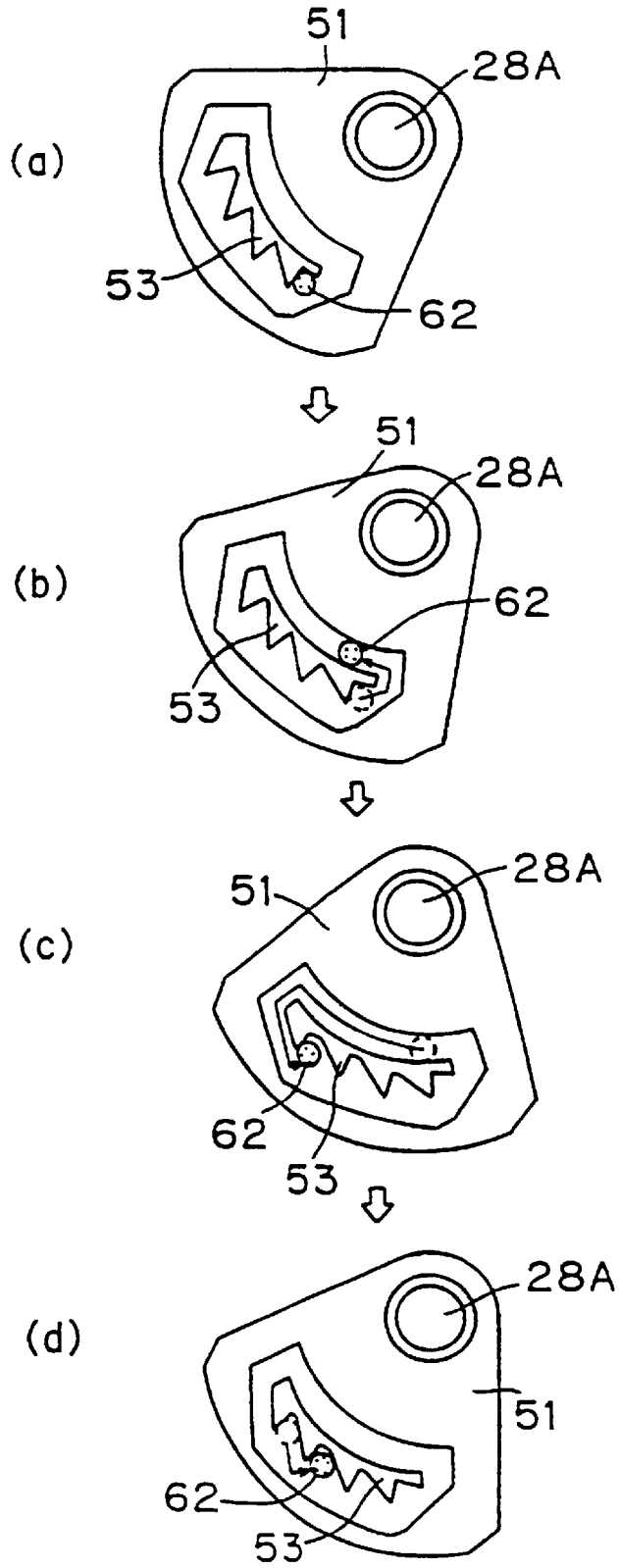
FIGS. 25(a), (b), (c), (d) are operation explanatory diagrams of arm movable portion in the same embodiment.

Embodiment 8 of the invention is described below while referring to FIG. 16, FIG. 24, and FIGS. 25(a), (b), (c), (d). FIG. 24 is a structural diagram of embodiment 8, and FIGS. 25(a), (b), (c), (d) are operation explanatory diagrams of the arm movable portion.

What differs from embodiment 5 is that the support point of the arm 47 supported by the shower bath apparatus main body 28 is selectable in the fixing position when moving upward, according to the structure shown in FIG. 24, and can be moved without selecting the fixing position when moving downward. In FIG. 24, reference numeral 62 is a fixing pin, and 63 is a spring for compressing the fixing pin 62 to the fixing position specifying pin 53. The fixing position specifying pin 53 is fixed in the shaft fixing plate 51. The fixing pin 62 is supported by the spring 63. The spring 63 is supported by the shaft fixing plate support member 52.

Same reference numerals as in embodiment 5 refer to a same structure, of which explanation is omitted.

The operation and action are described below relating to an example of using in the arm structure of the embodiment. The user moves the arm 47 from the position indicated by dotted line in FIG. 16 which is the bathing position, to a position of solid line so that the leading end of the arm 47 may be close to the shower bath apparatus main body 28. When moving, as shown in FIGS. 25(a) to (d), as the arm 47 is lifted slightly from the position of the dotted line in FIG. 16, the fixing pin 62 fitted at the lowest end position of the fixing position specifying pin 53 is moved around to the back side of the fixing position specifying pin 53, and the shaft fixing plate 51, support shaft 28A and the arm 47 can rotate largely, and the leading end portion at the opposite side of the fulcrum supported on the shower bath apparatus main body 28 of the arm 47 is brought closer to the shower bath apparatus main body 28. After being seated, the leading end portion of the arm 47 is moved to be apart from the shower bath apparatus main body 28, and the fixing pin 62 fitted in the highest end position of the fixing end specifying pin 53 settles at one lower position from the highest end position. Repeating this operation sequentially, while selecting the fixing position, the leading end portion at the opposite side of the fulcrum supported on the shower bath apparatus main body 28 of the arm 47 is moved away from the shower bath apparatus main body 28, and the move of the arm 47 is stopped at a position desired by the user, so that shower bathing can be started.

Thus, according to the embodiment, the support point of the arm 47 supported by the shower bath apparatus main body 28 can be fixed, and the fixing position can be selected when moving upward, and when moving downward, it is allowed to move without selecting the fixing position, and therefore by using the arm 47 as an auxiliary hand rail when standing or sitting, the user can stand and sit by holding it easily, and moreover since the fixing position can be selected, the height of the arm 47 as the hand rail can be adjusted.

(9) Embodiment 9

Figure 26:
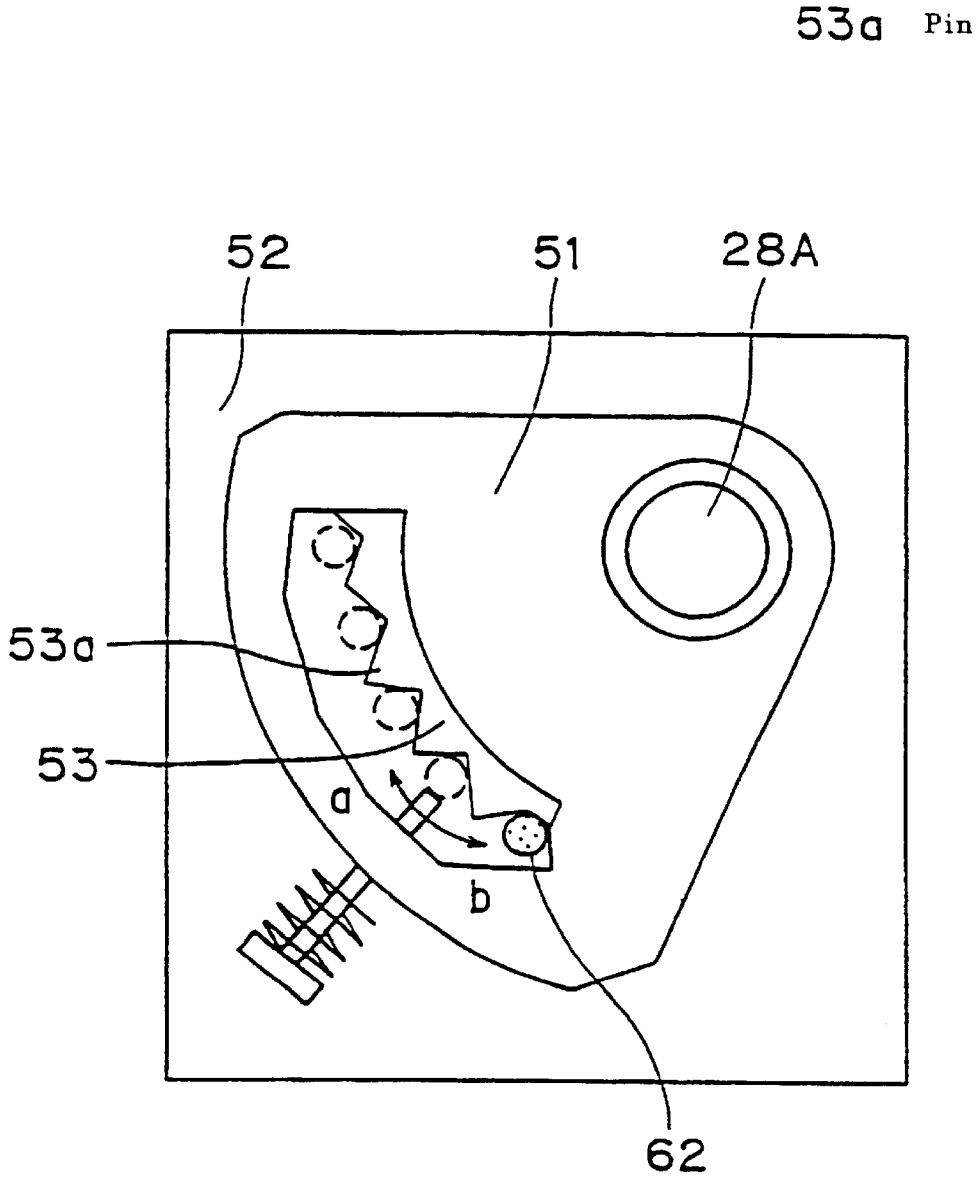
FIG. 26 is a structural diagram showing embodiment 9 of shower bath apparatus of the invention.
Figure 27:
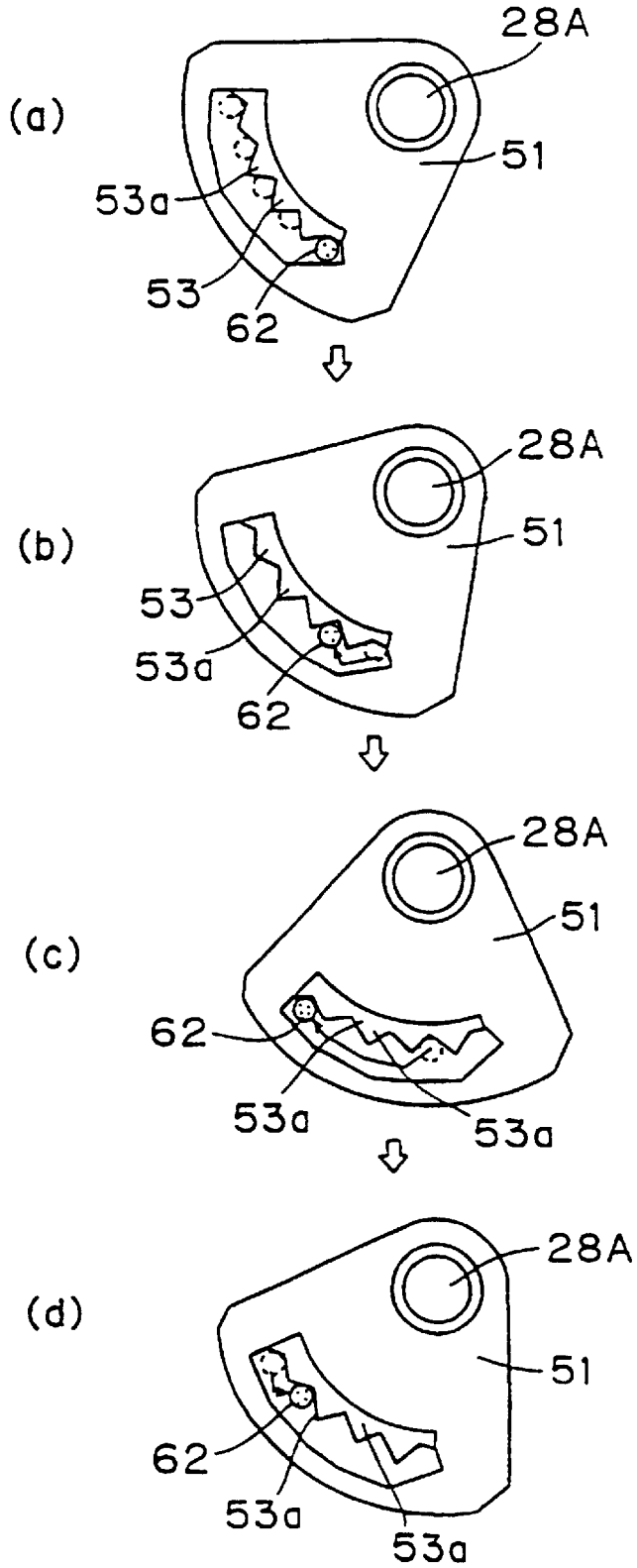
FIGS. 27(a), (b), (c), (d) are operation explanatory diagrams of arm movable portion in the same embodiment.

Embodiment 9 of the invention is described below while referring to FIG. 16, FIG. 26, and FIGS. 27(a), (b), (c), (d). FIG. 26 is a structural diagram of embodiment 9, and FIGS. 27(a), (b), (c), (d) are operation explanatory diagrams of the arm movable portion.

What differs from embodiment 5 is that the support point of the arm 47 supported by the shower bath apparatus main body 28 is capable of moving the slope angle of each pin 53a of the fixing position specifying pin 53 in the direction of either arrow a or b by the fixed pin 62 as shown in FIG. 26, and is held at that position.

Same reference numerals as in embodiment 5 refer to a same structure, of which explanation is omitted.

The operation and action are described below relating to an example of using in the arm structure of the embodiment. The user moves the arm 47 from the position indicated by dotted line in FIG. 16 which is the bathing position, to a position of solid line so that the leading end of the arm 47 may be close to the shower bath apparatus main body 28. When moving, as shown in FIGS. 27(a) to (d), as the arm 47 is lowered slightly from the position of the dotted line in FIG. 16, the fixing pin 62 fitted at the lowest end position of the fixing position specifying pin 53 settles at one position higher from the lowest end position. Repeating the similar action thereafter, the leading end portion of the arm 47 is brought closer to the shower bath apparatus main body 28. After being seated, the leading end portion of the arm 47 is moved to be apart from the shower bath apparatus main body 28, and the fixing pin 62 fitted in the highest end position of the fixing end specifying pin 53 settles at one lower position from the highest end position. Repeating this operation sequentially, while selecting the fixing position, the leading end portion of the arm 47 is moved away from the shower bath apparatus main body 28, and the move of the arm 47 is stopped at a position desired by the user, so that shower bathing can be started.

Thus, according to the embodiment, the support point of the arm 47 supported by the shower bath apparatus main body 28 can be fixed, and the fixing position can be selected when moving upward or downward, and therefore by using the arm 47 as an auxiliary hand rail when standing or sitting, the user can stand and sit by holding it easily, and the fixing position can be selected freely regardless of the arm moving direction.

(10) Embodiment 10

Figure 28:
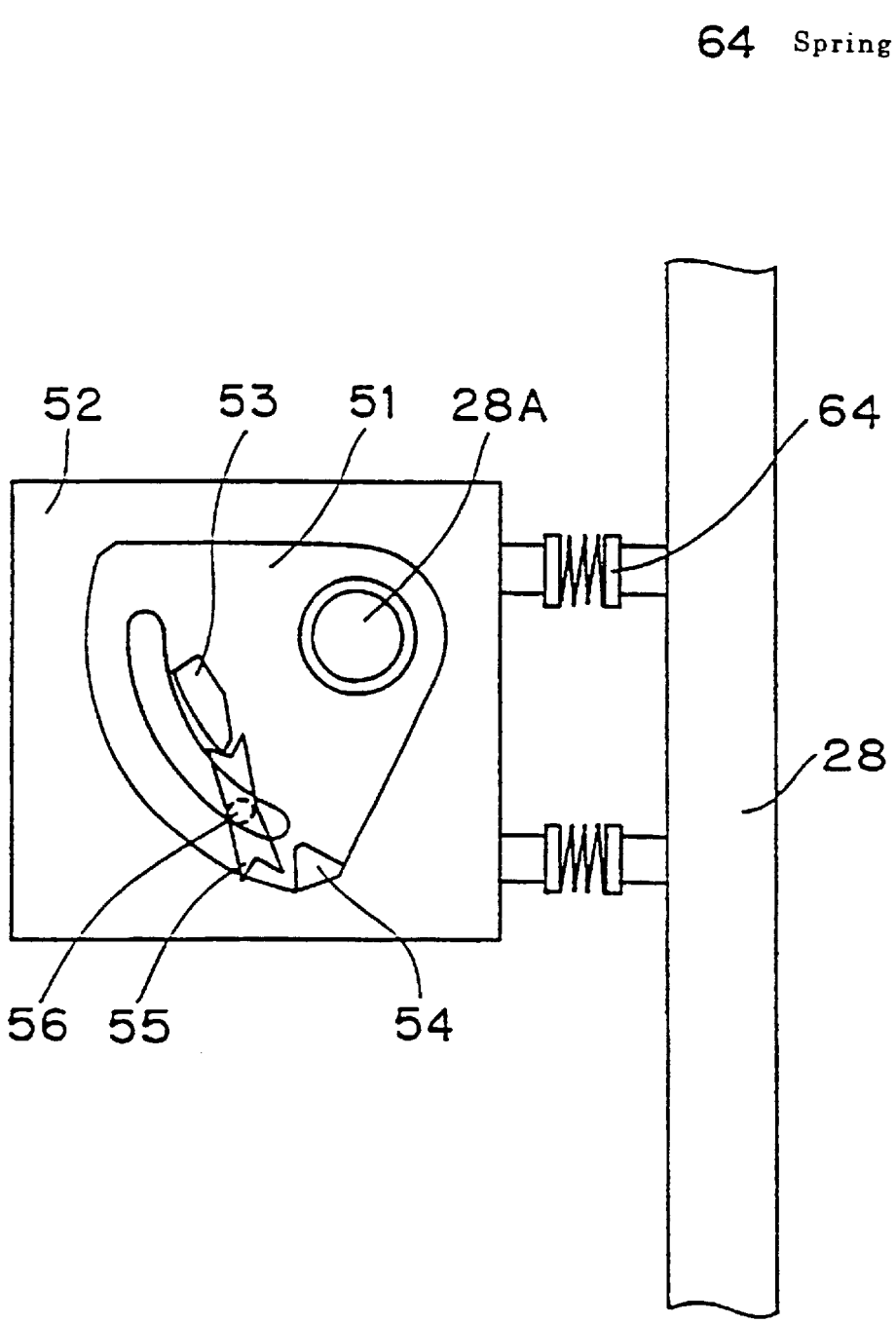
FIG. 28 is a structural diagram showing embodiment 10 of shower bath apparatus of the invention.

Embodiment 10 of the invention is described below while referring to FIG. 28. FIG. 28 is a structural diagram of embodiment 10.

What differs from embodiment 5 is that the arm 47 supported by the shower bath apparatus main body 28 and rotating about the support point can be fixed, and is also movable when a force exceeding the set moment force is applied to the movable part when fixing.

In FIG. 28, reference numeral 64 is a spring for supporting the shaft fixing plate support member 52, which is fixed to the shower bath apparatus main body 28.

Same reference numerals as in embodiment 5 refer to a same structure, of which explanation is omitted.

The operation and action are described below. The support shaft 28A does not usually rotate due to the action of the shaft fixing plate 51 fixed on the support shaft 28A for supporting the arm 47, the fixed position specifying pin 53 and rotating angle changing pin 54 fixed on the shaft fixing plate 51, and the rotor 55 supported on the shaft fixing plate support member 52. When a force exceeding the set moment is applied to the support shaft 28A, the spring 64 supporting the shaft fixing plate support member 52 expands and contracts, so that force exceeding the reaction of set moment force is not transmitted to the shower bath apparatus main body 28 to which the spring 64 is fixed.

Thus, according to the embodiment, the support point of the arm 47 supported on the shower bath apparatus main body 28 can be fixed, and when a force exceeding the set moment force is applied to the movable part of the arm 47 when fixing, it is designed to be movable, and therefore if a force exceeding the setting is applied to the arm 47, the strength loading on the shower bath apparatus main body 28 can be lessened.

(11) Embodiment 11

Figure 29:
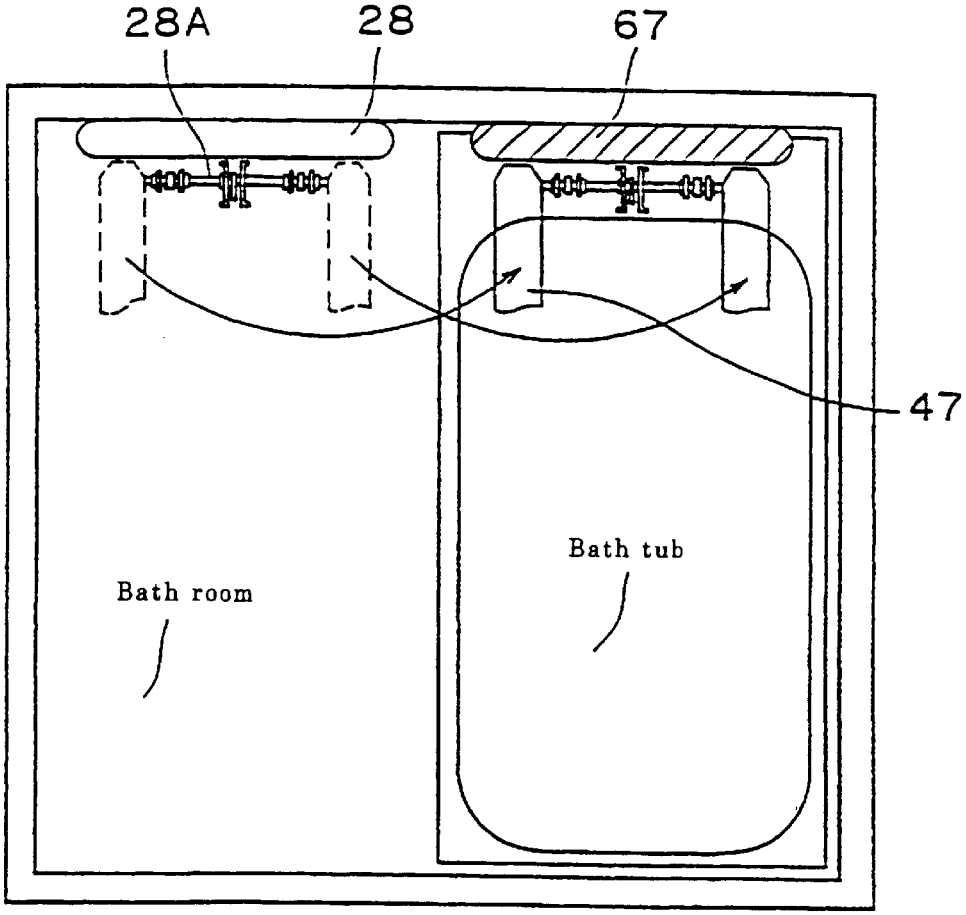
FIG. 29 is a structural diagram showing embodiment 11 of shower bath apparatus of the invention.

Embodiment 11 of the invention is described below while referring to FIG. 29 and FIG. 30. FIG. 29 is a structural diagram of embodiment 11, and FIG. 30 is a partial detail view of the arm and shaft junction.

What differs from embodiment 5 is that the arm 47 can be dismounted from the shower bath apparatus main body 28, and that the dismounted arm 47 can be installed in the bath tub or other place.

Figure 30:
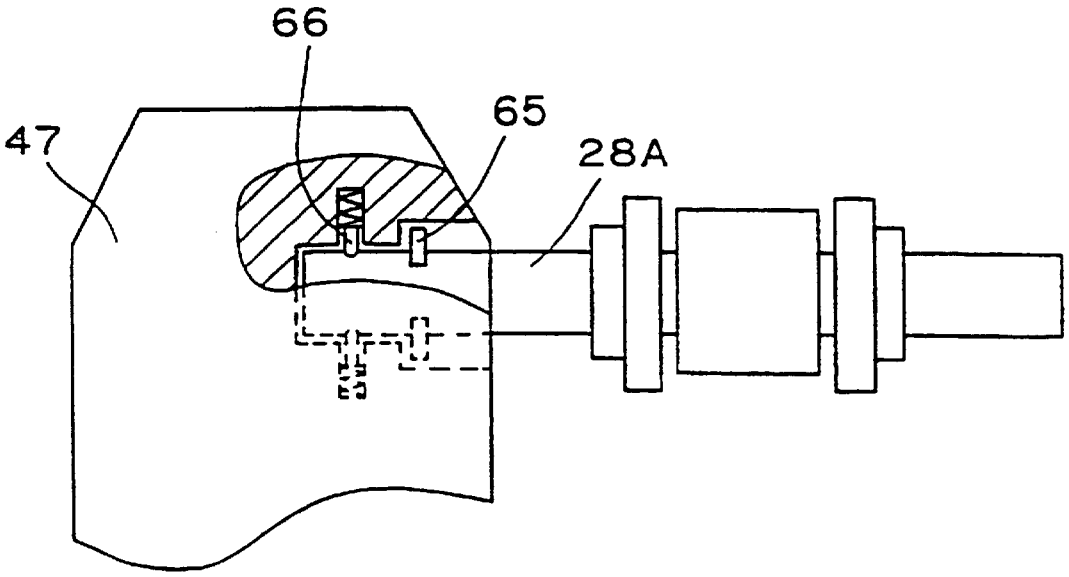
FIG. 30 is a partial detail diagram of an arm and shaft junction in the same embodiment.

In FIG. 30, reference numeral 65 is an arm junction pin for joining the arm 47 and support shaft 28A, and it is fixed to the support shaft 28A. Reference numeral 66 is an extraction preventive pin for preventing the arm 47 from being extracted from the support shaft 28A, and this extraction preventive pin 66 is fitted to the arm 47.

In FIG. 29, reference numeral 67 is an arm support device, and it is fitted to the wall of the bath tub area. The arm support device 67 also has an extraction preventive pin 66 same as in the support shaft 28A, and the structure of its mounting portion is similar to the structure of the arm 47. The coupling structure using the pins 65 and 66 may be replaced by a similar structure.

Same reference numerals as in embodiment 5 refer to a same structure, of which explanation is omitted.

The operation and action are described below. As shown in FIG. 29, the arm 47 is extracted from the support shaft 28A, and cleaned. When utilizing the injection of hot water from the arm 47 in the bath tub, the removed arm 47 is used by attaching to a mounting portion (not shown) of the arm support device 67 fixed to the bath room wall above the bath tub. When extracting the arm 47 from the support shaft 28A, as shown in FIG. 30, the extraction preventive pin 66 pressed by spring force to the dent in the support shaft 28A is dislocated from the dent, so that the arm 47 can be extracted from the support shaft 28A.

Thus, according to the embodiment, since the arm 47 can be dismounted from the shower bath apparatus main body 28, by removing the arm 47 from the shower bath apparatus main body 28, the arm 47 can be cleaned easily. Besides, the arm 47 dismounted from the shower bath apparatus main body 28 can be installed in a proper place in the bath room, so that it may be used as an auxiliary hand rail when standing or sitting in other place.

(12) Embodiment 12

Figure 31:
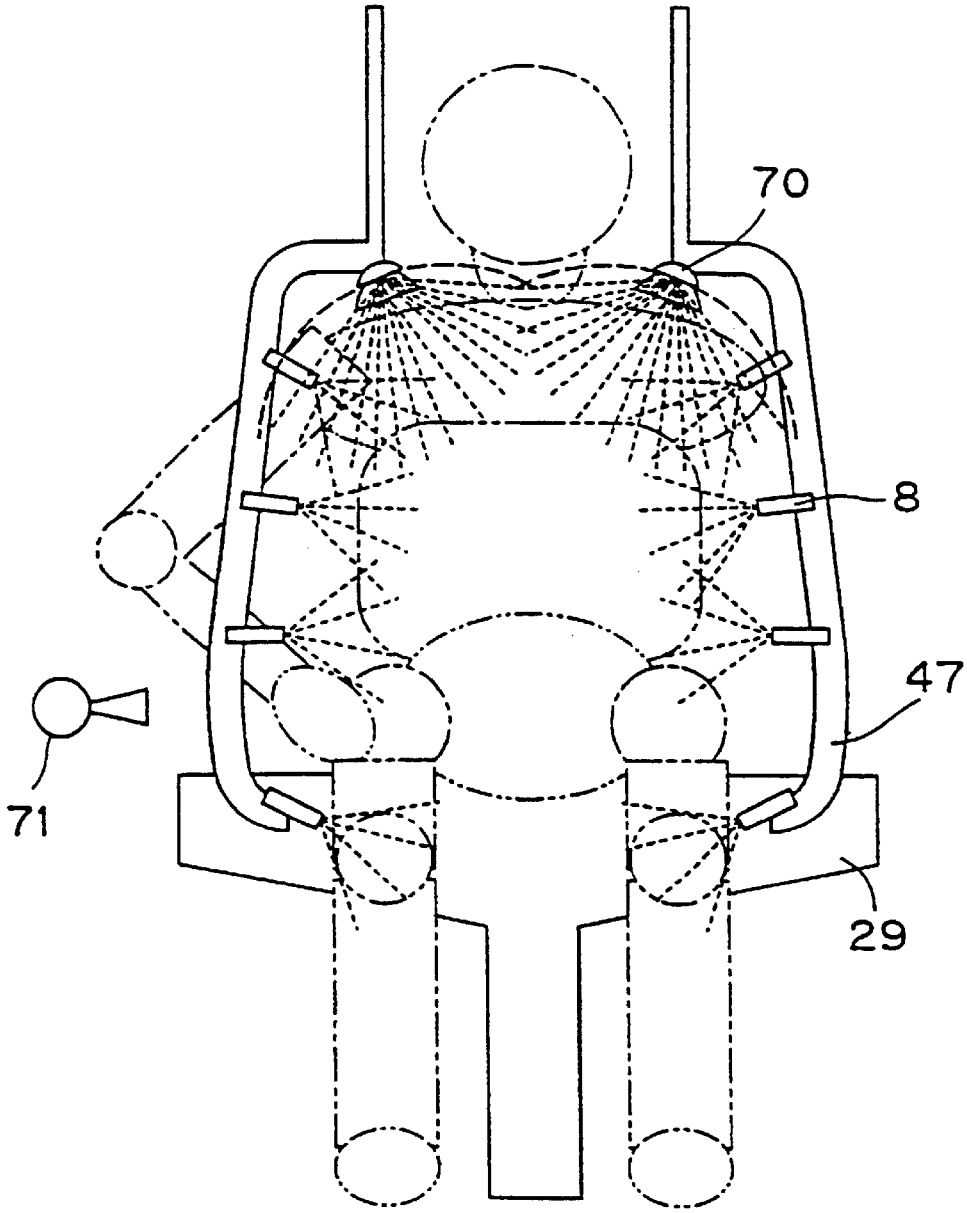
FIG. 31 is a structural diagram of shower bath apparatus in embodiment 12 of the invention.
Figure 32:
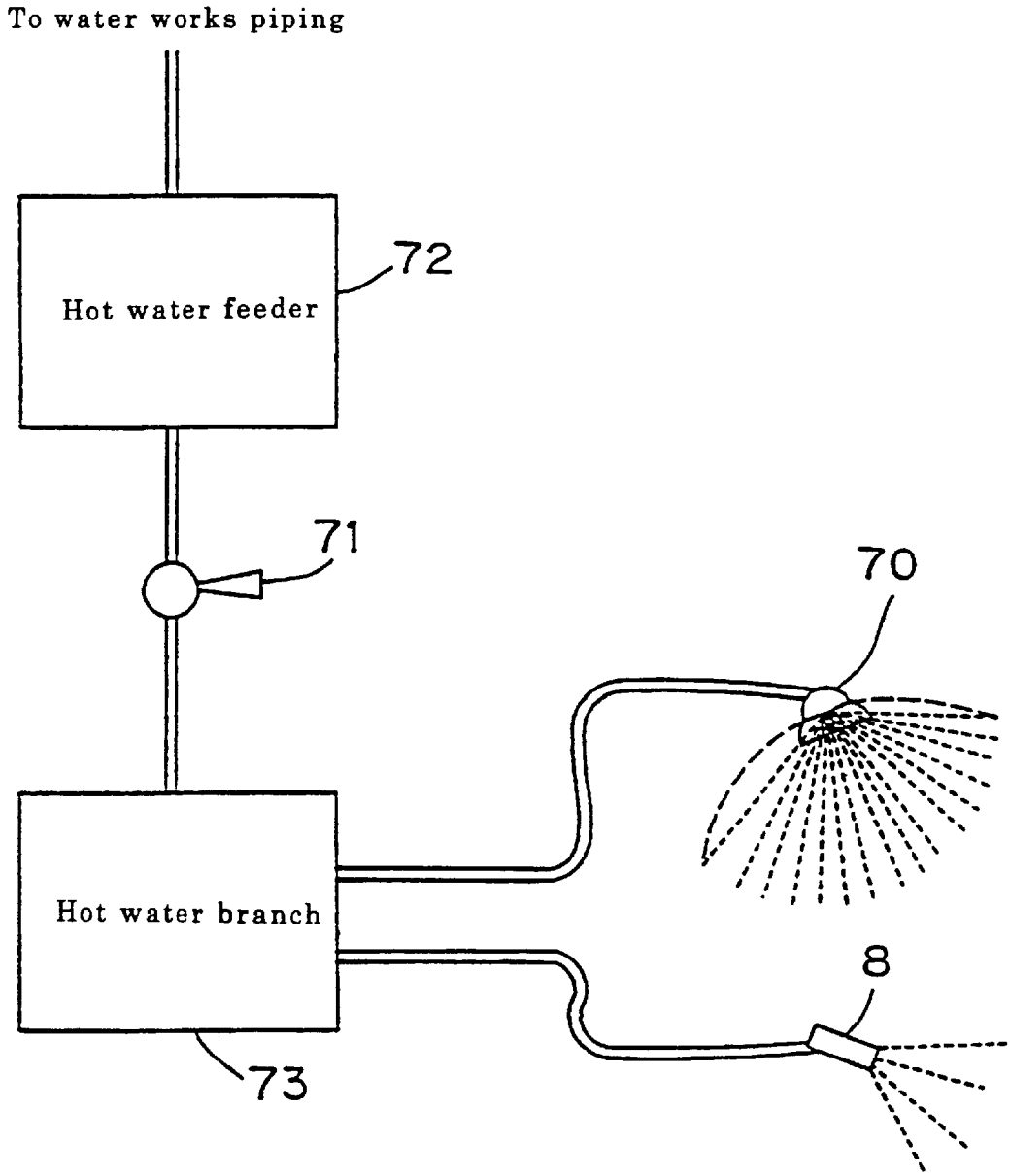
FIG. 32 is a hot water system diagram in the same embodiment.

Embodiment 12 of the invention is described below while referring to FIG. 31 and FIG. 32. FIG. 31 is a structural diagram of embodiment 12, and FIG. 32 is a hot water system diagram of embodiment 12.

In FIG. 31, reference numeral 8 is the spray nozzle, 70 is a water film forming nozzle, 47 is the arm as nozzle support means, 29 is the chair as seat means, and 71 is a hot water valve. Plural spray nozzles 8 are disposed so as to surround the body of the user. The water film forming nozzle 70 is disposed near the neck area of the body. The spray nozzles 8 and water film forming nozzle 70 are fixed to the arm 47. In FIG. 32, the reference numeral 8 is the spray nozzle, 70 is the water film forming nozzle, 71 is the hot water valve, 72 is a hot water feeder, and 73 is a hot water branch. The hot water system is one line up to the hot water feeder 72, and is branched into two lines from the hot water branch 73 to be connected respectively to the spray nozzles 8 and water film forming nozzle 70.

In thus constituted embodiment 12, the operation is described below. The user sits on the chair 29 to take a shower bath. Manipulating the hot water valve 71, hot water from the hot water feeder 72 is passed into the hot water branch 73. The hot water branch 73 distributes hot water into the spray nozzles 8 and water film forming nozzle 70. From the spray nozzles 8, mist of hot water is injected so as to envelop the body of the user. At the same time, from the water film forming nozzle 70, a film of hot water is formed so as to cover the body of the user mainly around the neck area of the user. This hot water film keeps enough water amount for shielding the mist from the spray nozzles 8.

According to embodiment 12 of the invention, when the user sits on the chair 29 and takes a shower bath in a relaxed state, mist of hot water is injected so as to envelop the body of the user, and the shower bath can be enjoyed by feeling the same warmth and relaxation as in the tub bathing. Moreover, from around neck area of the body, a film of hot water is formed, and the hot water mist is shielded by this film, so that the head is not exposed to the mist of the shower same as the part of the body above the water level in tub bathing. Besides, as the hot water film contacts with the neck area of the body, the boundary of the shower bath region and the head area not exposed to shower can be felt same as the water level is felt in tub bathing. Accordingly, in shower bathing, the same warmth and relaxation as in tub bathing can be felt, and the difference of the part of the body exposed to the shower and the head not exposed can be felt bodily.

(13) Embodiment 13

Figure 33:
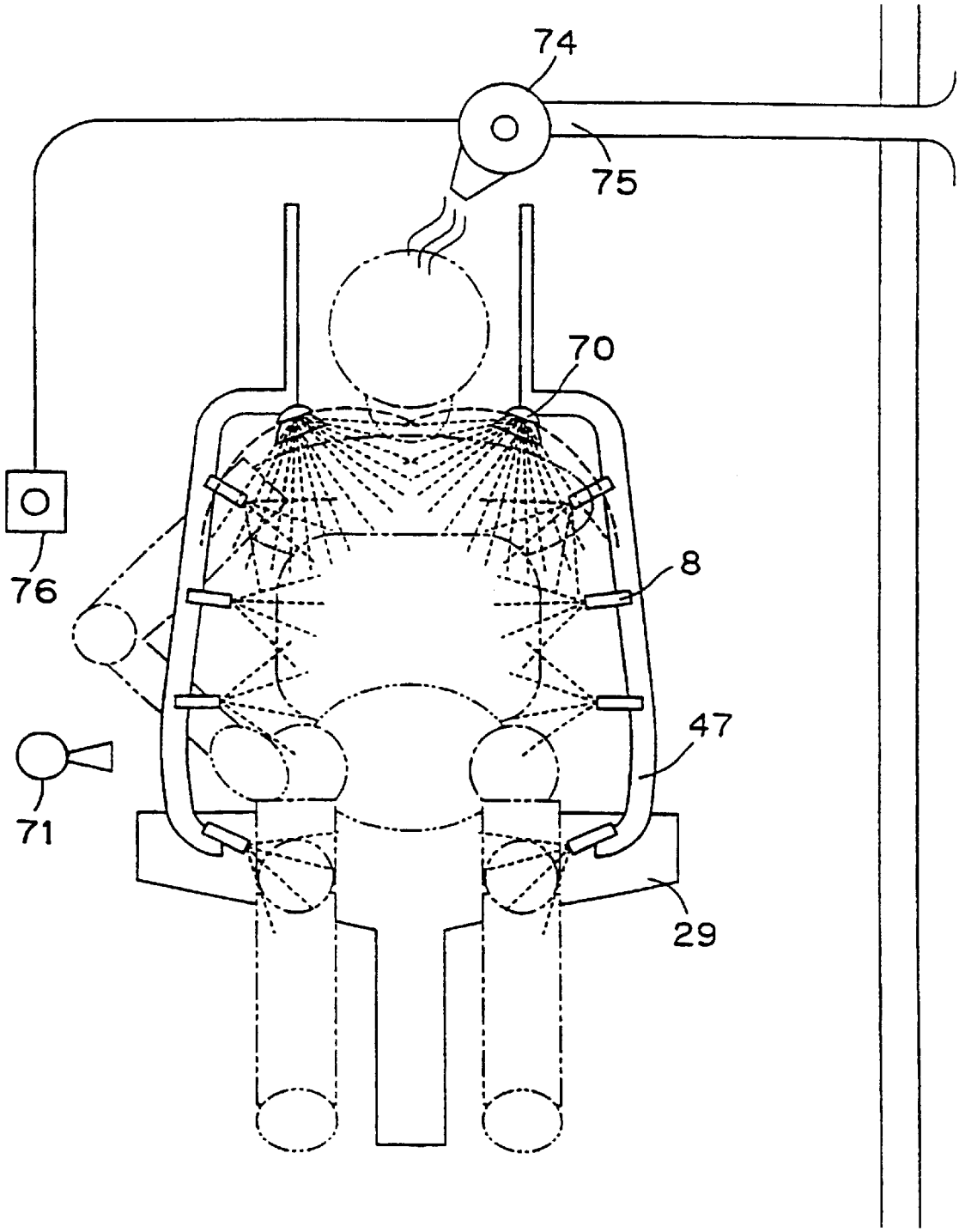
FIG. 33 is a structural diagram of shower bath apparatus in embodiment 13 of the invention.

Embodiment 13 of the invention is described below while referring to FIG. 33. FIG. 33 is a structural diagram of embodiment 13.

In FIG. 33, reference numeral 8 is the spray nozzle, 70 is the water film forming nozzle, 47 is the arm as nozzle support means, 29 is the chair as seat means, 71 is the hot water valve, 74 is a sirocco fan as draft means, 75 is an intake duct, and 76 is an operation unit of the draft means. Plural spray nozzles 8 are disposed so as to surround the body of the user. The water film forming nozzle 70 is disposed near the neck area of the body. The spray nozzles 8 and water film forming nozzle 70 are fixed to the arm 47. The intake duct 75 is connected to outside of the shower room, and the draft means 74 is attached to the end of the intake duct 75 opposite to the face of the user. The operation unit 76 is connected to the draft mans 74.

In thus constituted embodiment 13, the operation is described below. The user sits on the chair 29 to take a shower bath. Manipulating the hot water valve 71, mist of hot water is injected from the spray nozzles 8 so as to envelop the body of the user. At the same time, from the water film forming nozzle 70, a film of hot water is formed so as to cover the body of the user mainly around the neck area of the user. This hot water film keeps enough water amount for shielding the mist from the spray nozzles 8. As the user manipulates the operation unit 76 as desired, the draft means 74 is actuated, and a cold fresh air is blown to the face of the user through the intake duct 75.

According to embodiment 13 of the invention, when the user sits on the chair 29 and takes a shower bath in a relaxed state, mist of hot water is injected so as to envelop the body of the user, and the shower bath can be enjoyed by feeling the same warmth and relaxation as in the tub bathing. Moreover, from around neck area of the body, a film of hot water is formed, and the hot water mist is shielded by this film, so that the head is not exposed to the mist of the shower same as the part of the body above the water level in tub bathing. Still more, by blowing cold air from the draft means 74 to the head of the body not exposed to the shower bath, the unshielded mist of hot water can be blown away, and the cold air strokes the face, and the heat of the user exposed to hot water can be cooled down. Thus, by blowing cold air to the head of the body, the heat of the user steamed by the hot water can be suppressed, so that the user weak to the heat can take shower comfortably.

(14) Embodiment 14

Figure 34:
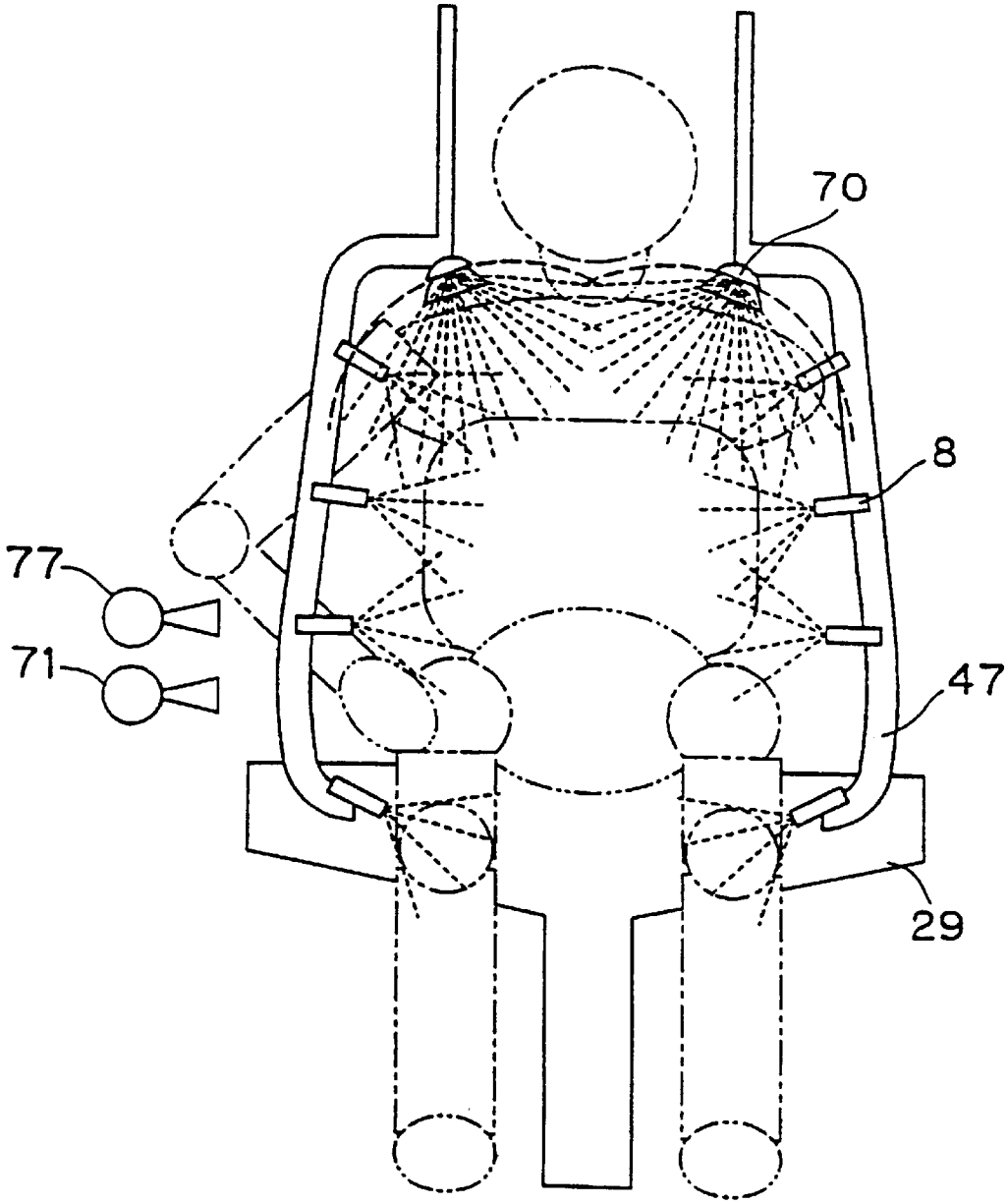
FIG. 34 is a structural diagram of shower bath apparatus in embodiment 14 of the invention.
Figure 35:
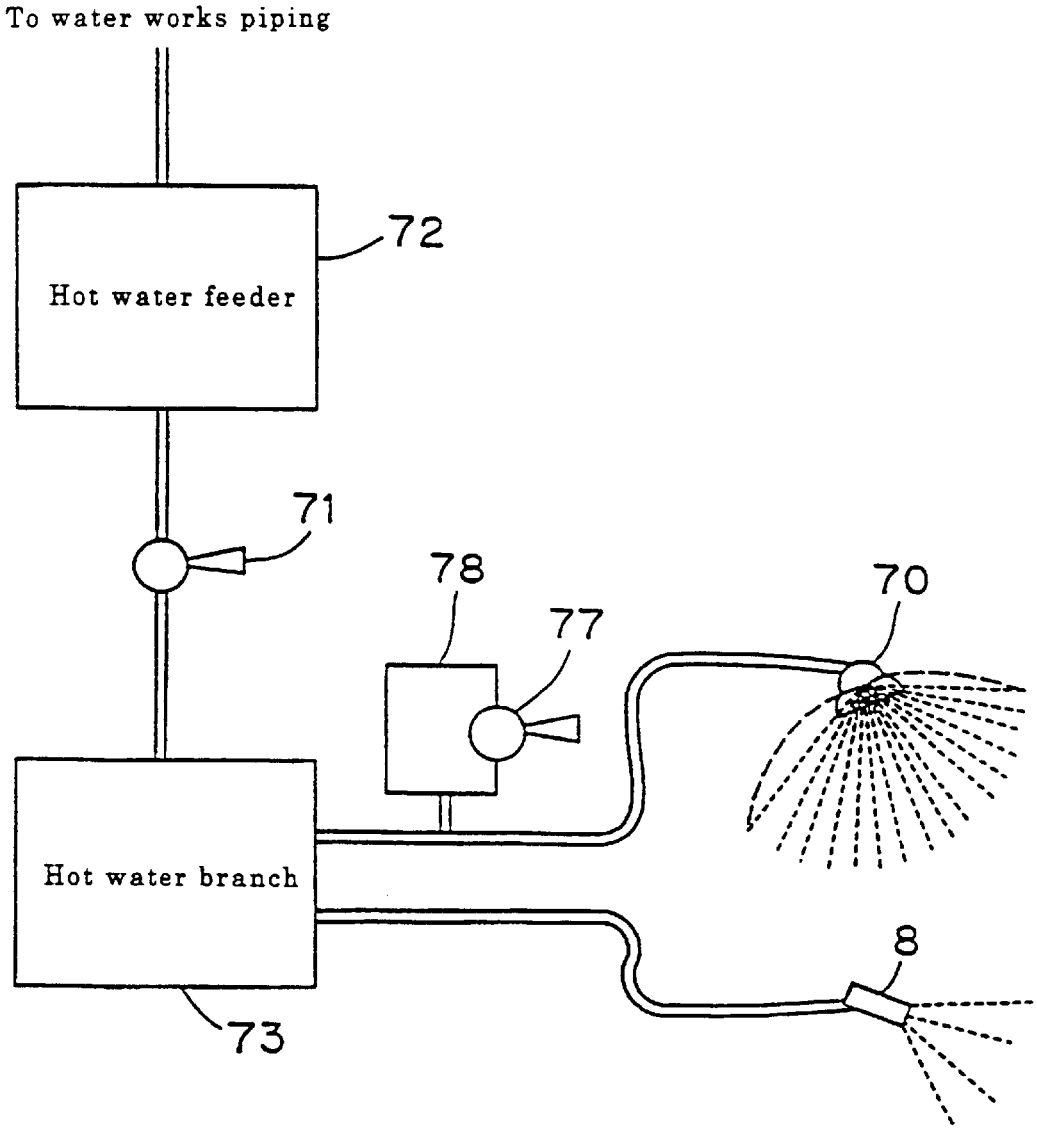
FIG. 35 is a hot water system diagram in the same embodiment.

Embodiment 14 of the invention is described below while referring to FIG. 34 and FIG. 35. FIG. 34 is a structural diagram of embodiment 14, and FIG. 35 is a hot water system diagram of embodiment 14.

In FIG. 34, reference numeral 8 is the spray nozzle, 70 is the water film forming nozzle, 47 is the arm as nozzle support means, 29 is the chair as seat means, 71 is the hot water valve, and 77 is an operation unit of bath salts dissolving means 78 as water reforming means. Plural spray nozzles 8 are disposed so as to surround the body of the user. The water film forming nozzle 70 is disposed near the neck area of the body. The spray nozzles 8 and water film forming nozzle 70 are fixed to the arm 47. In FIG. 35, the reference numeral 8 is the spray nozzle, 70 is the water film forming nozzle, 71 is the hot water valve, 72 is the hot water feeder, 73 is the hot water branch, and 78 is the bath salts dissolving means as water reforming means: The hot water system is one line from the hot water feeder 72 up to the hot water branch 73, and is branched into two lines from the hot water branch 73 to be connected respectively to the spray nozzles 8 and water film forming nozzle 70. The bath salts dissolving means 78 is connected somewhere to the hot water system from the hot water branch 73 to the water film forming nozzle 70.

In thus constituted embodiment 14, the operation is described below. The user sits on the chair 29 to take a shower bath. Manipulating the hot water valve 71, hot water from the hot water feeder 72 is passed into the hot water branch 73. The hot water branch 73 distributes hot water into the spray nozzles 8 and water film forming nozzle 70. From the spray nozzles 8, mist of hot water is injected so as to envelop the body of the user. At the same time, from the water film forming nozzle 70, a film of hot water is formed so as to cover the body of the user mainly around the neck area of the user. This hot water film keeps enough water amount for shielding the mist from the spray nozzles 8. As the user manipulates the operation unit 77 of bath salts dissolving means as desired, aromatic bath salts are dissolved in hot water system from the hot water branch 73 to the water film forming nozzle 70 through the bath salts dissolving means 78, so that a film of hot water containing aromatic bath salts is formed from the water film forming nozzle 70.

According to embodiment 14 of the invention, when the user sits on the chair 29 and takes a shower bath in a relaxed state, mist of hot water is injected so as to envelop the body of the user, and the shower bath can be enjoyed by feeling the same warmth and relaxation as in the tub bathing. Moreover, from around neck area of the body, a film of hot water containing aromatic bath salts is formed, and therefore, without dissolving in the entire shower, the bath salts can be used only for the portion to be dissolved in the hot water film near the head area of the user, so that a herb bath capable of stopping aroma freely is realized. Thus, by injecting the reformed hot water as desired from the nozzle 70, without reforming the entire hot water used in shower, only the minimum limit of hot water may be reformed, and the shower bath capable of stopping hot water reforming freely is realized.

(15) Embodiment 15

Figure 36:
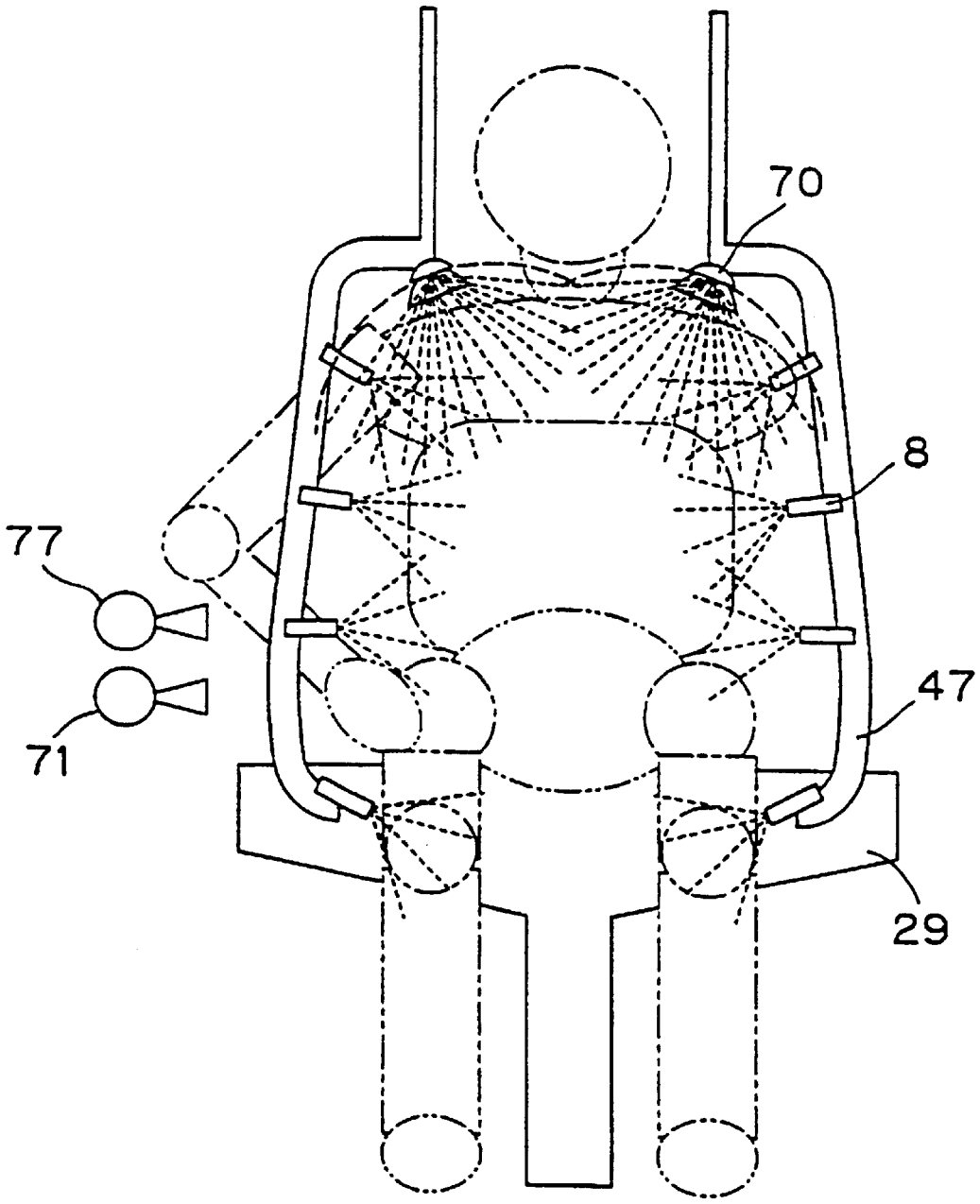
FIG. 36 is a structural diagram of shower bath apparatus in embodiment 15 of the invention.
Figure 37:
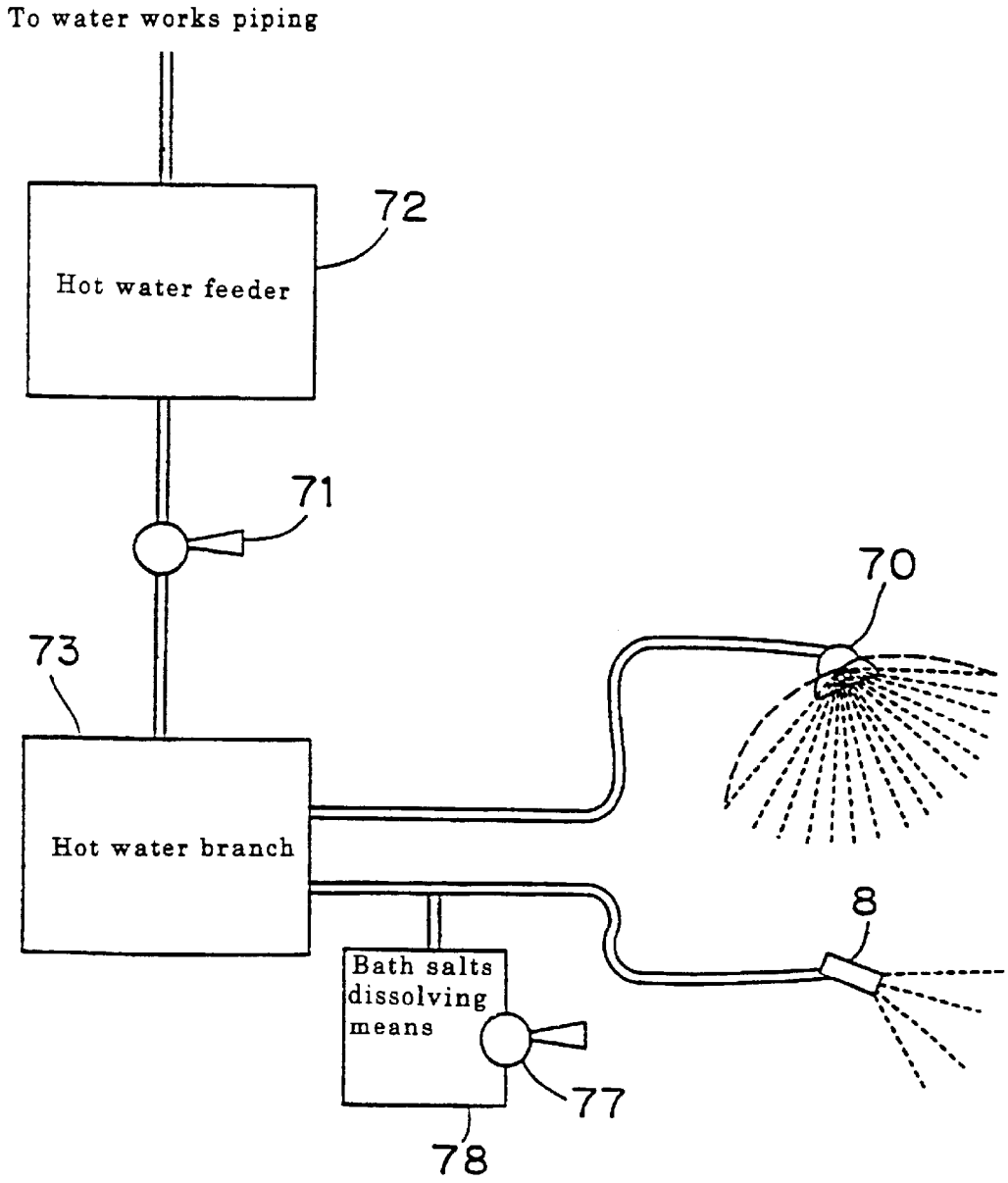
FIG. 37 is a hot water system diagram in the same embodiment.

Embodiment 15 of the invention is described below while referring to FIG. 36 and FIG. 37. FIG. 36 is a structural diagram of embodiment 15, and FIG. 37 is a hot water system diagram of embodiment 15.

In FIG. 36, reference numeral 8 is the spray nozzle, 70 is the water film forming nozzle, 47 is the arm as nozzle support means, 29 is the chair as seat means, 71 is the hot water valve, and 77 is the operation unit of bath salts dissolving means. Plural spray nozzles 8 are disposed so as to surround the body of the user. The water film forming nozzle 70 is disposed near the neck area of the body. The spray nozzles 8 and water film forming nozzle 70 are fixed to the arm 47. In FIG. 37, the reference numeral 8 is the spray nozzle, 70 is the water film forming nozzle, 71 is the hot water valve, 72 is the hot water feeder, 73 is the hot water branch, and 78 is bath salts dissolving means. The hot water system is one line from the hot water feeder 72 up to the hot water branch 73, and is branched into two lines from the hot water branch 73 to be connected respectively to the spray nozzles 8 and water film forming nozzle 70. The bath salts dissolving means 78 is connected somewhere to the hot water system from the hot water branch 73 to the spray nozzles 8.

In thus constituted embodiment 15, the operation is described below. The user sits on the chair 29 to take a shower bath. Manipulating the hot water valve 71, hot water from the hot water feeder 72 is passed into the hot water branch 73. The hot water branch 73 distributes hot water into the spray nozzles 8 and water film forming nozzle 70. From the spray nozzles 8, mist of hot water is injected so as to envelop the body of the user. At the same time, from the water film forming nozzle 70, a film of hot water is formed so as to cover the body of the user mainly around the neck area of the user. This hot water film keeps enough water amount for shielding the mist from the spray nozzles 8. As the user manipulates the operation unit 77 of bath salts dissolving means as desired, bath salts are dissolved in hot water system from the hot water branch 73 to the spray nozzles 8 through the bath salts dissolving means 78, so that hot water containing bath salts is injected from the spray nozzles 8.

According to embodiment 15 of the invention, when the user sits on the chair 29 and takes a shower bath in a relaxed state, mist of hot water is injected so as to envelop the body of the user, and the shower bath can be enjoyed by feeling the same warmth and relaxation as in the tub bathing. In this hot water mist, bath salts can be dissolved as desired. Moreover, from around neck area of the body, a film of hot water is formed, and by shielding the hot water mist containing bath salts by this film, same as the part of the body exposed above the water level in tub bathing, the head area is not exposed to the mist of shower containing bath salts. Thus, by forming a water film dissolving bath salts as desired near the head area of the user, without dissolving in the entire shower, the bath salts may be used only by a minimum limit, and a herb bath capable of stopping aroma freely is realized.

By shielding the hot water mist containing bath salts by the water film, not inhaling the mist containing bath salts, the shower bath using bath salts can be realized comfortably even for those weak to the aroma of the bath salts.

(16) Embodiment 16

Figure 38:
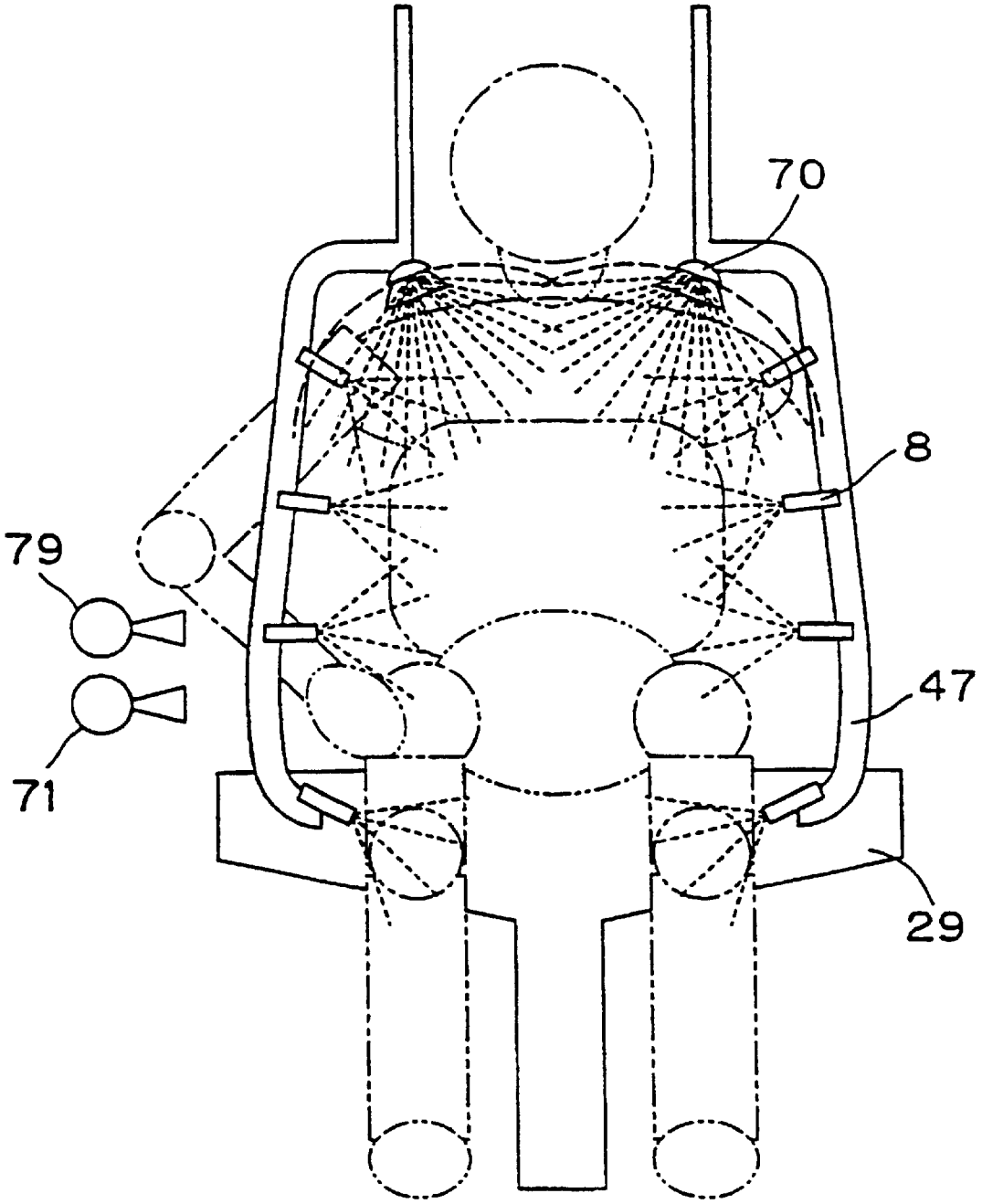
FIG. 38 is a structural diagram of shower bath apparatus in embodiment 16 of the invention.
Figure 39:
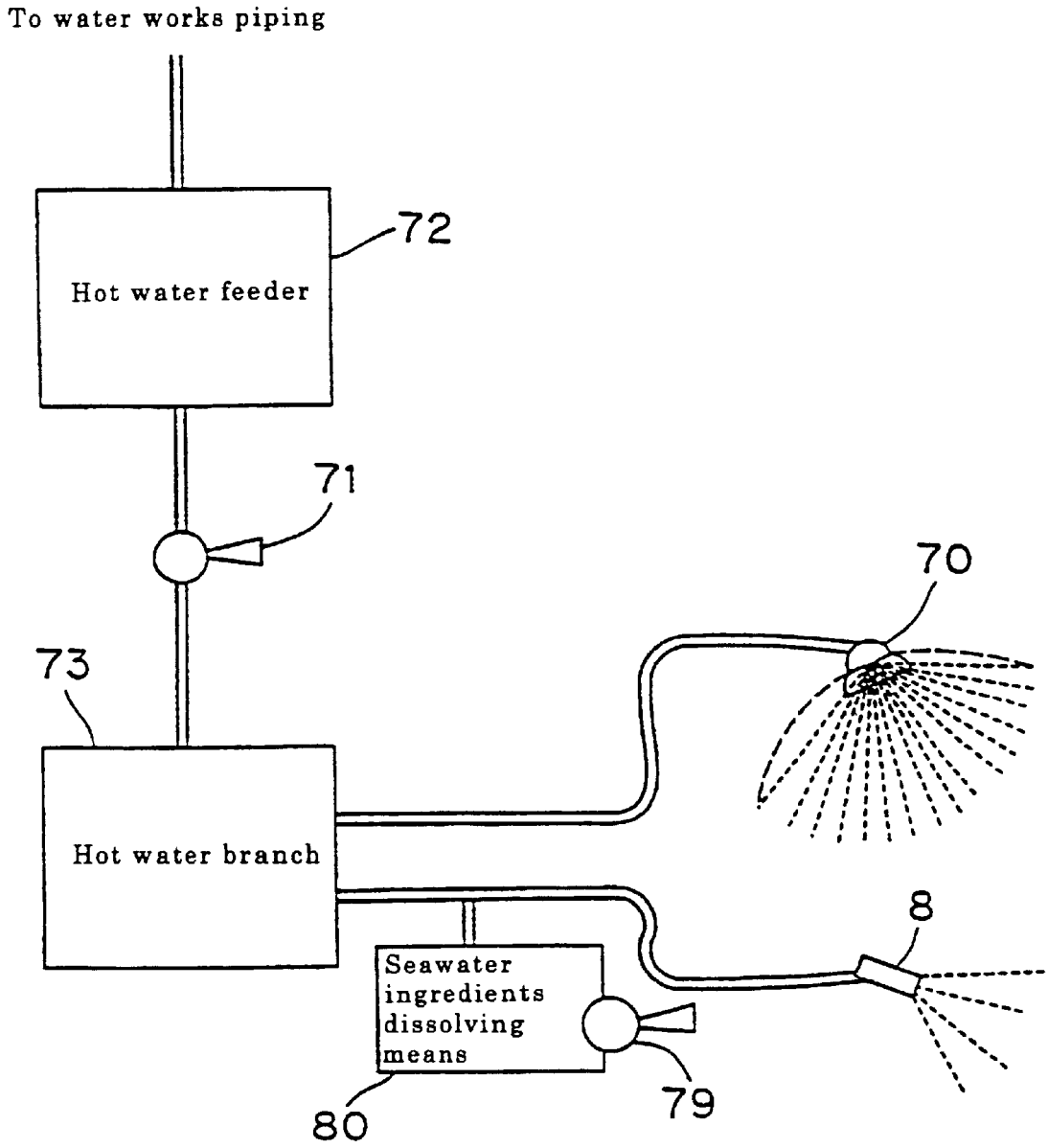
FIG. 39 is a hot water system diagram in the same embodiment.

Embodiment 16 of the invention is described below while referring to FIG. 38 and FIG. 39. FIG. 38 is a structural diagram of embodiment 16, and FIG. 39 is a hot water system diagram of embodiment 16.

In FIG. 38, reference numeral 8 is the spray nozzle, 70 is the water film forming nozzle, 47 is the arm as nozzle support means, 29 is the chair as seat means, 71 is the hot water valve, and 79 is an operation unit of seawater ingredients dissolving means. Plural spray nozzles 8 are disposed so as to surround the body of the user. The water film forming nozzle 70 is disposed near the neck area of the body. The spray nozzles 8 and water film forming nozzle 70 are fixed to the arm 47. In FIG. 39, the reference numeral 8 is the spray nozzle, 70 is the water film forming nozzle, 71 is the hot water valve, 72 is the hot water feeder, 73 is the hot water branch, and 80 is seawater ingredients dissolving means. The hot water system is one line from the hot water feeder 72 up to the hot water branch 73, and is branched into two lines from the hot water branch 73 to be connected respectively to the spray nozzles 8 and water film forming nozzle 70. The seawater ingredients dissolving means 80 is connected somewhere to the hot water system from the hot water branch 73 to the spray nozzles 8.

In thus constituted embodiment 16, the operation is described below. The user sits on the chair 29 to take a shower bath. Manipulating the hot water valve 71, hot water from the hot water feeder 72 is passed into the hot water branch 73. The hot water branch 73 distributes hot water into the spray nozzles 8 and water film forming nozzle 70. From the spray nozzles 8, mist of hot water is injected so as to envelop the body of the user. At the same time, from the water film forming nozzle 70, a film of hot water is formed so as to cover the body of the user mainly around the neck area of the user. This hot water film keeps enough water amount for shielding the mist from the spray nozzles 8. As the user manipulates the operation unit 79 of seawater ingredients dissolving means as desired, seawater ingredients are dissolved in hot water system from the hot water branch 73 to the spray nozzles 8 through the seawater ingredients dissolving means 80, so that hot water containing seawater ingredients is injected from the spray nozzles 8.

According to embodiment 16 of the invention, when the user sits on the chair 29 and takes a shower bath in a relaxed state, mist of hot water is injected so as to envelop the body of the user, and the shower bath can be enjoyed by feeling the same warmth and relaxation as in the tub bathing. In this hot water mist, seawater ingredients can be dissolved as desired. Moreover, from around neck area of the body, a film of hot water is formed, and by shielding the hot water mist containing seawater ingredients by this film, same as the part of the body exposed above the water level in tub bathing, the head area is not exposed to the mist of shower containing seawater ingredients, and a thalassotherapeutic bath is realized while protecting the facial skin sensible to salts. By shielding the hot water mist containing seawater ingredients by the water film, a thalassotherapeutic bath is realized while protecting the facial skin sensible to salts, and it is also free to change over to the shower bath without seawater ingredients.

(17) Embodiment 17

Figure 40:
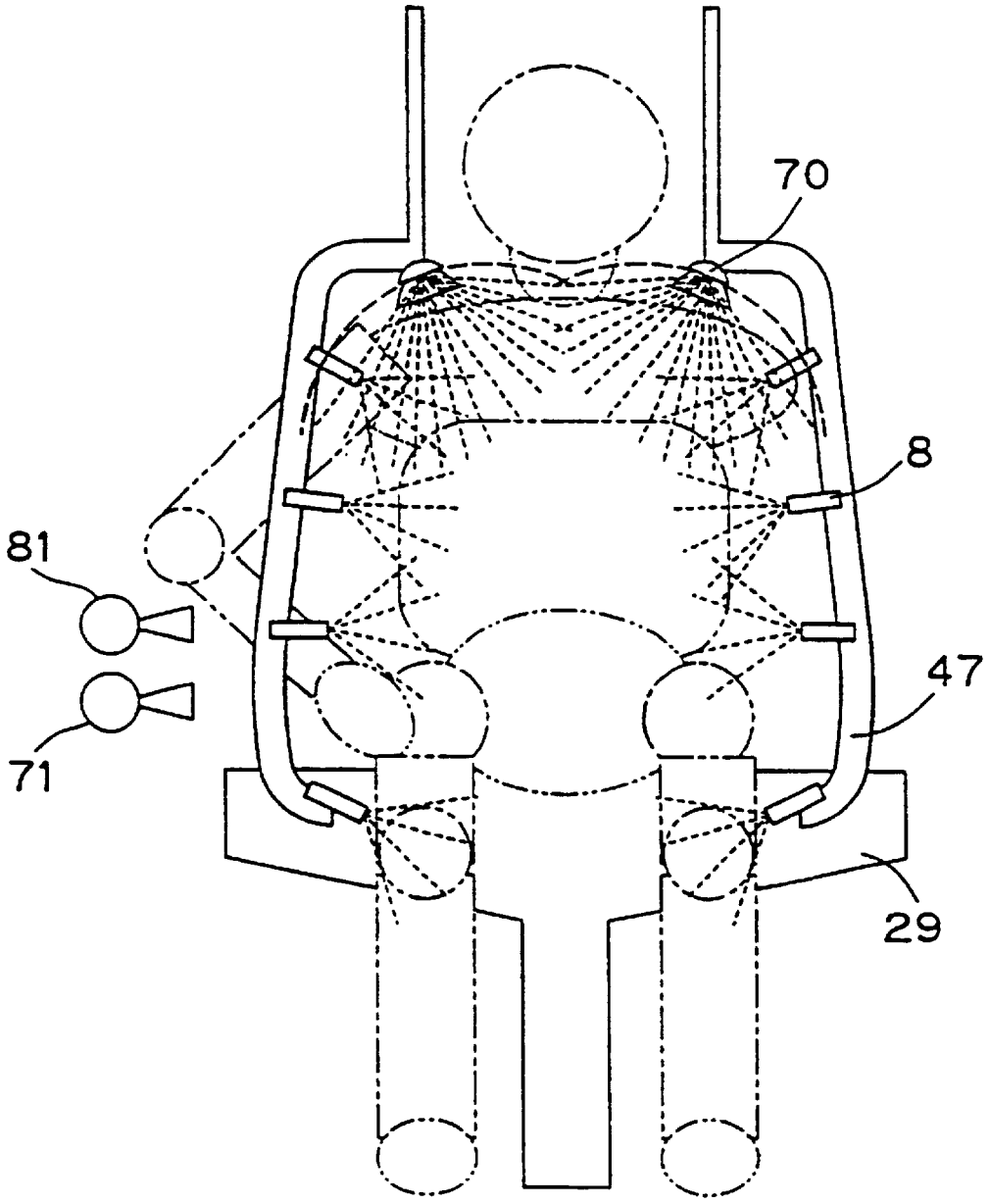
FIG. 40 is a structural diagram of shower bath apparatus in embodiment 17 of the invention.
Figure 41:
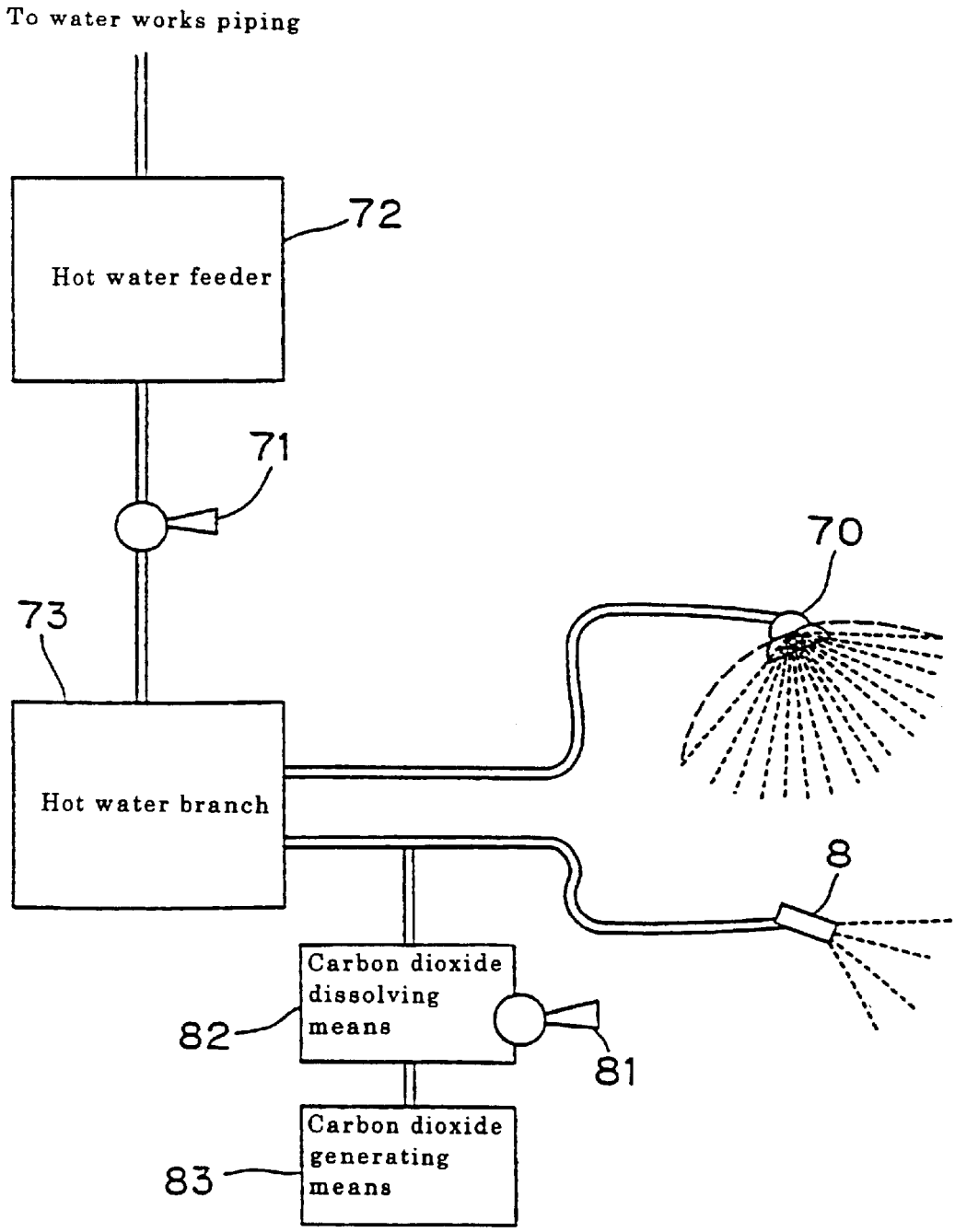
FIG. 41 is a hot water system diagram in the same embodiment.

Embodiment 17 of the invention is described below while referring to FIG. 40 and FIG. 41. FIG. 40 is a structural diagram of embodiment 17, and FIG. 41 is a hot water system diagram of embodiment 17.

In FIG. 40, reference numeral 8 is the spray nozzle, 70 is the water film forming nozzle, 47 is the arm as nozzle support means, 29 is the chair as seat means, 71 is the hot water valve, and 81 is an operation unit of carbon dioxide dissolving means. Plural spray nozzles 8 are disposed so as to surround the body of the user. The water film forming nozzle 70 is disposed near the neck area of the body. The spray nozzles 8 and water film forming nozzle 70 are fixed to the arm 47. In FIG. 41, the reference numeral 8 is the spray nozzle, 70 is the water film forming nozzle, 71 is the hot water valve, 72 is the hot water feeder, 73 is the hot water branch, 82 is carbon dioxide dissolving means, and 83 is carbon dioxide generating means. The hot water system is one line from the hot water feeder 72 up to the hot water branch 73, and is branched into two lines from the hot water branch 73 to be connected respectively to the spray nozzles 8 and water film forming nozzle 70. The carbon dioxide dissolving means 82 is connected somewhere to the hot water system from the hot water branch 73 to the spray nozzles 8, and the carbon dioxide generating means 83 is connected to the carbon dioxide dissolving means 82.

In thus constituted embodiment 17, the operation is described below. The user sits on the chair 29 to take a shower bath. Manipulating the hot water valve 71, hot water from the hot water feeder 72 is passed into the hot water branch 73. The hot water branch 73 distributes hot water into the spray nozzles 8 and water film forming nozzle 70. From the spray nozzles 8, mist of hot water is injected so as to envelop the body of the user. At the same time, from the water film forming nozzle 70, a film of hot water is formed so as to cover the body of the user mainly around the neck area of the user. This hot water film keeps enough water amount for shielding the mist from the spray nozzles 8. As the user manipulates the operation unit 81 of carbon dioxide dissolving means as desired, carbon dioxide is generated from the carbon dioxide generating means 83, and carbon dioxide is dissolved in hot water system from the hot water branch 73 to the spray nozzles 8 through the carbon dioxide dissolving means 82, so that hot water containing carbon dioxide is injected from the spray nozzles 8.

According to embodiment 17 of the invention, when the user sits on the chair 29 and takes a shower bath in a relaxed state, mist of hot water is injected so as to envelop the body of the user, and the shower bath can be enjoyed by feeling the same warmth and relaxation as in the tub bathing. In this hot water mist, carbon dioxide can be dissolved as desired. Moreover, from around neck area of the body, a film of hot water is formed, and by shielding the hot water mist containing carbon dioxide by this film, carbonate spa bath is realized without inhaling the mist containing carbon dioxide. By shielding the hot water mist containing carbon dioxide as desired by the water film, carbonate spa bath is realized without inhaling the mist containing carbon dioxide, and it is also free to change over to the shower bath without carbon dioxide.

(18) Embodiment 18

Figure 42:
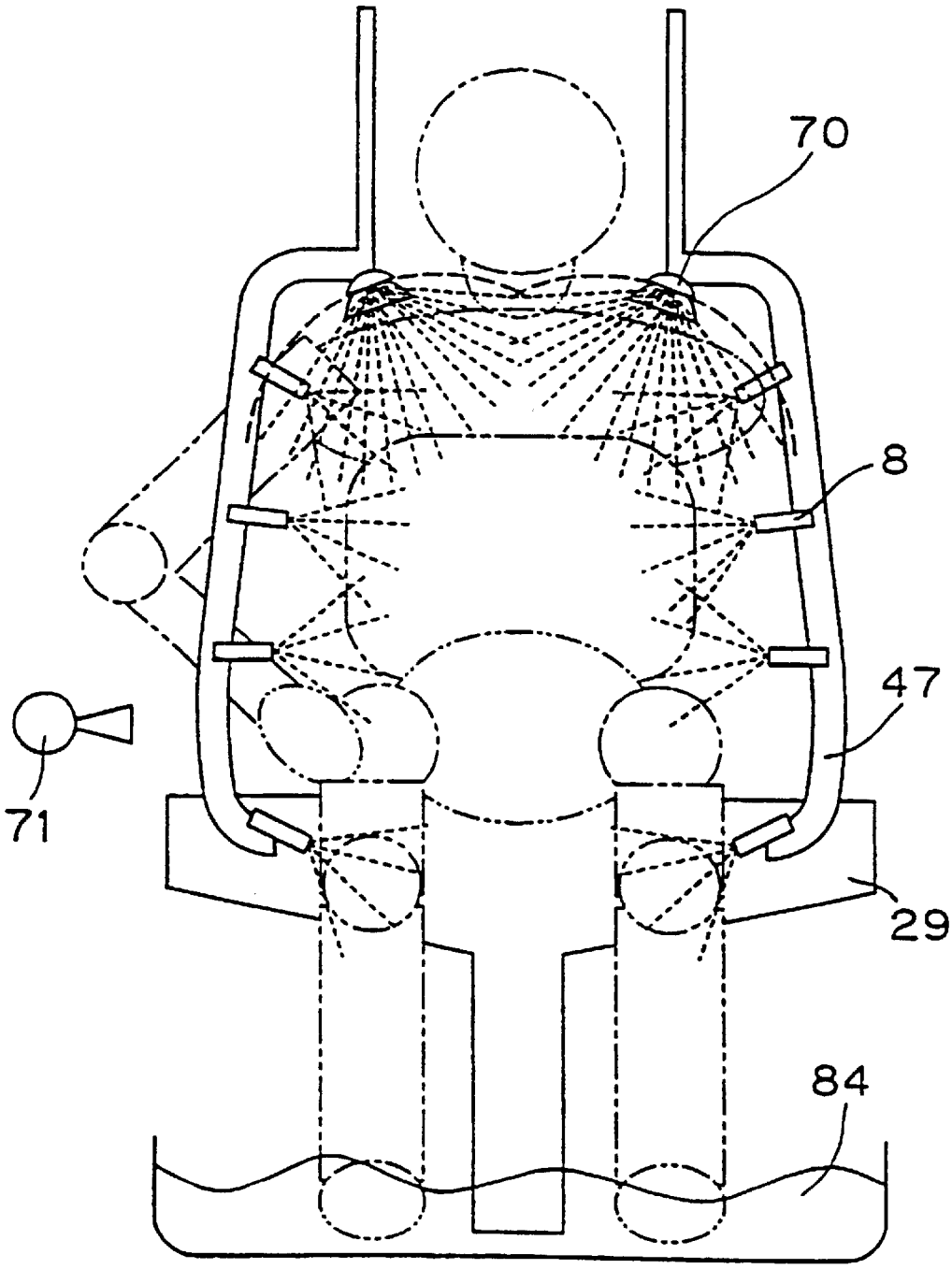
FIG. 42 is a structural diagram of shower bath apparatus in embodiment 18 of the invention.
Figure 43:
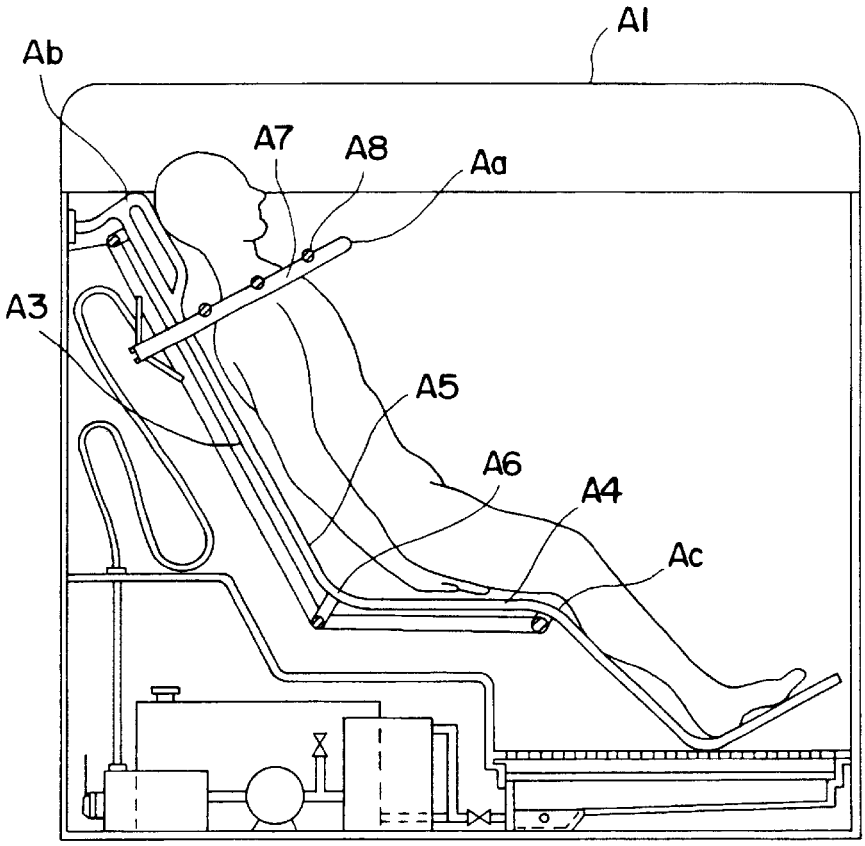
FIG. 43 PRIOR ART
FIG. 43 is a structural diagram of a conventional shower apparatus.
Figure 44:
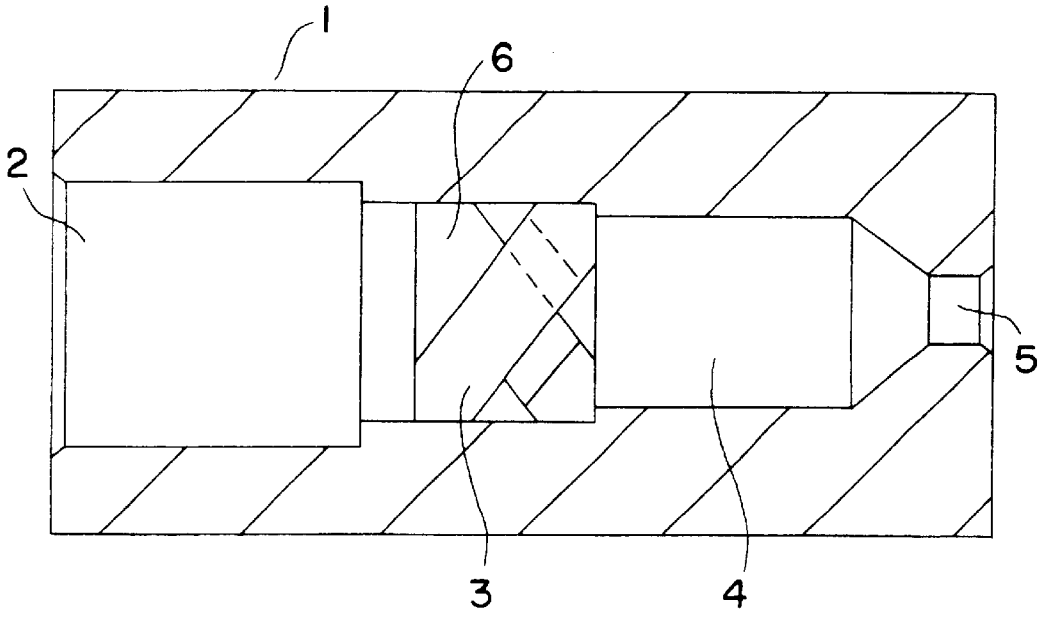
FIG.44 PRIOR ART
FIG. 44 is a sectional view of a conventional spray nozzle.
Figure 45:
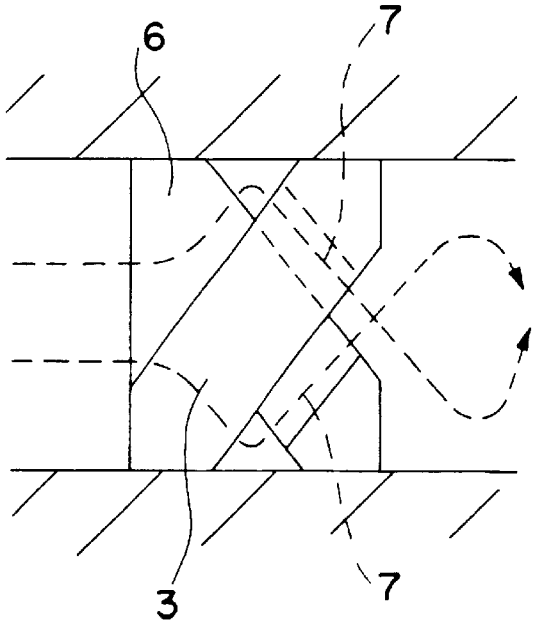
FIG.45 PRIOR ART
FIG. 45 is a partial magnified sectional view of the same spray nozzle.
Figure 46:
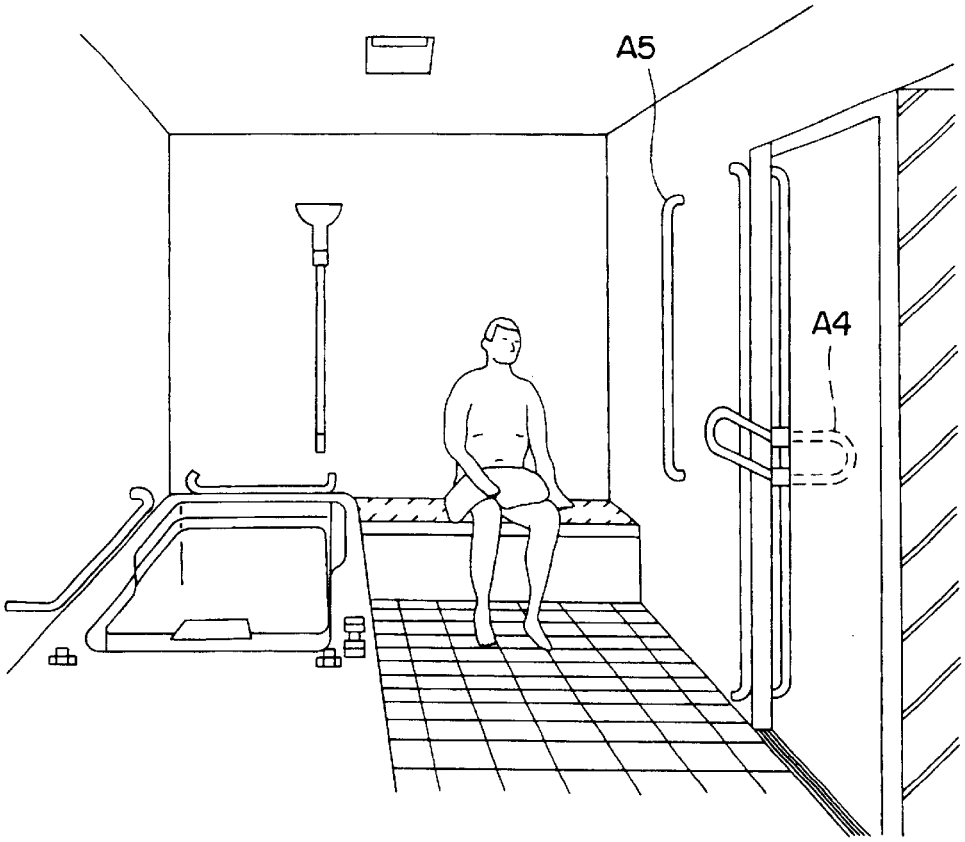
FIG.46 PRIOR ART
FIG. 46 is a perspective view showing a conventional shower apparatus.
Figure 47:
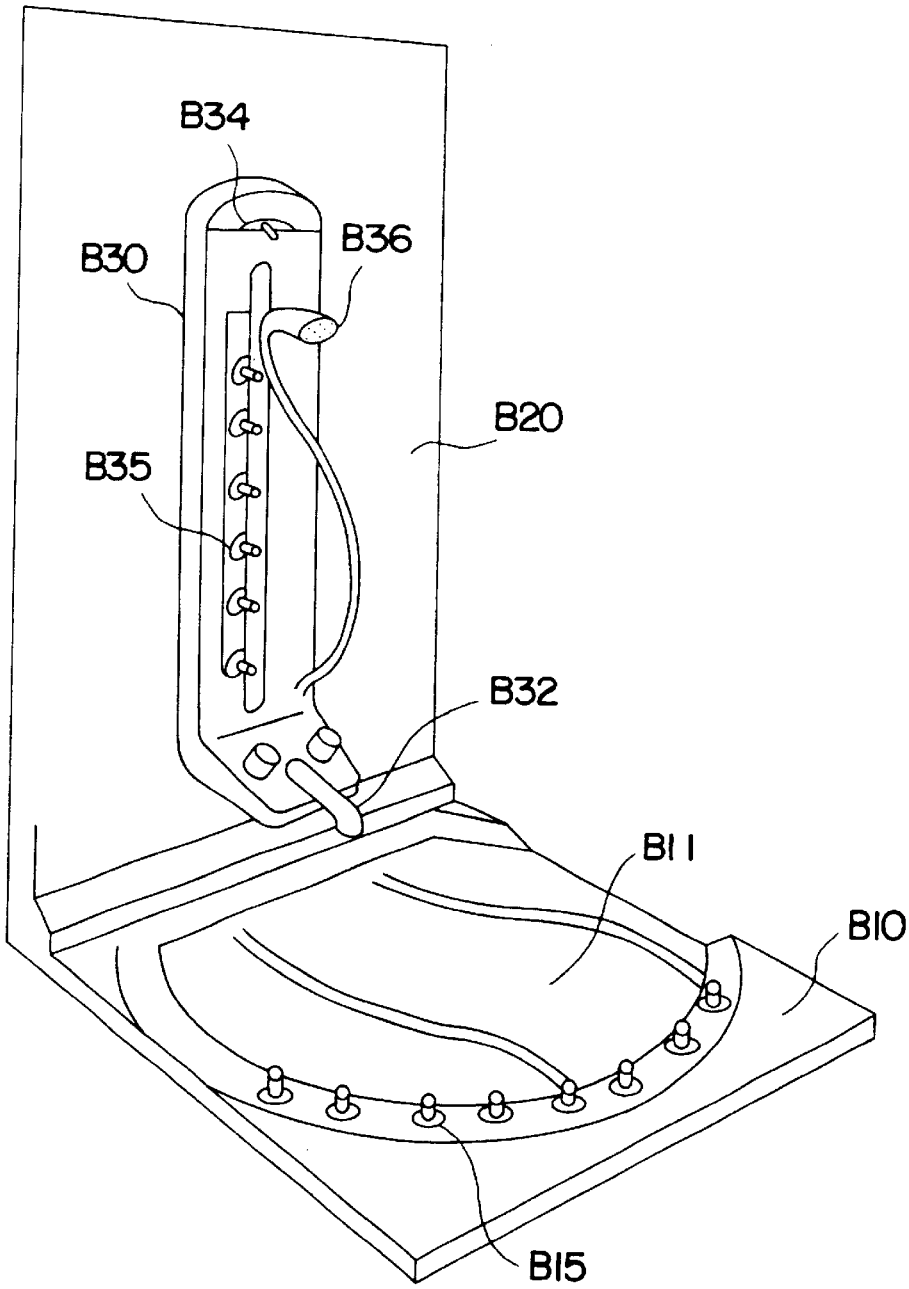
FIG. 47 PRIOR ART
FIG. 47 is a perspective view showing other example of a conventional shower apparatus.
Figure 48:
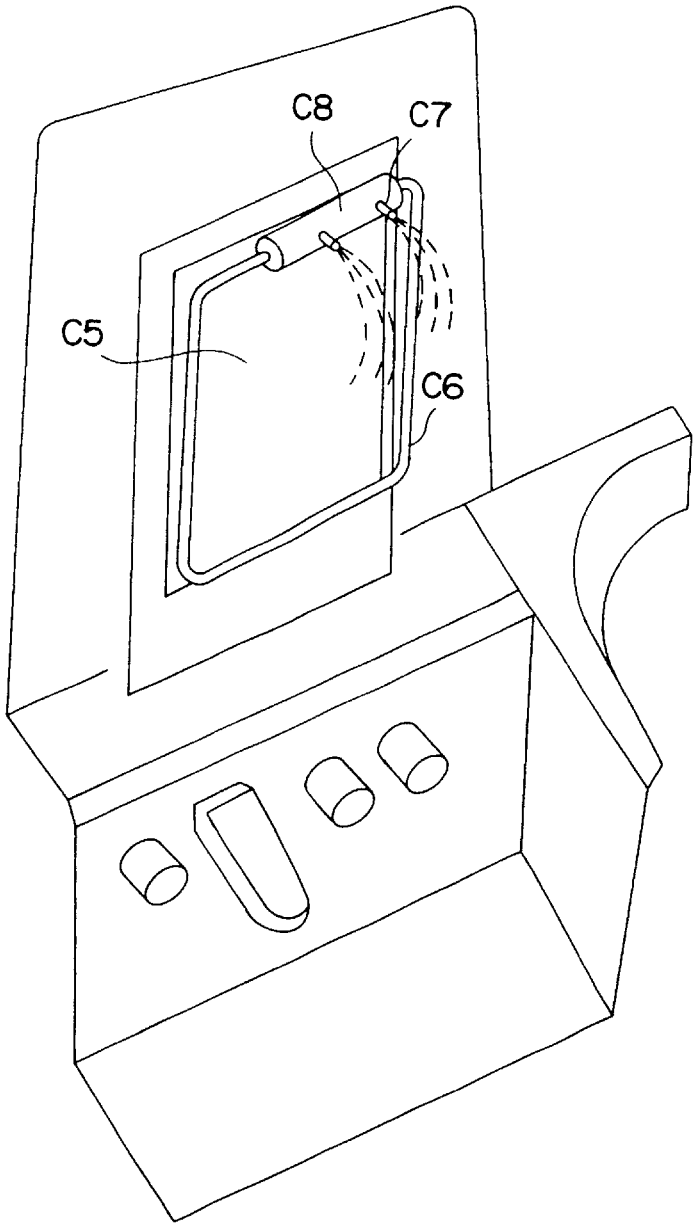
FIG.48 PRIOR ART
FIG. 48 is a perspective view showing a different example of a conventional shower apparatus.

Embodiment 18 of the invention is described below while referring to FIG. 42. FIG. 42 is a structural diagram of embodiment 18.

In FIG. 42, reference numeral 8 is the spray nozzle, 70 is the water film forming nozzle, 47 is the arm as nozzle support means, 29 is the chair as seat means, 71 is the hot water valve, and 84 is a water tank. Plural spray nozzles 8 are disposed so as to surround the body of the user. The water film forming nozzle 70 is disposed near the neck area of the body. The spray nozzles 8 and water film forming nozzle 70 are fixed to the arm 47. The water tank 84 is detachably disposed in the foot area of the user.

In thus constituted embodiment 18, the operation is described below. The user sits on the chair 29 to take a shower bath. Manipulating the hot water valve 71, hot water is injected from the spray nozzles 8 to form mist so as to envelop the body of the user. At the same time, from the water film forming nozzle 70, a film of hot water is formed so as to cover the body of the user mainly around the neck area of the user. This hot water film keeps enough water amount for shielding the mist from the spray nozzles 8. In the water tank 84, the hot water from the spray nozzles 8 and water film forming nozzle 70 is collected, and the user put feet therein. If necessary, the user detaches the water tank 84, so that the hot water from the spray nozzles 8 and water film forming nozzle 70 is discharged without being collected.

According to embodiment 18 of the invention, when the user sits on the chair 29 and takes a shower bath in a relaxed state, mist of hot water is injected so as to envelop the body of the user, and the shower bath can be enjoyed by feeling the same warmth and relaxation as in the tub bathing. Moreover, from around neck area of the body, a film of hot water is formed, and by shielding the hot water mist by this film, same as the part of the body exposed above the water level in tub bathing, the head is not exposed to the mist of the shower. Still more, by collecting the hot water in the water tank, the water can be used in the foot bath without waste. Thus, by collecting hot water in the water tank while shielding the hot water mist by the water film, the shower bath is comfortable for those sensitive to the steam of shower, while the water can be utilized in foot bath without waste.

Thus, in the shower bath apparatus 26 in the foregoing embodiments, the water film forming nozzle 70 for forming a water film is disposed near the neck area of the body, and therefore when the user takes a shower bath in a relaxed state sitting on the chair 29 or the like, the plural spray nozzles 8 disposed around the body inject hot water in mist state to envelop the user, and the water film forming nozzle 70 disposed around the neck area of the body forms a film of hot water, and the hot water mist is shielded by this film, so that a boundary can be felt between the shower region and the head in the neck area of the body, and the difference of the body exposed to the shower and the head not exposed can be felt bodily, while maintaining the hot sensation and relaxed feeling same as in tub bathing in spite of shower bathing.

The water reforming means is disposed in the passage, and the water is reformed by the water reforming means provided in the passage,. and hot water reformed by the water reforming means is injected from the spray nozzles 8 connected to the passage, and consumption of hot water is smaller as compared with the hot water amount in the entire bath tub, so that only a small reforming capacity is enough, and an efficient water reformed shower bath is realized.

The water reforming means is bath salts feed means, and by dissolving bath salts in hot water by the bath salts feed means 78 as the water reforming means, hot water dissolving bath salts is injected from the spray nozzles 8 connected to the passage, and consumption of hot water is smaller as compared with bath tub bathing, the required amount of bath salts is smaller, and the shower bath with bath salts effect may be realized.

The water reforming means is soap feed means, and by dissolving soap in hot water by the soap feed means as the water reforming means, hot water dissolving soap is sprayed from the spray nozzles 8 connected to the passage, so that the skin of the body surface can be cleansed and disinfected.

Moreover, the water reforming means is seawater ingredients feed means, and by dissolving seawater ingredients in hot water by the seawater ingredients feed means 80 as the water reforming means, hot water containing seawater ingredients is sprayed from the spray nozzles 8 connected to the passage onto the skin of the body surface, so that thalassotherapeutic shower bath is realized.

Also, the water reforming means is air feed means for feeding air into the hot water, and by feeding air in hot water by the air feed means as the water reforming means, hot water containing air is sprayed to the body from the spray nozzles 8 connected to the passage, so that shower bath of mild feel is realized.

Still more, the water reforming means is composed of carbon dioxide generating means 83 and carbon dioxide dissolving means 82 for dissolving carbon dioxide generated from the carbon dioxide generating means 83, and carbon dioxide is generated by the carbon dioxide generating means 83, out of the carbon dioxide generating means 83 and carbon dioxide dissolving means 82 of the water reforming means, and the carbon dioxide is dissolved in hot water by the carbon dioxide dissolving means 82, and hot water containing carbon dioxide is sprayed to the skin of the body surface from the spray nozzles 8 connected to the passage 60, consumption of hot water is smaller as compared with bath tub bathing, and the required amount of carbon dioxide is smaller, so that shower bath with carbonate spa effect is realized.

In the shower bath apparatus 26, a detachable water tank 84 for collecting water spray is disposed in the foot area of the body, and when the user takes a shower bath in a relaxed state sitting on the chair or the like, plural spray nozzles 8 disposed around the body inject hot water in mist form to envelop the user, and the hot water film and hot water spray are collected in the detachable water tank 84 disposed in the foot area of the body, so that the sprayed hot water can be used without waste as foot bath while taking a comfortable spray shower bath.

INDUSTRIAL APPLICABILITY

Thus, the shower bath apparatus of the invention comprises a shower bath apparatus main body, a spray nozzle for injecting fluid to a user, and nozzle support means having at least one spray nozzle, and therefore the spreading angle of fluid to be injected to the user can be expanded by the spray nozzle, and the fluid can be sprayed to a wide range of the body at the same time, and when the fluid is a hot water, the wide range of the body can be warmed at the same time.

The shower bath apparatus of the invention also comprises a shower bath apparatus main body, foldable seat means, and a spray nozzle for injecting fluid to a user, and therefore the user is sprayed from the spray nozzle of a wide spray angle in a seated position, so that a wide range of the body can be warmed simultaneously in a relaxed state. Besides, since the seat means is foldable, while the shower bath apparatus and seat means are not used, the seat means can be stowed away, and the washing space can be used widely if installed in the washing space in a bath room in a general household.

In the shower bath apparatus of the invention, the seat means has a support unit such as support plate, and the support unit can support the body weight of the user applied on the seat means firmly on the floor, which prevents the seat means from being broken to avoid accident due to impact of sitting or use for years, so that the shower bath apparatus of high safety is presented.

In the shower bath apparatus of the invention, the support unit of the seat means is stowed away simultaneously when stowing away the seat means, and the shower bath apparatus is easy in operation for stowing away or taking out the seat means as the support unit is stowed away simultaneously when stowing away the seat means.

The shower bath apparatus of the invention comprises a shower bath apparatus main body, seat means on which a user is seated, a spray nozzle for injecting fluid to the user, and nozzle support means having at least one spray nozzle, and therefore the spray nozzle can be disposed by the nozzle support means so that the jet flow may envelop the body, and the user is bathed in a seated position simultaneously on the whole body so that the jet flow from the spray nozzle wide in the spray spreading angle may envelop the body, and a wide range of the body can be warmed simultaneously.

In the shower bath apparatus of the invention, plural spray nozzles are arranged so that their jet flows may overlap on the body, and since jet flows from plural spray nozzles overlap on the body, blank intervals of jet flows may be eliminated.

In the shower bath apparatus of the invention, the spray nozzle is constituted to generate a swirl flow inside and inject the fluid, and therefore the fluid flowing into the spray nozzle is caused to swirl, and the fluid comes to have a swirling force, and hence mist particles are small, and the jet flow is applied to a wide range of the body simultaneously at a wide spray angle.

In the shower bath apparatus of the invention, the spray nozzle has a flow passage, a swirl unit for swirling the fluid entering from the flow passage, and an injection hole disposed at the downstream side of the swirl unit for injecting the swirling fluid, and the swirl unit swirls the incoming fluid to provide the fluid with a swirl force, and causes to reduce the mist particles by the swirl force of the fluid at the injection hole, from the swirl unit to the injection hole, so that the spray angle may be further widened.

In the shower bath apparatus of the invention, the spray nozzle has the swirl unit composed as three swirl holes, and the three swirl units swirl the incoming fluid to provide the fluid with swirl force, and by swirling the flows from each swirl unit stably without interfering with each other from the swirl unit to the injection hole, the constitution of the swirl units is simplified, and the pressure loss of the fluid and the loss of swirl force generated in the swirl units can be suppressed to a minimum limit, so that a stabler spraying is realized at a lower cost.

In the shower bath apparatus of the invention, the spray nozzle is freely adjustable in the injection direction of the fluid, and the direction of jet flow can be freely adjusted depending on the physique and preference of the user, so that showering in a preferred state is realized.

In the shower bath apparatus of the invention, the spray nozzle includes jet flow variable means capable of adjusting the jet flow pattern of the fluid, and therefore the user can adjust the jet flow variable means of the spray nozzle to adjust the state of the jet flow applied to the body, so that shower bathing suited to the preference of the user is realized.

In the shower bath apparatus of the invention, since the nozzle support means is formed as an arm, the jet flow from the spray nozzle can be applied uniformly to the body because the nozzle support means for supporting the spray nozzle is formed as an arm.

In the shower bath apparatus of the invention, the arm is supported on the shower bath apparatus main body and is composed to be adjustable in position, and therefore the arm can be adjusted to a proper position depending on the physique and preference of the user when using the shower so as to be bathed as preferred.

In the shower bath apparatus of the invention, a passage for passing fluid is provided in the arm, and therefore it is not necessary to form passage such as hose for feeding fluid into the spray nozzle outside of the arm because the passage for passing the fluid is provided in the arm mounting the spray nozzle, so that the neat and functional shower bath apparatus is realized without spoiling the appearance.

In the shower bath apparatus of the invention, a support shaft for supporting the arm on the shower bath apparatus main body is provided, and a passage for passing the fluid is provided in this support shaft, and therefore it is not necessary to form the passage such as hose for feeding fluid into the spray nozzle outside of the support shaft because the passage for passing fluid is provided in the support shaft for supporting the arm on the shower bath apparatus main body, so that there is no obstacle when rotating the arm about the support shaft.

In the shower bath apparatus of the invention, the arm can be stowed away, and when the shower is not used, the arm can be put into the shower bath apparatus main body, so that the washing area in the bath room can be used widely without any protruding object.

In the shower bath apparatus of the invention, since the arm is adjustable in angle, the user can preferably adjust the angle to be bathed by adjusting the arm depending on the physique and preference when using the shower.

In the shower bath apparatus of the invention, since the arm can be selected at a desired fixing position, the user can select a desired fixing position and fix at the selected position to be showered by adjusting the arm depending on the physique and preference when using the shower.

In the shower bath apparatus of the invention, the arm is movable when a force exceeding a preset moment force is applied at the arm support point when fixing, and therefore the strength load to the shower bath apparatus main body is lessened as the arm is movable when applied with a force exceeding a set force.

In the shower bath apparatus of the invention, the arm is provided to be nearly symmetrical to right and left, and therefore the jet flow may be applied symmetrically on both sides to the shoulders, arms, chest, waist and feet of the body of the user when using the shower because the arm mounting the spray nozzle is nearly symmetrical.

In the shower bath apparatus of the invention, the right and left arms cooperate, and therefore since the right and left arms cooperate, when the user adjusts the arm position depending on the own physique, or when stowing away the arms, by moving only one of the right and left arms, both arms operate simultaneously, so that it is possible to handle by one hand only.

In the shower bath apparatus of the invention, the right and left arms are adjustable individually, and therefore since the arms mounting the spray nozzle can be adjusted individually, if desired to shower one arm or hand only due to injury, for example, the position of the other arm can be set aside.

In the shower bath apparatus of the invention, the arm can be dismounted from the shower bath apparatus main body, and therefore cleaning or maintenance of the arm is easy by dismounting the arm from the shower bath apparatus main body.

In the shower bath apparatus of the invention, the arm dismounted from the shower bath apparatus main body can be mounted on a proper position in the bath room, and therefore by dismounting the arm from the shower bath apparatus main body and mounting on a proper position in the bath room, for example, the wall above the bath tub, it is possible to bathe the upper half of the body only with the shower while putting the feet in the bath tub, sitting on the edge of the bath tub, or use as an auxiliary hand rail when standing or sitting in the same position.

In the shower bath apparatus of the invention, the arm is made of resin either in whole or in part, and since the arm is made of resin, it is smaller in the cold discomfort or hot discomfort when touched by part of the body as compared with the metal, and moreover it is light in weight, and the strength for supporting the arm can be lessened, and the arm can be moved by a smaller effort.

In the shower bath apparatus of the invention, a hand shower is provided, and a changeover valve is installed to change over the spray nozzle and the hand shower, and therefore the spray nozzle giving a warm feeling by enveloping the body with the jet flow, and the hand shower for washing a desired part of the body by holding in hand can be used by changing over by the changeover valve.

In the shower bath apparatus of the invention, the operation unit for manipulating the changeover valve is designed in a rotary knob shape for changing over the spray nozzle and hand shower by rotating right or left, and therefore the spray nozzle and hand shower may be used by changing over by twisting right or left the knob of the operation unit of the changeover valve provided in the shower bath apparatus main body.

In the shower bath apparatus of the invention, a hand shower is provided, and also a changeover valve for changing over the spray nozzle and the hand shower and also for opening both the spray nozzle and the hand shower simultaneously is provided, and therefore the spray nozzle giving a warm feeling by enveloping the body with the jet flow, and the hand shower for washing a desired part of the body by holding in hand can be used separately or simultaneously by changing over by the changeover valve.

In the shower bath apparatus of the invention, the changeover valve is designed to adjust or stop the flow rate, and it is possible to adjust or stop the shower flow rate as well as to change over the type of shower by the changeover valve.

In the shower bath apparatus of the invention, fluid temperature setting means is provided, so that the jet flow temperature of the shower for enveloping the whole body in a wide range can be freely set in seated position.

In the shower bath apparatus of the invention, a mixing valve for mixing hot fluid and cold fluid is provided at the upstream side of the changeover valve so as to adjust to the temperature set by the temperature setting means, and the jet flow temperature of the shower for enveloping the whole body in a wide range can be freely adjusted, for example, in seated position, so that shower bathing at temperature preferred by the user is realized.

In the shower bath apparatus of the invention, an operation unit for manipulating the changeover valve, and temperature setting means of mixing valve are disposed parallel to each other in the shower bath apparatus main body, and therefore since the operation unit for manipulating the changeover valve and the temperature setting means of the mixing valve are provided parallel to each other in the shower bath apparatus main body, the user can manipulate quickly, in seated position, for changing over the spray nozzle and hand shower or setting the temperature.

In the shower bath apparatus of the invention, the operation unit for manipulating the changeover valve is disposed at the right hand side position of the user seated on the seat means, and therefore since the operation unit for manipulating the changeover valve is provided at the right hand side position of the user when seated on the seat means, the user can change over the spray nozzle and hand shower by the right hand in seated position.

In the shower bath apparatus of the invention, the operation unit for manipulating the changeover valve is disposed at a position higher than the temperature setting means, and therefore since the operation unit for manipulating the changeover valve is provided at a position higher than the temperature setting means, the user, for example, in seated position can search for the operation unit by hand without particularly looking for, so that the spray nozzle and hand shower can be changed over in non-visible state.

In the shower bath apparatus of the invention, the hand shower is disposed at a nearly same height as the sitting position of the seat means, and therefore since the hand shower is provided at a nearly same height as the sitting position of the seat means, the user can search for the hand shower by hand and hold it in seated position. Besides, hot water from the hand shower can be poured into a washbowl.

In the shower bath apparatus of the invention, the hand shower is disposed at a position lower than the operation unit of changeover valve, and therefore since the hand shower is provided at a position lower than the operation unit of the changeover valve, the hand shower can be held by searching by hand, and moreover when manipulating the operation unit of the changeover valve while pouring out hot water from the hand shower, it can be manipulated without exposing the hand to the jet flow of the hand shower.

In the shower bath apparatus of the invention, high temperature setting limiting means for preventing injection of high temperature fluid is provided, and therefore if the user attempts to set the jet flow temperature to high temperature by mistake by the temperature setting means, critically high temperature is not set by the high temperature setting limiting means so that safe use is guaranteed.

In the shower bath apparatus of the invention, a high cut valve is provided for preventing injection of fluid of high temperature, and therefore if fluid of high temperature is supplied into the high cut valve, the high cut valve prevents supply of high temperature fluid into the spray nozzle, so that high temperature fluid will not be injected to the user from the spray nozzle.

In the shower bath apparatus of the invention, a high cut valve for preventing injection of fluid of high temperature is provided between the changeover valve and spray nozzle, and therefore if high temperature fluid is supplied into the high cut valve by mistake or malfunction of the mixing valve or the like, the high cut valve prevents supply of high temperature fluid into the spray nozzle, so that the high temperature fluid from the spray nozzle will not be injected to the user.

In the shower bath apparatus of the invention, the high cut valve comprises a flow inlet through which the fluid flows in, a flow outlet through which the fluid flows out, a high temperature discharge port for discharging high temperature fluid, a valve for changing over the flow outlet and the high temperature discharge port, a temperature sensing element for thrusting the valve in a direction for closing the flow outlet when high temperature fluid is supplied, and a bias spring for thrusting the valve in an opposite direction of the direction for thrusting the temperature sensing element, and therefore if the temperature of the fluid supplied from the flow inlet is high, the temperature sensing element thrusts the valve and the flow outlet side is closed, while the high temperature discharge side is opened, and supply of high temperature fluid into the flow outlet is prevented.

In the shower bath apparatus of the invention, the high cut valve has its temperature sensing element composed of shape memory spring, and as compared with the temperature sensing element of wax pellet or the like, the temperature sensing element of shape memory spring is quick in response speed and simple in constitution.

In the shower bath apparatus of the invention, a water film forming nozzle for forming a water film is disposed near the neck area of the body, and therefore when the user takes a shower bath in a relaxed state sitting on a chair or the like, plural spray nozzles disposed around the body inject hot water in mist state to envelop the user, and the water film forming nozzle disposed around the neck area of the body forms a film of hot water, and the hot water spray is shielded by this film, so that a boundary can be felt between the shower region and the head in the neck area of the body, and the difference of the body exposed to the shower and the head not exposed can be felt bodily, while maintaining the hot sensation and relaxed feeling same as in tub bathing in spite of shower bathing.

In the shower bath apparatus of the invention, water reforming means is disposed in a passage, and the water is reformed by the water reforming means provided in the passage, and hot water reformed by the water reforming means is injected from the spray nozzle connected to the passage, and consumption of hot water is smaller as compared with the hot water amount in the entire bath tub, so that only a small reforming capacity is enough, and an efficient water reformed shower bath is realized.

In the shower bath apparatus of the invention, the water reforming means is bath salts feed means, and by dissolving bath salts in hot water by the bath salts feed means as the water reforming means, hot water dissolving bath salts is injected from the spray nozzle connected to the passage, and consumption of hot water is smaller as compared with bath tub bathing, the required amount of bath salts is smaller, and the shower bath with bath salts effect may be realized.

In the shower bath apparatus of the invention, the water reforming means is soap feed means, and by dissolving soap in hot water by the soap feed means as the water reforming means, hot water dissolving soap is sprayed from the spray nozzle connected to the passage, so that the skin of the body surface can be cleansed and disinfected.

In the shower bath apparatus of the invention, the water reforming means is seawater ingredients feed means, and by dissolving seawater ingredients in hot water by the seawater ingredients feed means as the water reforming means, hot water containing seawater ingredients is sprayed from the spray nozzle connected to the passage onto the skin of the body surface, so that thalassotherapeutic shower bath is realized.

In the shower bath apparatus of the invention, the water reforming means is air feed means for feeding air into the hot water, and by feeding air in hot water by the air feed means as the water reforming means, hot water containing air is sprayed to the body from the spray nozzle connected to the passage, so that shower bath of mild feel is realized.

In the shower bath apparatus of the invention, the water reforming means is composed of carbon dioxide generating means and carbon dioxide dissolving means for dissolving carbon dioxide generated from the carbon dioxide generating means, and carbon dioxide is generated by the carbon dioxide generating means, out of the carbon dioxide generating means and carbon dioxide dissolving means of the water reforming means, and the carbon dioxide is dissolved in hot water by the carbon dioxide dissolving means, and hot water containing carbon dioxide is sprayed to the skin of the body surface from the spray nozzle connected to the passage, consumption of hot water is smaller as compared with bath tub bathing, and the required amount of carbon dioxide is smaller, so that shower bath with carbonate spa effect is realized.

In the shower bath apparatus of the invention, a detachable water tank for collecting water spray is disposed in the foot area of the body, and when the user takes a shower bath in a relaxed state sitting on the chair or the like, plural spray nozzles disposed around the body inject hot water in mist form to envelop the user, and the hot water film and hot water spray are collected in the detachable water tank disposed in the foot area of the body, so that the sprayed hot water can be used as foot bath while taking a comfortable spray shower bath.

In the shower bath apparatus of the invention, draft means for blowing cold air to the head is disposed, and therefore by blowing cold air to the head area of the body by the draft means during or after shower bath by the spray nozzle, the head and face are cooled by cold air, and the heat of the user can be suppressed, so that fresh and comfortable shower life can be enjoyed.

In the shower bath apparatus of the invention, the spray nozzle includes a flow passage, three swirl units for swirling the fluid incoming from the flow passage, and an injection hole disposed at the downstream side of the swirl units for injecting the swirling fluid, in which the three swirl units act to swirl the incoming fluid to provide the fluid with a swirl force, while the flows from the swirl units from the swirl units to the injection hole hardly interfere with each other to be stabilized and reduce the loss of swirl force, and the swirl force of the fluid is large at the injection hole, and the mist particles are smaller in size at low pressure, and the spray angle is wider.

In the shower bath apparatus of the invention, three swirl units of the spray nozzle are formed as swirl holes, and the constitution of the swirl units is simplified, and the pressure loss of the fluid and the loss of swirl force generated by the swirl units are suppressed to a minimum limit, so that a stabler spraying is realized at lower cost.

In the shower bath apparatus of the invention, the spray nozzle has a central hole provided nearly in the center of the three swirl units, and the fluid flow from the central hole forms an axial flow of the swirling fluid, and the central hole forms a swirl axial flow nearly about the swirl flow from the three swirl units, and the swirl flow is stabilized between the swirl units and the injection hole, and since the swirl flow and axial central flow of the swirl flow coexist in the injection hole, so that distribution of jet flow (mist) from the injection hole is not deviated to the outer side but is uniform.

In the shower bath apparatus of the invention, the spray nozzle includes a flow passage, a swirl unit for swirling the fluid incoming from the flow passage, a central hole provided nearly in the center of the swirl unit, an injection hole disposed at the downstream side of the swirl unit for injecting the swirling fluid, and spray variable means for adjusting the distance between the swirl unit and injection hole, and therefore the distance between the swirl unit and injection hole can be adjusted by the spray variable mans, and the fluid swirl force is adjustable by shortening the distance between the swirl unit and injection hole when desired to increase the fluid swirl force at the injection hole, or extending the distance between the swirl unit and injection hole when desired to decrease the fluid swirl force at the injection hole, so that a uniform spraying is realized, while the mist particle size and spray angle can be adjusted.

What is claimed is:

[1. A shower bath apparatus comprising, a shower bath apparatus main body, a nozzle support means movably mounted on the shower bath apparatus main body, a first nozzle installed on the shower bath apparatus main body, and a second nozzle installed on the nozzle support means, wherein both of the first nozzle and the second nozzle are able to simultaneously out-flow a fluid.]

2. A shower bath apparatus of claim [1] *4*, further comprising a seat means disposed at the shower bath apparatus main body, wherein the seat means has a support unit such as a support plate.

3. A shower bath apparatus of claim 2, wherein the support unit is [stowed away together when stowing away the seat means] *placed in a storage position when not in use*.

4. A shower bath apparatus comprising:

a shower bath apparatus main body, a nozzle support means movably mounted on the shower bath apparatus main body, a first nozzle installed on the shower bath apparatus main body, and a second nozzle installed on the nozzle support means, wherein the nozzle support means has an arm, the arm has the second nozzle, and the arm [may be stowed away into the shower bath apparatus main body] *placed in a storage position when not in use*.

5. A shower bath apparatus comprising:

a shower bath apparatus main body, a seat means on which a user is seated*, and which includes a support unit which has a support plate, wherein when the seat means is stowed away, the support plate is interlocked with the seat means and is placed in a storage position when not in use*, a nozzle support means movably mounted on the shower bath apparatus main body, a first nozzle installed on the shower bath apparatus main body, and a second nozzle installed on the nozzle support means, wherein both of the first nozzle and the second nozzle are able to simultaneously out-flow a fluid.

[6. A shower bath apparatus of claim 5, wherein the seat means may be stowed away into the shower bath apparatus main body.]

[7. A shower bath apparatus of claim 5 or 6, wherein the seat means includes a support unit.]

[8. A shower bath apparatus of claim 7, wherein the support unit has a support plate, and, when the seat means is stowed away, the support plate is interlocked with the seat means and is stowed away into the shower bath apparatus main body.]

9. A shower bath apparatus of claim [1] *4*, wherein at least one of the first nozzle and the second nozzle is designed to generate a swirl flow inside and spray a flowing fluid.

10. A shower bath apparatus of claim [1] *4*, wherein at least one of the first nozzle and the second nozzle includes a flow passage, a swirl unit for swirling the fluid flowing in from the flow passage, and an injecting hole disposed at the downstream side of the swirl unit for injecting the swirled fluid.

11. A shower bath apparatus of claim [1] *4*, wherein at least one of the first nozzle and the second nozzle includes a flow passage, a swirl unit for swirling a fluid flowing in from the flow passage, and an injecting hole disposed at the downstream side of the swirl unit for injecting the swirled fluid and the swirl unit is provided respectively at three positions.

12. A shower bath apparatus of claim [1] *4*, wherein at least the second nozzle installed on the nozzle support means is able to freely adjust the direction of shower.

13. A shower bath apparatus of claim [1] *4*, wherein at least one of the first nozzle and the second nozzle has a jet flow variable means for adjusting a jet flow pattern of the fluid.

14. A shower bath apparatus of claim [1] *4*, wherein the nozzle support means has an arm.

15. A shower bath apparatus of claim [1] *4*, wherein the arm is supported by the shower bath apparatus main body and a position of the arm is adjustable.

16. A shower bath apparatus of claim 4, wherein the arm is provided with a passage for allowing the fluid to pass through.

17. A shower bath apparatus of claim 4, further comprising a support shaft for supporting the arm on the shower bath apparatus main body, wherein the support shaft is internally provided with a passage for allowing the fluid to pass through.

[18. A shower bath apparatus of claim 4, wherein the arm may be stowed away into the shower bath apparatus main body.]

19. A shower bath apparatus of claim 4, wherein the arm is installed on the shower bath apparatus main body in a manner such that the angle of the arm is adjustable.

20. A shower bath apparatus of claim 4, wherein the arm is installed on the shower bath apparatus main body in a manner such that the arm is able to choose any suitable stationary position.

21. A shower bath apparatus of claim 4, wherein the arm is installed on the shower bath apparatus main body in a manner such that the arm becomes movable when a force exceeding a set moment is applied to the arm support point in fixing the angle of the arm.

22. A shower bath apparatus of claim 4, wherein the arm includes a first arm disposed on the left-hand side of the shower bath apparatus main body and a second arm disposed on the right-hand side of the shower bath apparatus main body.

23. A shower bath apparatus of claim 4, wherein the first arm and the second arm are installed on the shower bath apparatus main body in a manner such that the first arm and the second arm are interlocked with each other.

24. A shower bath apparatus of claim 4, wherein the first arm and the second arm are installed on the shower bath apparatus main body in a manner such that the first arm and the second arm are individually adjustable.

25. A shower bath apparatus of claim 4, wherein the arm is constructed of resin in whole or in part.

26. A shower bath apparatus of claim [1] *4*, further comprising a hand shower and an operation unit which are installed on the shower bath apparatus main body, wherein the operation unit has a changeover valve for changeover of the hand shower, the first nozzle and the second nozzle.

27. A shower bath apparatus of claim [1] *4*, wherein the operation unit to operate the changeover valve has a rotary knob shape which rotates clockwise or counterclockwise for changeover operation.

28. A shower bath apparatus of claim [1] *4*, wherein the changeover valve is capable of changeover operation for (i) use of only the hand shower, (ii) use of the first nozzle and the second nozzle, and (iii) simultaneous use of the first nozzle and the second nozzle and the hand shower.

29. A shower bath apparatus of claim [1] *4*, wherein the changeover valve functions to adjust the flow rate and to stop the flow of fluid.

30. A shower bath apparatus of claim [1] *4*, further comprising a fluid temperature setting means disposed to the shower bath apparatus main body.

31. A shower bath apparatus of claim [1] *4*, further comprising a high temperature fluid feed passage, a low temperature fluid feed passage, and a mixing valve for mixing the fluids fed through the high temperature fluid feed passage and the low temperature fluid feed passage.

32. A shower bath apparatus of claim [1] *4*, further comprising an operation unit to operate the changeover valve, a mixing valve, and a temperature setting means, wherein the operation unit, the mixing valve and the temperature setting means are installed side by side with the shower bath apparatus main body.

33. A shower bath apparatus of claim [1] *4*, further comprising a seat means mounted on the shower bath apparatus main body, wherein the operation unit is installed on the right-hand side of the seat means.

34. A shower bath apparatus of claims [1] *4*, further comprising a fluid temperature setting means, wherein the operation unit is installed at a position higher than the temperature setting means.

35. A shower bath apparatus of claim [1] *4*, further comprising a hand shower installed on the shower bath apparatus main body, wherein the hand shower is installed at a height nearly the same as the seat position of the seat means.

36. A shower bath apparatus of claim [1] *4*, wherein the hand shower is installed at a position lower than the operation unit.

37. A shower bath apparatus of claim [1] *4*, further comprising a high temperature setting control means, installed on the shower bath apparatus main body, in order to prevent spouting of high temperature fluid.

38. A shower bath apparatus of claim [1] *4*, further comprising a high cut valve, installed on the shower bath apparatus main body, in order to prevent spouting of high temperature fluid.

39. A shower bath apparatus of claim [1] *4*, further comprising a high cut valve and changeover valve, installed on the shower bath apparatus main body, wherein the high cut valve has a function to prevent spouting of high temperature fluid, and the high cut valve is disposed between the changeover valve and both of the first nozzle and second nozzle.

40. A shower bath apparatus comprising:

a shower bath apparatus main body;

a foldable seat means;

a nozzle for injecting fluid to a user; and a high cut valve for preventing injection of fluid wherein the high cut valve includes a flow inlet through which the fluid flows in, a flow outlet through which the fluid flows out, a high temperature discharge port for discharging the fluid, a valve body for changing over the flow outlet and high temperature discharge port, a temperature sensing element for thrusting the valve body in a direction of closing the flow outlet when fluid above a temperature is supplied, and a bias spring for thrusting the valve body in an opposite direction of the thrusting direction of the temperature sensing element.

41. A shower bath apparatus of claim 40, wherein the temperature sensing element has a shape memory spring.

42. The shower bath apparatus of claim [1] *4*, wherein each of the first nozzle and the second nozzle has at least one function selected from the group consisting of out-flowing, showering, spraying, injecting, jet-flowing, spouting, spurting, and atomized-flowing the fluid.

43. The shower bath apparatus of claim 4, wherein each of the first nozzle and the second nozzle has at least one function selected from the group consisting of out-flowing, showering, spraying, injecting, jet-flowing, spouting, spurting, and atomized-flowing the fluid.

44. The shower bath apparatus of claim 5, wherein each of the first nozzle and the second nozzle has at least one function selected from the group consisting of out-flowing, showering, spraying, injecting, jet-flowing, spouting, spurting, and atomized-flowing the fluid.

45. The shower bath apparatus of claim 14, wherein each of the first nozzle and the second nozzle has at least one function selected from the group consisting of out-flowing, showering, spraying, injecting, jet-flowing, spouting, spurting, and atomized-flowing the fluid.

*46. A shower bath apparatus of claim 4,*

*wherein the first nozzle and the second nozzle are disposed so that the fluid out-flowing from the first nozzle and the second nozzle envelop a body of a user.*

* * * * *